United States Patent [19]
Iino et al.

[11] Patent Number: 5,768,559
[45] Date of Patent: Jun. 16, 1998

[54] MULTIPLE BANK STRUCTURED MEMORY ACCESS DEVICE HAVING FLEXIBLE SETTING OF A PIPELINE STAGE NUMBER

[75] Inventors: Hideyuki Iino; Hiromasa Takahashi, both of Kawasaki, Japan

[73] Assignee: Fujitsu Limited, Kawasaki, Japan

[21] Appl. No.: 635,568

[22] Filed: Apr. 22, 1996

Related U.S. Application Data

[63] Continuation of Ser. No. 885,984, May 20, 1992, abandoned.

[30] Foreign Application Priority Data

May 20, 1991 [JP] Japan ........................... 3-114960

[51] Int. Cl.⁶ .................................................. G06F 12/00
[52] U.S. Cl. ........................................ 395/484; 395/496
[58] Field of Search .............................. 395/454, 484, 395/496, 411

[56] References Cited

U.S. PATENT DOCUMENTS

| | | | |
|---|---|---|---|
| 3,833,889 | 9/1974 | Cray | 340/172.5 |
| 4,128,880 | 12/1978 | Cray, Jr. | 364/200 |
| 4,633,434 | 12/1986 | Scheuneman | 364/900 |
| 4,680,730 | 7/1987 | Omoda et al. | 395/425 |
| 5,060,145 | 10/1991 | Scheuneman et al. | 395/425 |
| 5,063,533 | 11/1991 | Erhart et al. | 395/425 |
| 5,148,536 | 9/1992 | Witek et al. | 395/425 |

*Primary Examiner*—David L. Robertson

[57] ABSTRACT

A memory access device including a memory unit having a plurality of independently accessible banks and a pipeline stage number setting unit for setting the number of the pipeline stages in a pipeline operation for accessing the next-to-be-accessed one of the plurality of independently accessible banks before completing an access to a currently accessed one of the plurality of independently accessible banks. The number of banks accessed is not more than the number of the plurality of banks. A unit is provided for generating an address of the next-to-be-accessed one of the plurality of independently accessible banks and for switching a bank from the currently used one of the plurality of independently accessible banks to the next-to-be-accessed one of the plurality of independently accessible banks in accordance with the number of the pipeline stages set by the pipeline stage number setting unit.

8 Claims, 56 Drawing Sheets

| NO. | $T_0$ | $T_1$ | BANK NUMBER |
|---|---|---|---|
| 1 | 0 | 0 | 1 |
| 2 | 0 | 1 | 2 |
| 3 | 1 | 0 | 4 |
| 4 | 1 | 1 | *RESERVE |

FIG. 15

| STRIDE VALUES | -8 | -7 | -6 | -5 | -4 | -3 | -2 | -1 | 0 | 1 | 2 | 3 | 4 | 5 | 6 | 7 | 8 |
|---|---|---|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 | 1 | 1 | 1 |
| 2 | 1 | 2 | 1 | 2 | 1 | 2 | 1 | 2 | 1 | 2 | 1 | 2 | 1 | 2 | 1 | 2 | 1 |
| 4 | 1 | 4 | 2 | 4 | 1 | 4 | 2 | 4 | 1 | 4 | 2 | 4 | 1 | 4 | 2 | 4 | 1 |

BANK NUMBERS

FIG. 16

| STRIDE VALUES | -8 | -7 | -6 | -5 | -4 | -3 | -2 | -1 | 0 | 1 | 2 | 3 | 4 | 5 | 6 | 7 | 8 | BANK NUMBERS |
|---|---|---|---|---|---|---|---|---|---|---|---|---|---|---|---|---|---|---|
| | 1 | 1 | 1 | 1 | 1 | 1 | 1 | 1 | 1 | 1 | 1 | 1 | 1 | 1 | 1 | 1 | 1 | 1 |
| | 1 | 1 | 2 | 1 | 1 | 1 | 2 | 2 | 1 | 2 | 2 | 1 | 1 | 1 | 2 | 1 | 1 | 2 |
| | 1 | 1 | 4 | 1 | 2 | 1 | 4 | 4 | 1 | 4 | 4 | 1 | 2 | 1 | 4 | 1 | 1 | 4 |

FIG. 17

STRIDE VALUE=1
(PIPELINE STAGE NUMBER=2)

(64-BIT ACCESS)

STRIDE VALUE=2
(PIPELINE STAGE NUMBER=2)

(32-BIT ACCESS)

STRIDE VALUE=3
(PIPELINE STAGE NUMBER=1)

(32-BIT ACCESS)

(64-BIT ACCESS)

(32-BIT ACCESS)

(32-BIT ACCESS)

(32-BIT ACCESS)

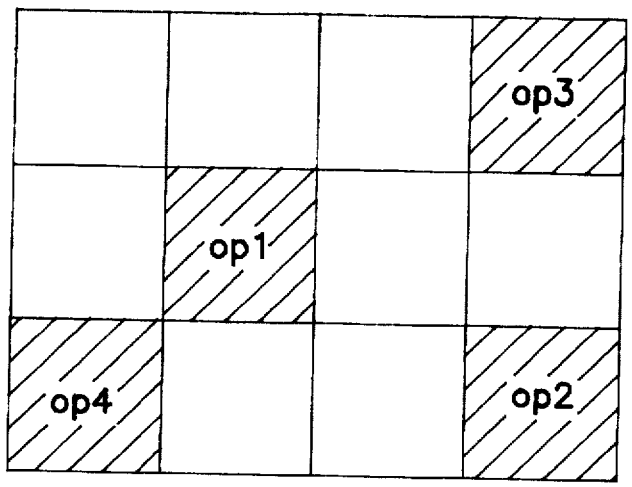
FIG. 24C
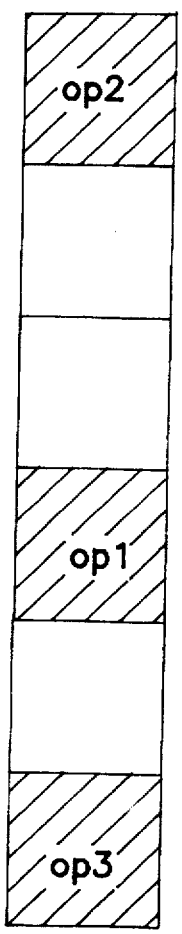
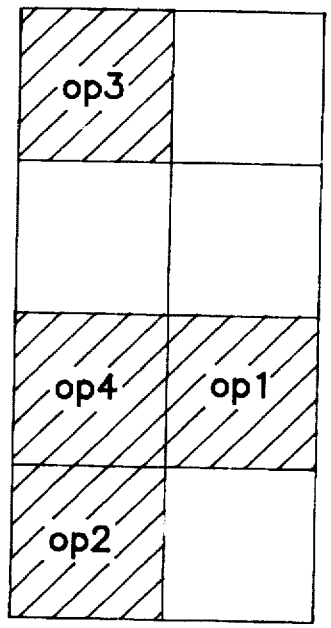
FIG. 24A   FIG. 24B

10

MULTIPLE BANK STRUCTURED MEMORY ACCESS DEVICE HAVING FLEXIBLE SETTING OF A PIPELINE STAGE NUMBER

This application is a continuation of application Ser. No. 07/885,984, filed May 20, 1992, now abandoned.

BACKGROUND OF THE INVENTION

1. Field of the Invention

This invention pertains to a memory access device, and more particularly to an access device for accessing in parallel a plurality of banks formed by an address space.

To improve the processing speed of a computer system, it is effective to insert a memory (called a cache memory) operating at a super-high speed between the main memory and the computer. The average access time to the computer is expedited commensurate with the access time of the cache memory.

However, because the capacity of a cache memory is smaller than that of a main memory, there are often cases in which targeted data do not exist (mis-hits) in the cache memory. A mis-hit requires that the content of the cache memory is updated by the content of the main memory. This lowers the computer operating speed commensurately with the access speed of the main memory.

2. Description of the Related Art

The following counter measures can be considered:
(1) Increase the capacity of a cache memory.
(2) Raise the hit ratio by modifying the caching algorithm.
(3) Use a cache memory comprising a high speed/high performance element (e.g., an SRAM).

However, (1) is limited by system cost, (2) can reduce mis-hits but cannot completely eliminate them, and (3) raises system cost in proportion to the capacity of the main memory. Hence, these methods have proven to be largely ineffective.

FIG. 1 is a timing chart showing an example of a bus cycle of a microprocessor. CLK indicates a clock signal, ADDRESSES indicates read or write address data output from a microprocessor to a bus. BS# indicates the control signal indicating the start of a bus cycle (for latching address data obtained from logic of this signal and CLK). DATA indicates read (write) data, DC# indicates a signal showing the effectiveness of read data (or completion of writing write data). Here, # indicates negative logic.

In this example, one (1) cycle (a basic cycle) is set to two (2) clock ($T_1$ and $T_2$) durations. This is for preventing data in a read cycle from colliding with data in a write cycle on a bus (i.e., a bus conflict).

That is, the basic cycle comprising two (2) clock durations enables a series of operations to be executed in which a read (or write) address is sent to a bus, and a read (or write) address is latched at a change timing of the control signal BS# and read (or write) data are read (written).

Although a cache memory is an example of a memory capable of being read from and written to in such a high-speed basic cycle, a generic main memory operates more slowly than this. FIG. 2 shows an exemplary main memory completing a read (or write) cycle in four (4) clock durations. FIG. 2 does not show a cache memory for explanatory convenience.

FIG. 3 is a timing chart showing read and write operations with the configuration shown in FIG. 2. Although a basic cycle of a microprocessor is completed in two (2) clock durations ($T_1$ and $T_0$), because the basic cycle of a main memory requires four (4) clock durations, two (2) clock durations of wait cycles ($T_2a$ and $T_2b$) occur. Because the wait cycles interrupt the microprocessor operation, the speed of the microprocessor cannot be raised.

FIG. 4 schematically shows a prior art example for solving this problem.

In this example, the address space of a main memory is split into a plurality of divisions, and each division (called a bank) is used.

Here, a bank has a W X D address space, where W corresponds to a block length having a predetermined data width (e.g. sixty-four (64) bits or thirty-two (32) bits), D corresponds to a block number, and an address of a block positioned at a height which is the same as that of a neighboring bank is sequential.

That is, by sequencing from the address in the least significant bit (LSB) to that in the most significant bit (MSB) for the main memory consisting of two (2) such banks, an access is made sequentially from the LSB block of $BANK_0 \to$ the LSB block of $BANK_1 \to$ the next bit block of $BANK_0 \to$ the next bit block of $BANK_1 \to$ the next bit block of $BANK_0 \to$ the next bit block of $BANK_1 \to$ ... the MSB block of $BANK_0 \to$ the MSB block of $BANK_1$.

FIG. 5 is a bus timing chart of the pipelines shown in FIG. 4.

Use of a main memory split into banks enables a "pipeline" operation to be performed as follows.

In FIG. 5, by repeatedly outputting address data ($BANK_0$ address) designating a desired address in $BANK_0$ and address data ($BANK_1$ address) designating a desired address in $BANK_1$ alternately for each of the basic cycles $C_1$, $C_2$, $C_3$ ..., after an elapse of a number of cycles (number of prefetched addresses) produced by subtracting one (1) basic cycle from a total bank number, i.e., after basic cycle $C_2$, read (or write) data can be apparently obtained in each basic cycle.

Therefore, read data corresponding to the address of a basic cycle $C_i$ (where i=1, 2, ...) can be obtained in the next basic cycle $C_{i+1}$, and the operation of outputting address data and the operation of reading read data (or writing write data) can be parallelly executed.

As a result, a pipeline operation comprising a number of stages equal to the bank number is made possible, thereby enabling a main memory inferior in speed to a cache memory to be used as expeditiously as a cache memory.

However, such a conventional memory access device has a configuration such that the number of prefetched addresses is determined from a bank number and an address pipeline having an equal number of stages (e.g., a four (4) stage pipeline for a bank number four (4)) is executed. Thus, the conventional memory access device has the problem that an address pipeline fails to be executed due to successive accesses to the same bank (1) when an address is created by a stride value or (2) when an address is created by an indirect address.

Generally, a scientific or technical calculation program often performs the same operations for a large number of data elements. The following vector processing routine shows a typical example, which is described in a FORTRAN expression.

| | |
|---|---|
| STEP 001 | DO LABEL I = 1, 100 |
| STEP 002 | C(I)=A(I) + B(I) |
| STEP 003 | F(I)=D(I) * E(I) |
| STEP 004 | LABEL CONTINUE |

In the above routine, the DO loop is continued from STEP 001 to STEP 004 in the range of I (which is 1 through 100). While the value of I is updated, the operations are executed. For instance, the first operations are $$C(1)=A(1)+B(1)$$

$$F(1)=D(1)*E(1)$$

and the one-hundredth operations are $$C(100)=A(100)+B(100)$$

$$F(100)=D(100)*E(100).$$

Here, it takes an extremely large number of operands, such as A(1) through A(100), B(1) through B(100), D(1) through D(100), and E(1) through E(100), to conclude the DO loop in this example. Therefore, an effective address creation is necessary to access these operands. The operand creation system such as (1) an address created by stride value or (2) an address created by an indirect address, described earlier is preferred for numerous operand accesses.

{1} An address creation system by a stride value

FIG. 6 is a conceptual view of a prior art consecutive operand array.

FIG. 7 is a conceptual view of a prior art operand array having equal intervals.

An address creation system by stride value is a creation system in which the distance from a preceding outputted address is expressed by a value alpha (called a stride value) which is an integer times an operand length L (a predetermined address width, e.g., thirty-two (32) bits or sixty-four (64) bits, also referred to as an operand unit). For example the "successive operand array" shown in FIG. 6 corresponds to alpha=1. That is, plural operands 0 through 4 succeeding from a benchmark base address are successively accessed from operand 0, then operand 1 . . . by sequentially generated addresses having a stride value "one (1)".

When alpha=n (where n≠±1), this corresponds to an "equal interval operand array" shown in FIG. 7. Plural operands 0 through 2 succeeding in equal intervals from a benchmark base address are successively accessed from operand 0, then operand 1 . . . by sequentially generated addresses having a stride value "(n)".

{2} An address creation system by an indirect address

FIG. 8 is a conceptual view of a prior art indirect operand array.

An address creation system by an indirect address is a system in which the distance from a base address (called an offset value in this system) is expressed as an integer times an operand L. While the address creation system by stride value, described above, has a common stride value for all operands, the address creation system by indirect address has an offset value specific to each operand. In FIG. 8, VR indicates an offset register. VR stores offset values "zero (0)" through "three (3)" for each operand to be accessed. Operand 0 is accessed based on the content of offset 0. Operand 1 is accessed based on the content of offset 1. These operations are repeated, thereby performing a memory access to an "indirect address array". An offset value changes dynamically during an address creation.

However, when an address is created by the above-described systems such that the bank number of addresses is indexed, there are cases in which pipeline interference (consecutive access to the same bank) may take place when the next condition is satisfied, for instance, when a bank width is equal to an operand unit while a bank number is equal to a stride value.

FIG. 9 is a diagram showing an access state occurring in the prior art, where the operand unit and bank width are both sixty-four (64) bits and the bank number and stride values are both four (4).

FIG. 10A shows access states occurring in the prior art in which both the operand unit and the bank width are sixty-four (64) bits and in which both the bank number and the stride values are two (2). The hatching part in FIGS. 9 and 10A shows operands to be accessed (op1, op2, op3), which belong to the same bank ($BANK_0$).

Therefore, because an address prefetching invites an address interference among op1, op2 and op3, there is a disadvantage that a normal pipeline operation cannot be performed in either the case shown in FIG. 9 or that shown in FIG. 10A.

FIG. 10B shows a case in which the operand unit (thirty-two (32) bits) is different from the operand unit shown in FIG. 10A (sixty-four (64) bits). Because op1, op2 and op3 can be accessed by switching banks, there is no such address interference.

Thus, the present invention aims at preventing a pipeline operational inconvenience from occurring by avoiding an address interference through flexibly setting a pipeline stage number irrespective of a physical bank number.

SUMMARY OF THE INVENTION

It is an object of the present invention to prevent a pipeline operational inconvenience from occurring by avoiding an address interference through flexibly setting a pipeline stage number irrespective of a physical bank number.

The address spaces of a main memory are partitioned in equal intervals of a predetermined data width to form blocks of memory. N memory banks are configured by addresses connecting the partitioned blocks. The banks store operands each having a length of the predetermined data width or a length of half the predetermined data width. Data accesses are executed in a pipelined form in a distance corresponding to an integer times the length of the operand. The memory access device comprises a pipeline stage number setting means for setting the pipeline stage number based on the operand length, the predetermined data width, the value of an integer times and the number of banks.

BRIEF DESCRIPTION OF THE DRAWINGS

One skilled in the art can easily understand additional features and objects of this invention from the description of the preferred embodiments and the attached drawings. In the drawings:

FIG. 15 is a diagram showing a bank number notification in accordance with the preferred embodiment of the present invention;

FIG. 16 is a diagram showing a pipeline stage number combination in which operand lengths are sixty-four (64) bits in accordance with the preferred embodiment;

FIG. 17 is a diagram showing a pipeline stage number combination in which operand lengths are thirty-two (32) bits in accordance with the preferred embodiment;

FIGS. 24A–24C are an access conceptual view of sixty-four (64) bit operands for an address creation system by an indirect value in accordance with the preferred embodiment;

DESCRIPTION OF THE PREFERRED EMBODIMENT

Figure 11:
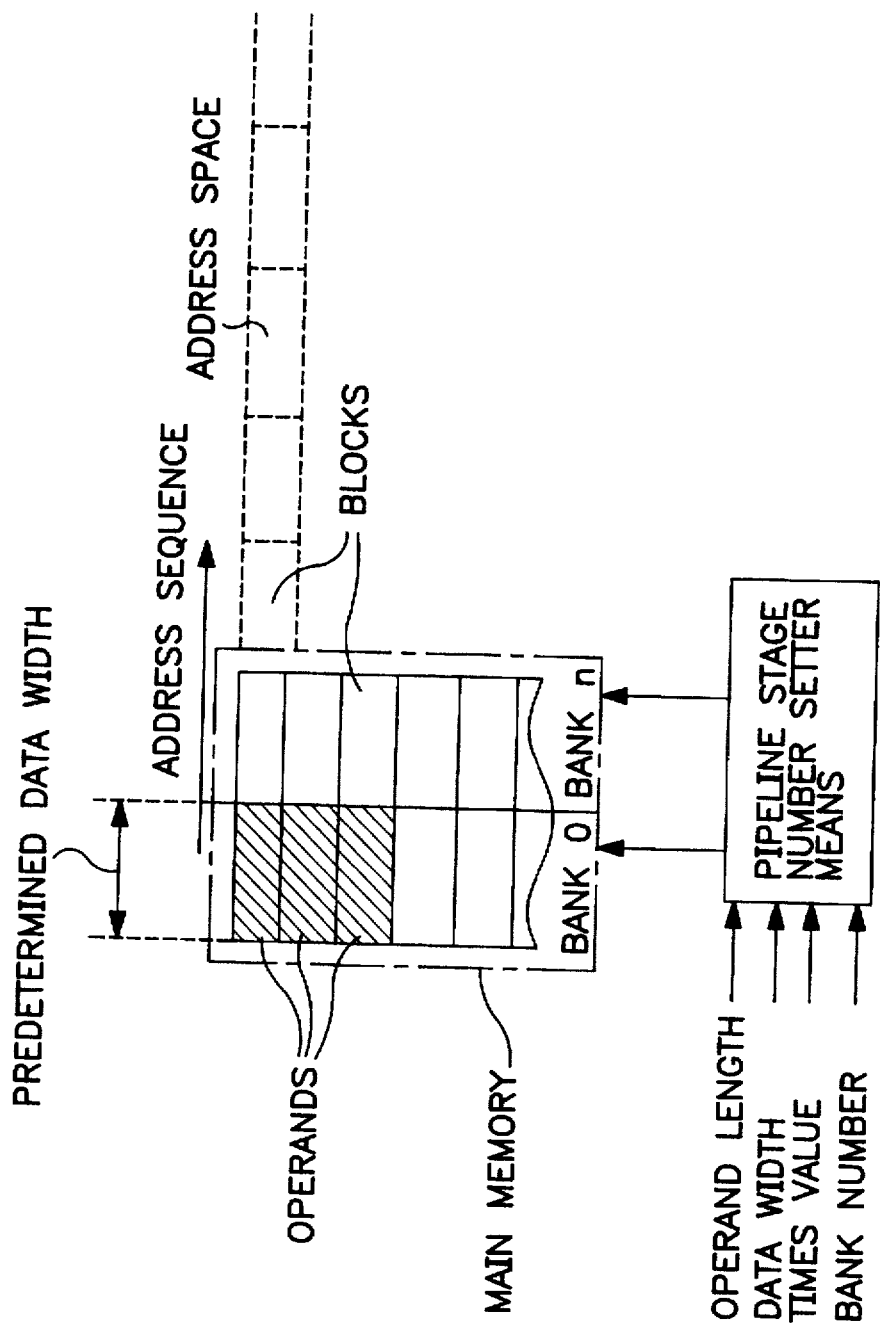
FIG. 11 is a block diagram illustrating a preferred embodiment of the present invention.

FIG. 11 is a block diagram of a preferred embodiment of the present invention.

As shown in FIG. 11, to achieve the above object, the preferred embodiment of the present invention provides a memory access device as described below. The address spaces of a main memory are partitioned in equal intervals having a predetermined data width to form blocks of memory. N memory banks are configured by addresses connecting the partitioned blocks. The n banks store operands each having a length of the predetermined data width or a length of half the predetermined data width. Data accesses are executed in a pipelined manner in a distance corresponding to an integer times the length of the operand. The memory access device comprises a pipeline stage number setting means for setting the pipeline stage number, based on the operand length, the predetermined data width, the value of an integer and the number of the banks.

The present invention prevents a pipeline operational inconvenience from occurring by avoiding an address interference through flexibly setting a pipeline stage number regardless of a physical bank number, even when address creation successively accesses the same bank.

A first embodiment of the present invention is described with reference to the attached drawings.

Figure 12:
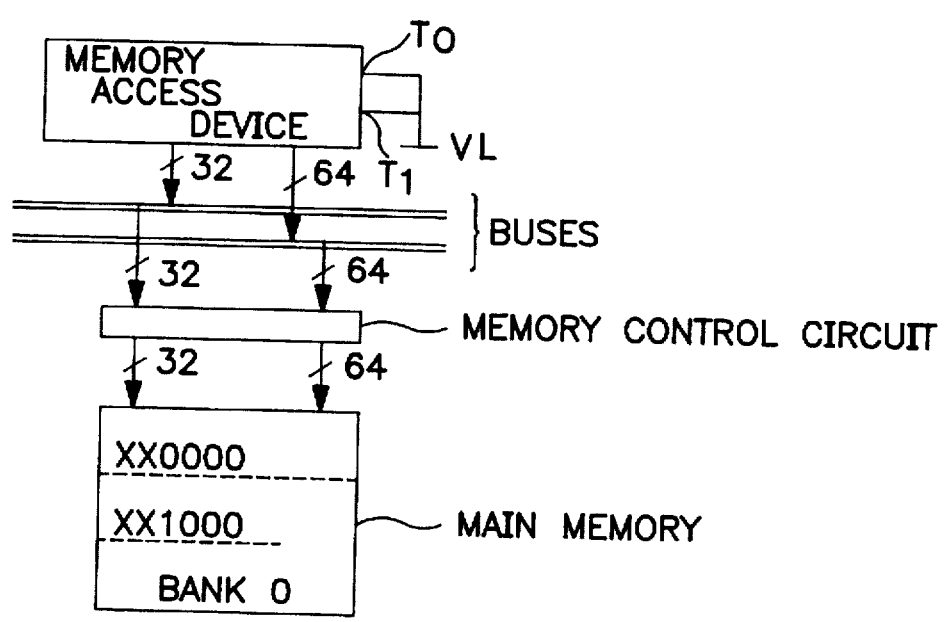
FIG. 12 shows a conceptual structure of a bank number one (1) in accordance with the preferred embodiment of the present invention.
Figure 13:
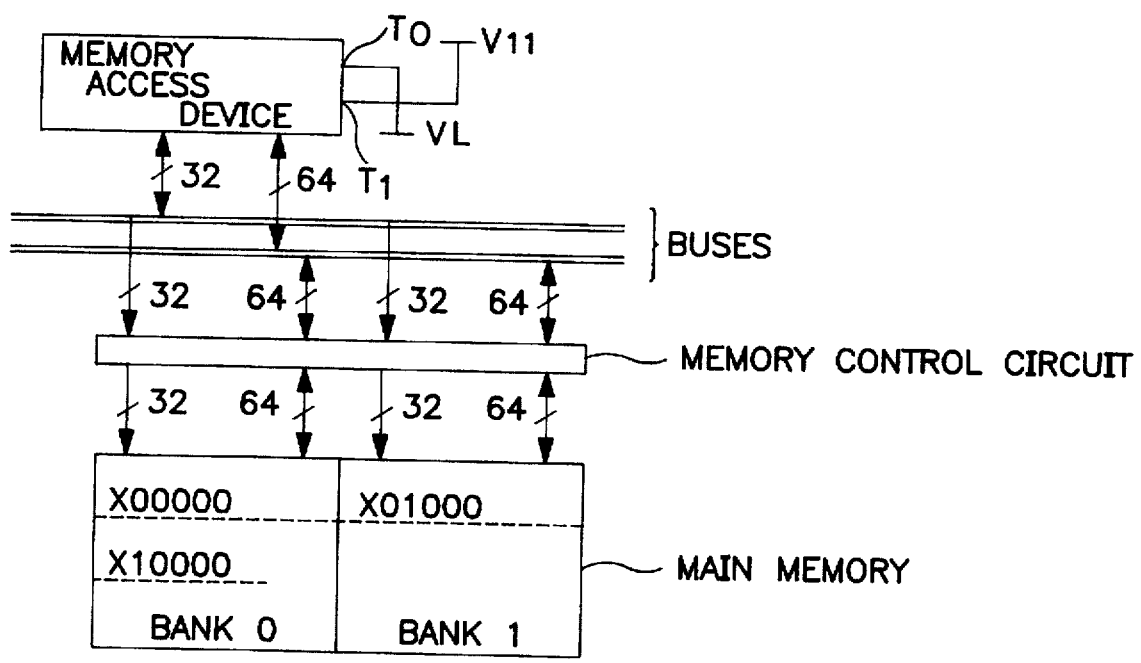
FIG. 13 shows a conceptual structure of a bank number two (2) in accordance with the preferred embodiment of the present invention.
Figure 14:
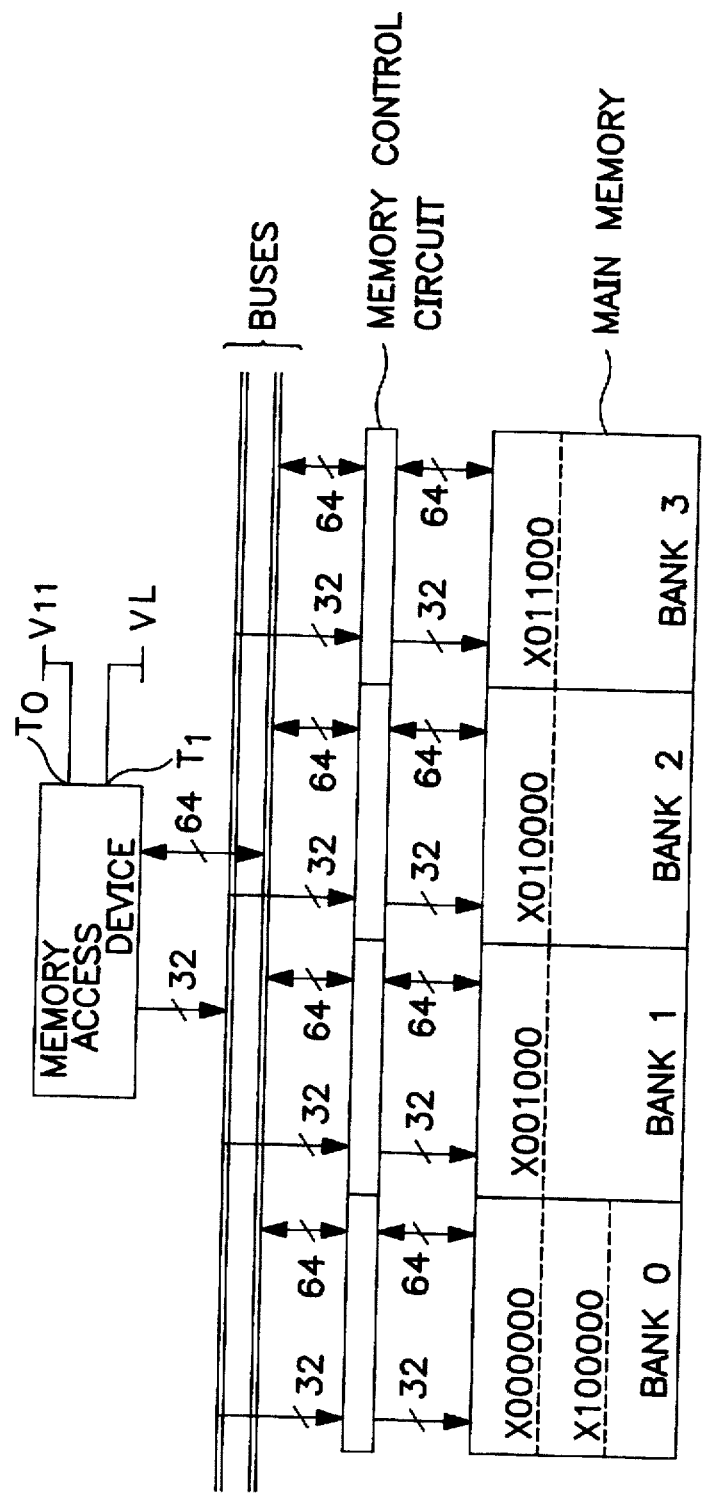
FIG. 14 shows a conceptual structure of a bank number four (4) in accordance with the preferred embodiment of the present invention.

The principle of the first embodiment is described as follows. FIGS. 12, 13 and 14 show exemplary pipelines in which the "physical" pipeline stages are "one (1)", "two (2)" and "four (4)", respectively. The bank numbers respectively correspond to the number of physical pipeline stages, except when a predetermined condition is satisfied. That is, the configuration shown in FIG. 12 illustrates a main memory comprising one (1) bank (BANK$_0$), the configuration shown in FIG. 13 illustrates a main memory comprising two (2) banks (BANK$_0$ and BANK$_1$), and the configuration shown in FIG. 14 illustrates a main memory comprising four (4) banks (BANK$_0$, BANK$_1$, BANK$_2$ and BANK$_3$).

Each of these main memories is connected to a memory access device such as a microcontroller through a memory control circuit, an address bus and a data bus. The memory access device comprises external terminals T$_0$ and T$_1$ (the terminals T$_0$ and T$_1$ serve to set the bank number) or notifying a bank number, such that the bank number of a main memory can be notified from a point external to the memory access drive. FIG. 15 is a chart showing the relation between a bank number and a setting of the external terminals T$_0$ and T$_1$. By selectively connecting each of the terminals T$_0$ and T$_1$ to a high-voltage power source V$_H$ (V$_H$ corresponds to a logic 1) or a low voltage power source V$_L$ (V$_L$ corresponds to a logic 0), four (4) kinds of bank numbers (2$^0$=bank number 1, 2$^1$=bank number 2, 2$^2$=bank number 4, and 2$^3$=left as a reserve) are expressed in two (2) bit data.

When an address creation system by a base address or a stride value is applied to a main memory, the earlier described inconvenience may arise.

In accordance with the preferred embodiment, an apparent bank number (hereafter referred to as a logic bank number) for a memory access device is calculated from "a bank number of a main memory", "a stride value" and "an operand length", and the pipeline stage number corresponding to this logic bank number is set for each address creation system.

{1} An address creation system by a stride value

FIGS. 16 and 17 illustrate the set pipeline numbers in which operand lengths are sixty-four (64) bits and thirty-two (32) bits, respectively. The bank numbers (one (1), two (2) and four (4)) in FIGS. 16 and 17 are physical bank numbers in a main memory. The number of set pipeline stages corresponds to a logical bank number.

The number of pipeline stages set for a sixty-four (64) bit operand is explained by referring to FIG. 16.

When a physical bank number is one (1), a virtual bank number is also one (1). Therefore, the pipeline stage numbers are all set to one (1). When a physical bank number is two (2), the pipeline stage number is set to either one (1) or two (2) according to the one (1) LSB of a stride value. More concretely, when the LSB is zero (0), the pipeline stage number is set to one (1); and when the LSB is one (1), the pipeline stage number is set to two (2). That is, one (1) stage is set when the stride value is even, and two (2) stages are set when the stride value is odd.

When a physical bank number is four (4), the pipeline stage numbers are set to one (1), two (2) or four (4) according to the two (2) LSBs of a stride value. More concretely, when the LSBs are a "double zero (00)", one (1) stage is set; when the LSBs are "one zero (10)", two stages are set; and at all other times, i.e., when the LSBs are "zero one (01)" or "double one (11)", four (4) stages are set.

The number of pipeline stage numbers set for a thirty-two (32) bit operand is explained by referring to FIG. 17.

When a physical bank number is one (1), a virtual bank number is also one (1). Therefore, the pipeline stage numbers are all set to one (1). When a physical bank number is two (2), the pipeline stage number is set basically to either one (1) or two (2) according to the two (2) LSBs of a stride value. Here, however, the case of a consecutive operand array (stride value=±1) is treated as an exception, because two (2) sets of thirty-two (32) bit operands enable sixty-four (64) bits to be accessed.

More concretely, when the LSB is one (1) or the two (2) LSBs are "double zero (00)", the pipeline number stage is set to one (1), unless the stride value is ±1. Also, when the two (2) LSBs are "one zero (10", the pipeline stage number is set to two (2), if the stride value is ±1.

When a physical bank number is four (4), the number of pipeline stages is set to "one (1)", "two (2)" or "four (4)" according to the three (3) LSBs of a stride value. Here, however, the case of a consecutive operand array (stride value=±1) is treated as an exception, because two (2) sets of thirty-two (32) bit operands enable sixty-four (64) bits to be accessed.

More concretely, when the three (3) LSBs are a "triple zero (000)" or the one (1) LSB is "one (1)", one (1) stage is set, unless the stride value is ±1. Also, when the three (3) LSBs are a "one double zero (100)", two (2) stages are set, unless the stride value is ±1. Finally, when the two (2) LSBs are a "one zero (10)", four (4) stages are set, if the stride value is ±1.

Figure 18C:
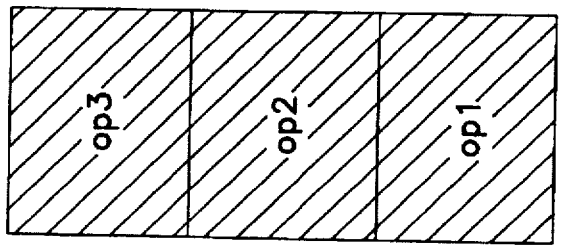
FIGS. 18A–18C are an access conceptual view of sixty-four (64) bit operands and bank number one (1) in accordance with the preferred embodiment.
Figure 18B:
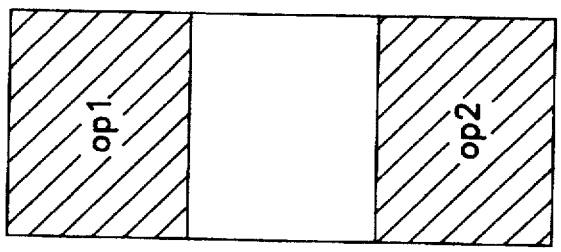
Figure 18A:
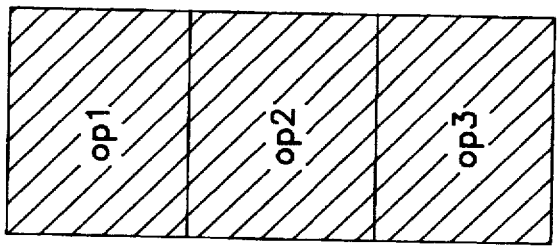
Figure 19C:
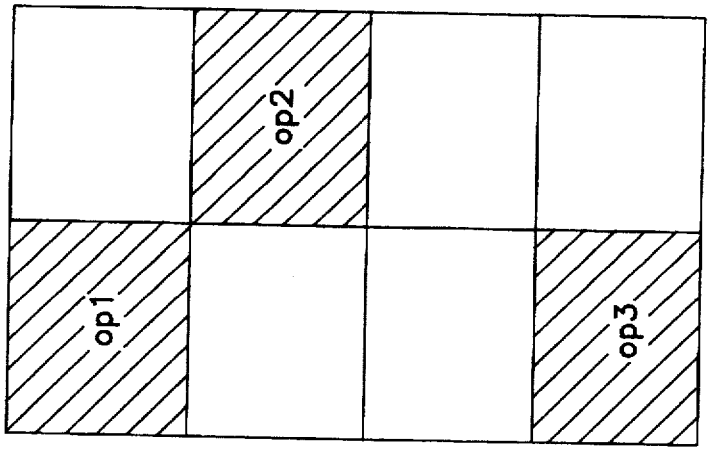
FIGS. 19A–19C are an access conceptual view of sixty-four (64) bit operands and bank number "two (2)" in accordance with the preferred embodiment.
Figure 19B:
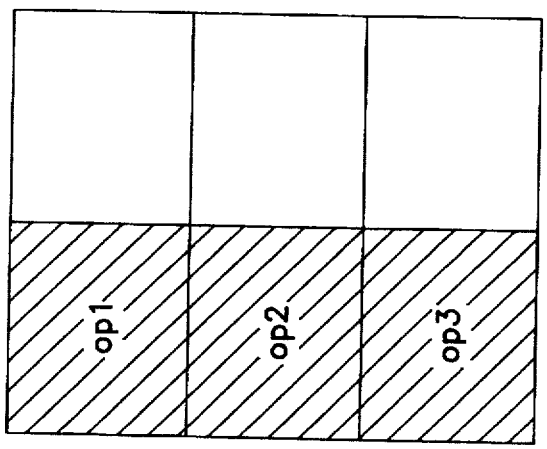
Figure 19A:
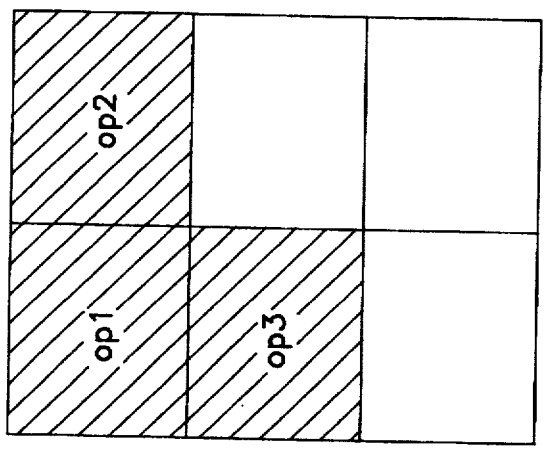
Figure 20A:
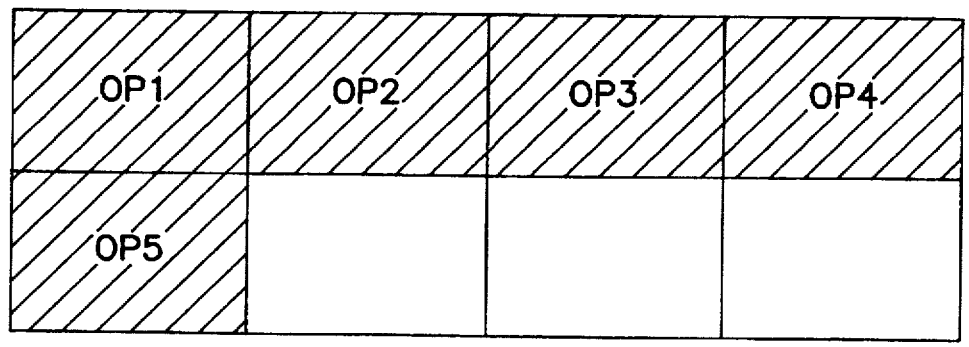
FIGS. 20A–20D are an access conceptual view of sixty-four (64) bit operands and bank number "four (4)" in accordance with the preferred embodiment.
Figure 20B:
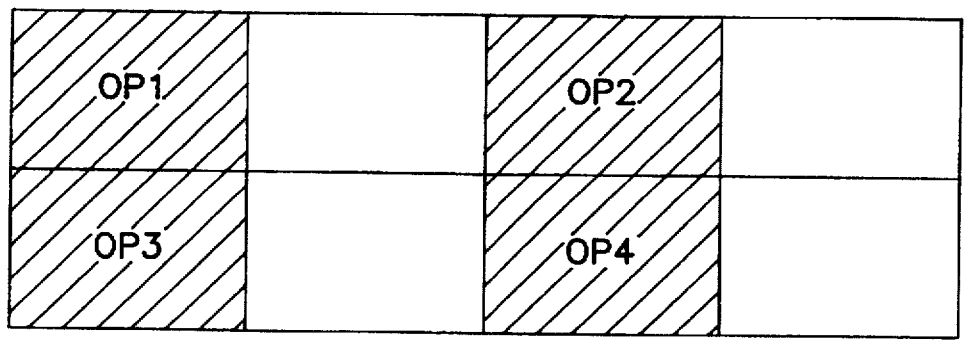
Figure 20C:
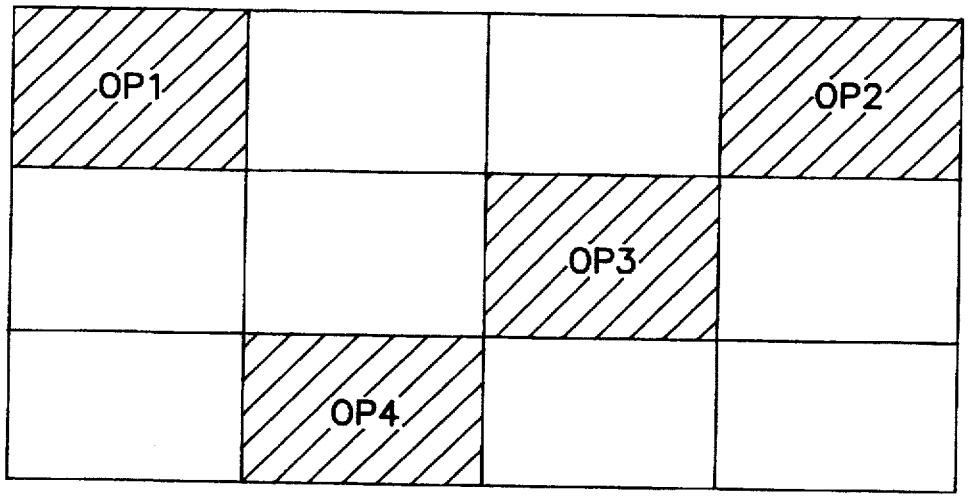
Figure 20D:
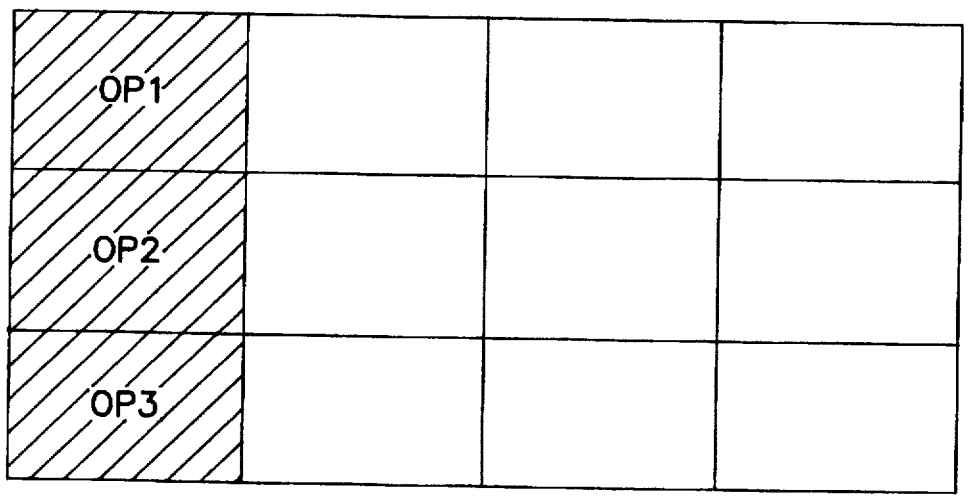

FIGS. 18 through 23 show the models of address pipelines set according to the above conditions. FIGS. 18, 19 and 20 correspond to the case of sixty-four (64) bit operands (refer to FIG. 16). FIGS. 21, 22 and 23 correspond to the case of thirty-two (32) bit operands (refer to FIG. 17).

In FIGS. 18 through 23, hatching declining to the left expresses an output address, and hatching declining to the left and right expresses an operand to be accessed.

When the physical bank number is one (1) in FIGS. 18A–18C, the set pipeline stage number is fixed at one (1). When the physical bank number is two (2) in FIGS.

19A–19C, the set pipeline stage number is selected between one (1) and two (2) according to a stride value. When the physical bank number is four (4) in FIGS. 20A–20D, the set pipeline stage number is selected from between one (1), two (2) and four (4) according to a stride value. These are the cases of sixty-four (64) bit operands.

Figures 21A, 21B, 21C:
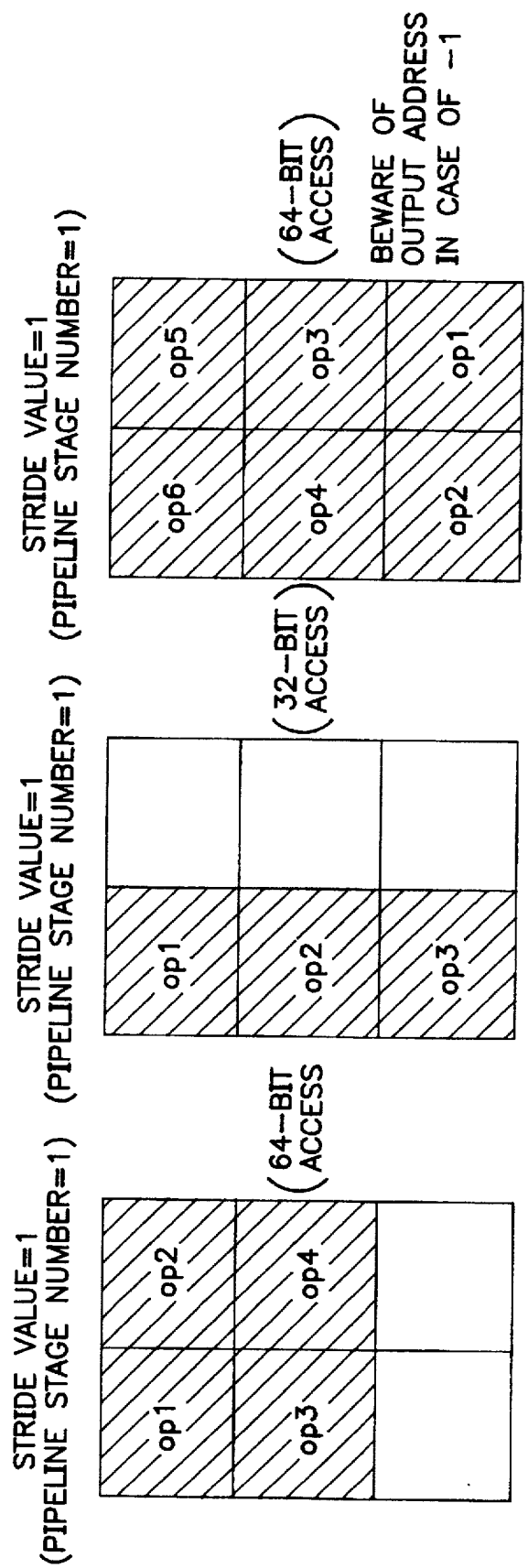
FIGS. 21A–21C are an access conceptual view of thirty-two (32) bit operands and bank number "one (1)" in accordance with the preferred embodiment.
Figure 22A:
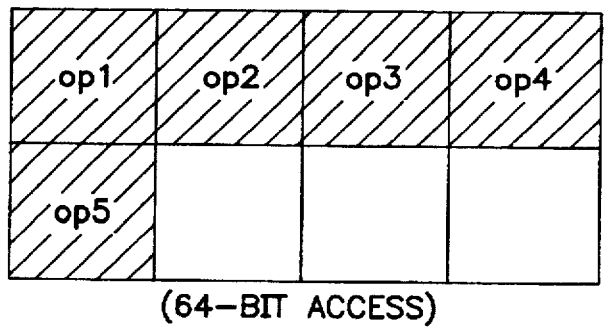
FIGS. 22A–22C are an access conceptual view of thirty-two (32) bit operands and bank number "two (2)" in accordance with the preferred embodiment.
Figure 22B:
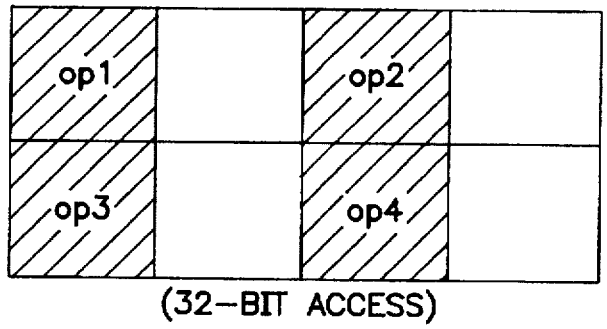
Figure 22C:
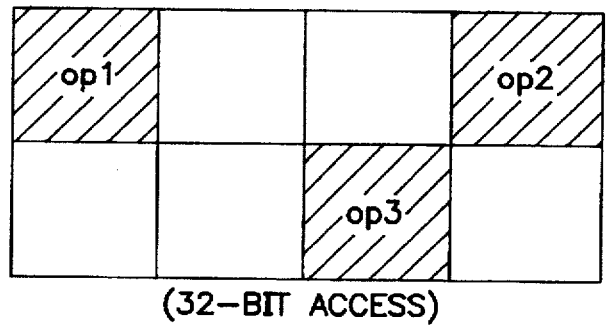
Figure 23A:
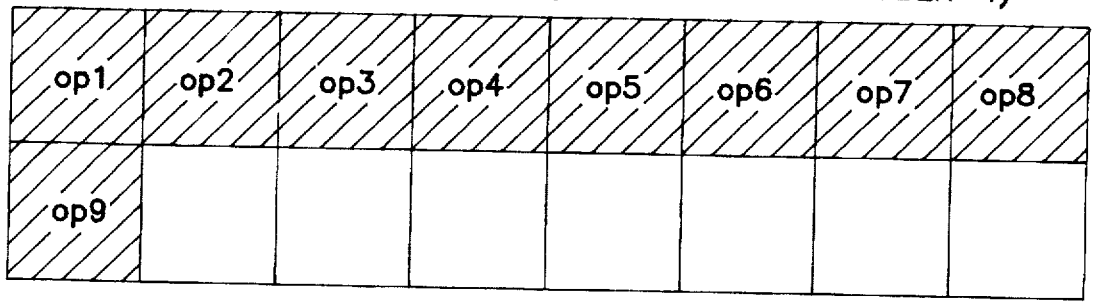
FIGS. 23A–23D are an access conceptual view of thirty-two (32) bit operands and bank number "four (4)" in accordance with the preferred embodiment.
Figure 23B:
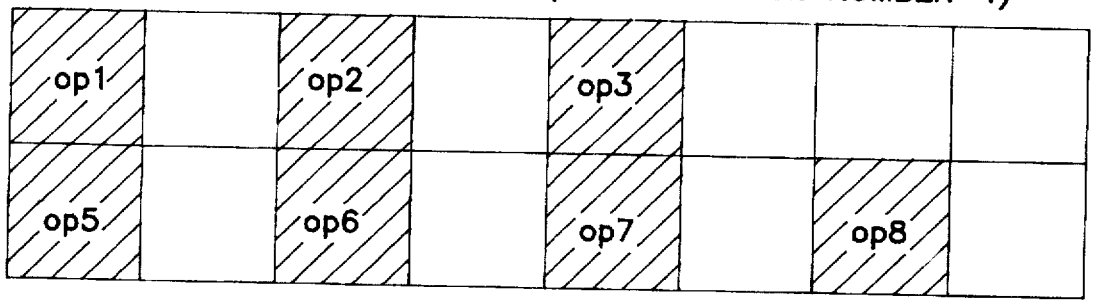
Figure 23C:
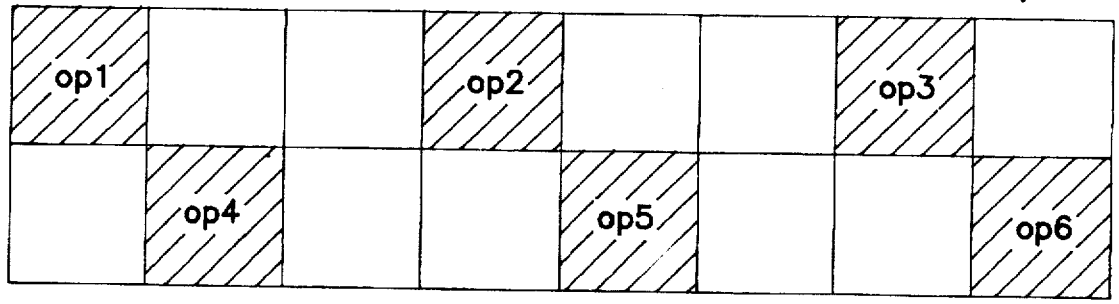
Figure 23D:
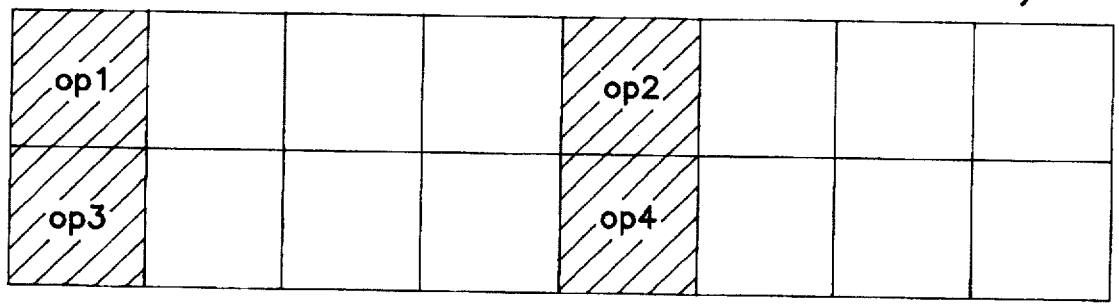

When the physical bank number is one (1) in FIGS. 21A–21C, the set pipeline stage number is fixed at one (1), both for a stride value of one (1) and a sixty-four (64) bit access, and for a stride value of two (2) and a thirty-two (32) bit access. When the physical bank number is two (2) in FIGS. 22A–22C, the set pipeline stage numbers are fixed at two (2), both for a stride value being one (1) and a sixty-four (64) bit access, and for a stride value of two (2) and a thirty-two (32) bit access. Also, when the physical bank number is two (2) in FIGS. 22A–22C, the set pipeline stage number is fixed at one (1), for a stride value of three (3) and a thirty-two (32) bit access. When the physical bank number is four (4) in FIGS. 23A–23D, the set pipeline stage numbers are fixed at four (4), both for a stride value of one (1) and a sixty-four (64) bit access, and for a stride value of two (2) and a thirty-two (32) bit access. Also, when the physical bank number, is four (4) in FIGS. 23A–23D, for a thirty-two (32) bit access, the set pipeline stage numbers are fixed at one (1) if the stride value is three (3) or at two (2) if the stride value is four (4). These are the cases of thirty-two (32) bit operands.

{2} An address creation system by an indirect address

Figure 25A:
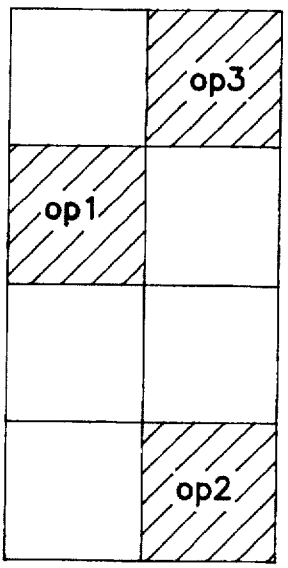
FIGS. 25A–25C are an access conceptual view of thirty-two (32) bit operands for an address creation system by an indirect value in accordance with the preferred embodiment.
Figure 25B:
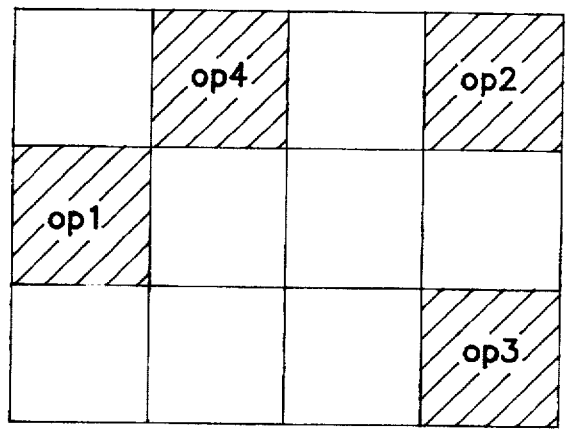
Figure 25C:
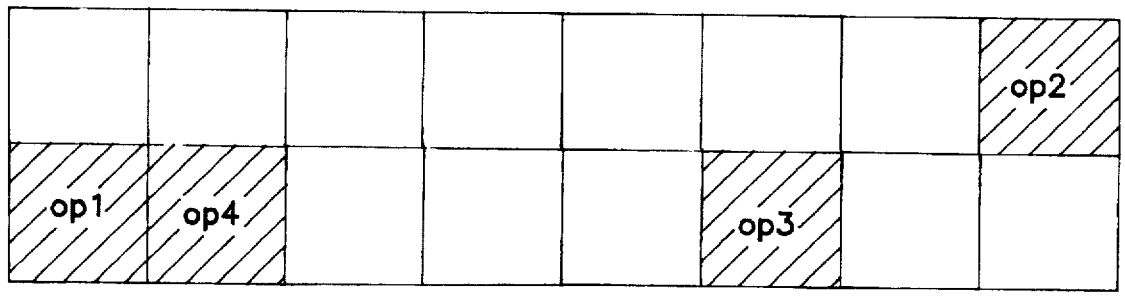

FIGS. 24 and 25 show the models of address creation according to a base address and an indirect value. As is apparent from FIGS. 24 and 25, this creation system has no regularity in an operand array (op1, op2, . . . ). Thus, it causes the number of prefetched addresses, i.e., the pipeline stage number, to be fixed at one (1), to enable a bank control circuit to latch an address.

To summarize the above, in accordance with the preferred embodiment an appropriate address pipeline stage number is flexibly set regardless of a physical bank number. Thus, the pipeline stage numbers are optimized (1) when an address creation is performed by using a stride value or (2) when an address creation is performed by an indirect address. As a result, an advantage is obtained such that a main memory inferior in speed to a cache memory can be used as expeditiously as a cache memory under all circumstances.

FIGS. 26 through 32 show a memory access device in accordance with the preferred embodiment of the invention.

The configuration is explained first.

Figure 26:
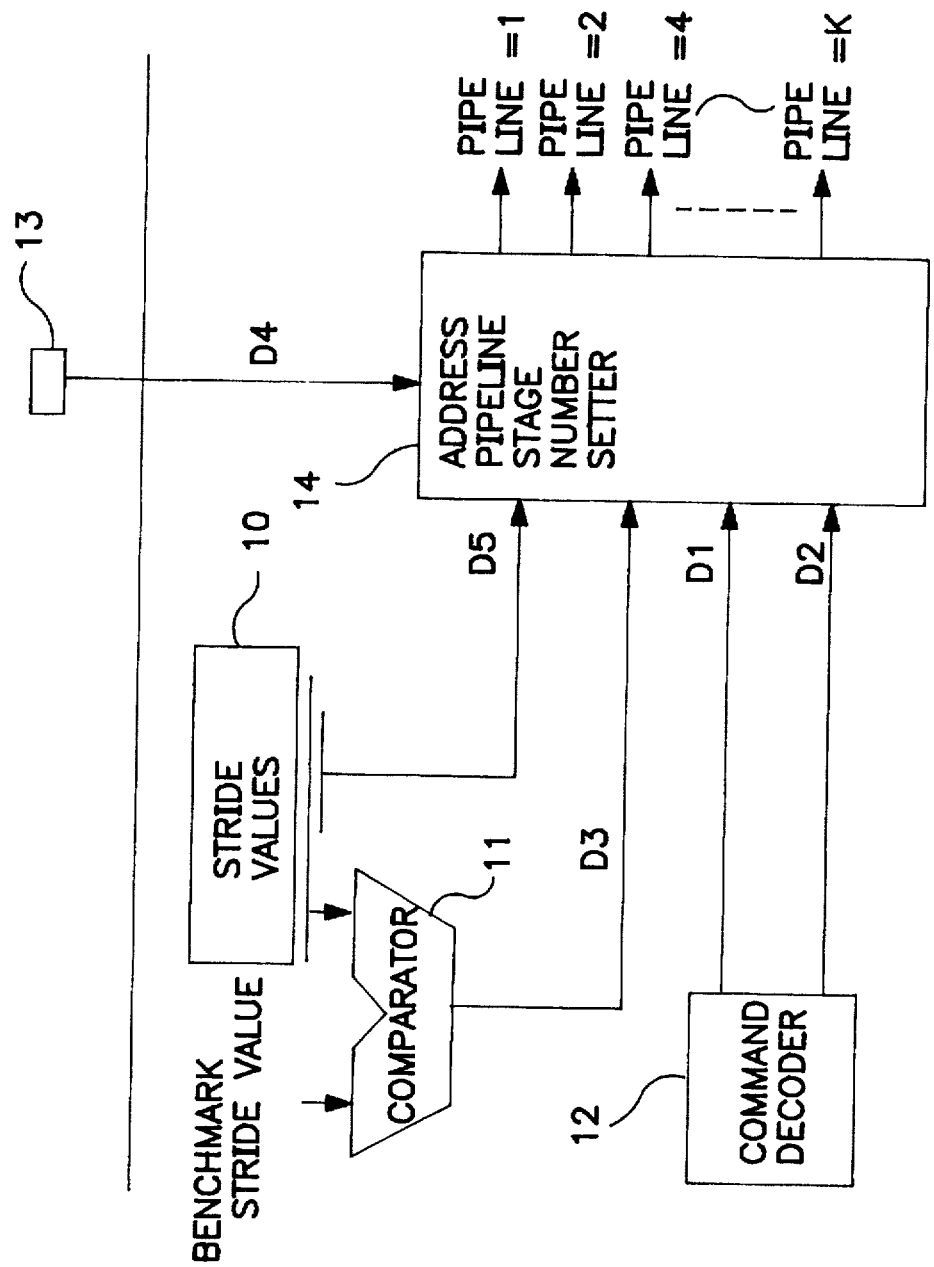
FIG. 26 is a block diagram of an address pipeline stage number setting circuit in accordance with the preferred embodiment of the present invention.

FIG. 26 is a block diagram of an address pipeline determining circuit comprising an address register 10, a comparator 11, a command decoder 12, an external terminal 13, and an address pipeline stage number setter (address pipeline stage number setting means) 14.

The address register 10 makes a notification of the n LSBs of a stride value. The comparator 11 judges a match/mismatch between a stride value from the address generating register 10 and a benchmark stride value (±1) representing a consecutive operand array. The command decoder 12 decodes a memory access command, and notifies a distinction between operand lengths (e.g., a distinction between sixty-four (64) bits and thirty-two (32) bits) and a distinction between address creation systems (a distinction between a creation system by a stride value and a creation system by an indirect value). The external terminal 13 notifies the physical bank number (BANK$_0$, BANK$_1$, . . . , BANK$_{m-1}$). The address pipeline stage number setter 14 selectively sets the pipeline stage number from among "one (1)" through "k" based on various pieces of notified information, which are information on the address creation system (D$_1$),
information on the operand length (D$_2$),
information on whether or not being a consecutive operand array (D$_3$),
information the physical bank number (D$_4$) and
information the n LSBs of a stride value (D$_5$).

Figure 27:
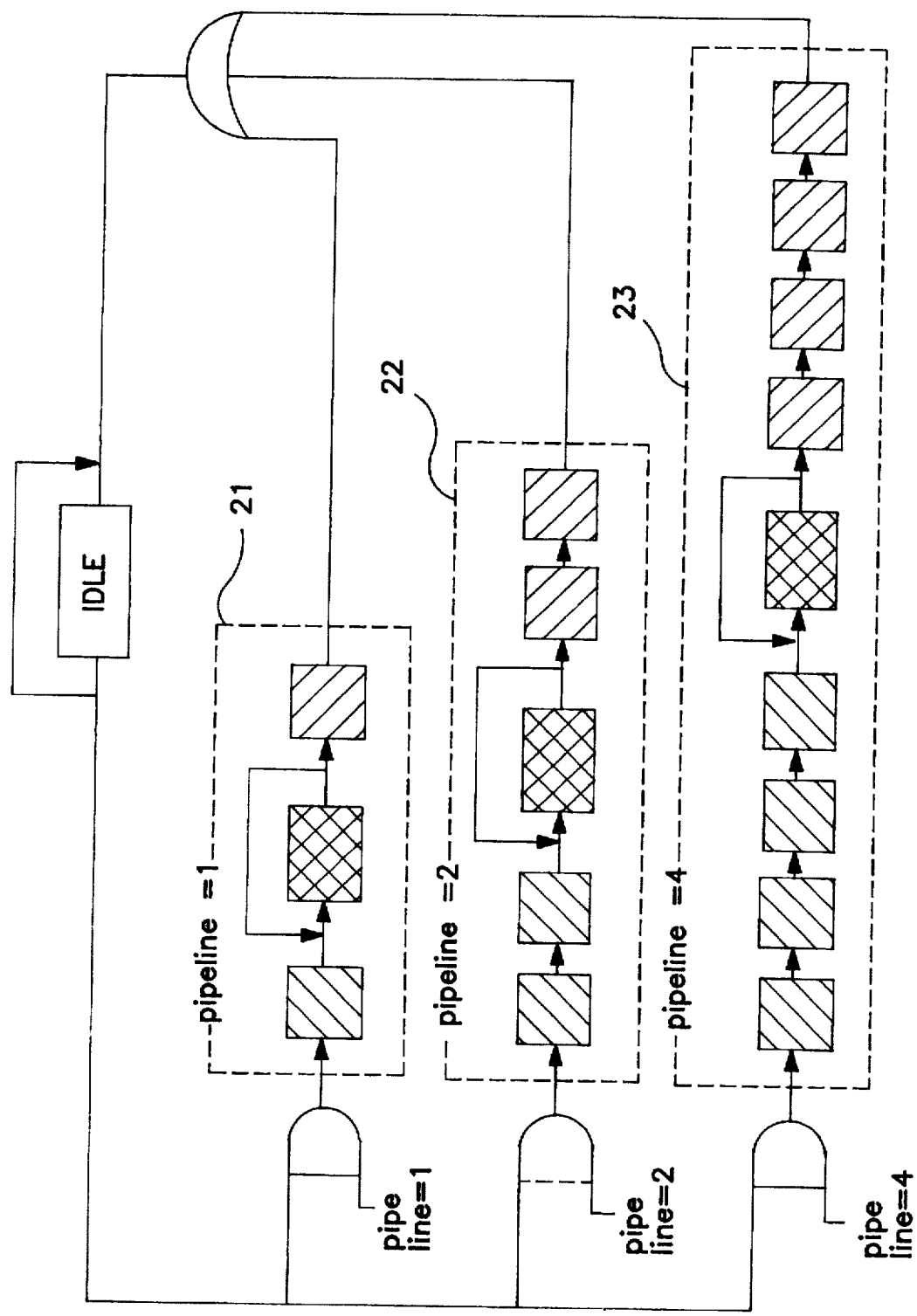
FIG. 27 is a conceptual view of a timing sequencer according to the preferred embodiment of the present invention.

FIG. 27 is a conceptual view of a timing sequencer according to the preferred embodiment. In FIG. 27, three (3) pipe lines 21, 22 and 23 correspond respectively to bank numbers one (1), two (2) and four (4). Each of the pipelines 21, 22 and 23 has an address prefetching part (with hatching declining to the left), an address/data processing part (with cross hatching) and pipeline stage number of data processing parts (with hatching declining to the right). The address prefetching part and the data processing part comprise one (1) or more units, corresponding to any of the pipeline stage numbers "one (1)", "two (2)" and "four (4)" set by the address pipeline stage number setter 14.

For instance, when the set pipeline stage number is four (4), because four (4) addresses are prefetched, there are four (4) address prefetching parts, one (1) address/data processing part for processing an address and data after first-outputting the address and before receiving a next memory access request, and four (4) data processing parts for processing four (4) prefetched data after there is no request.

Figure 28:
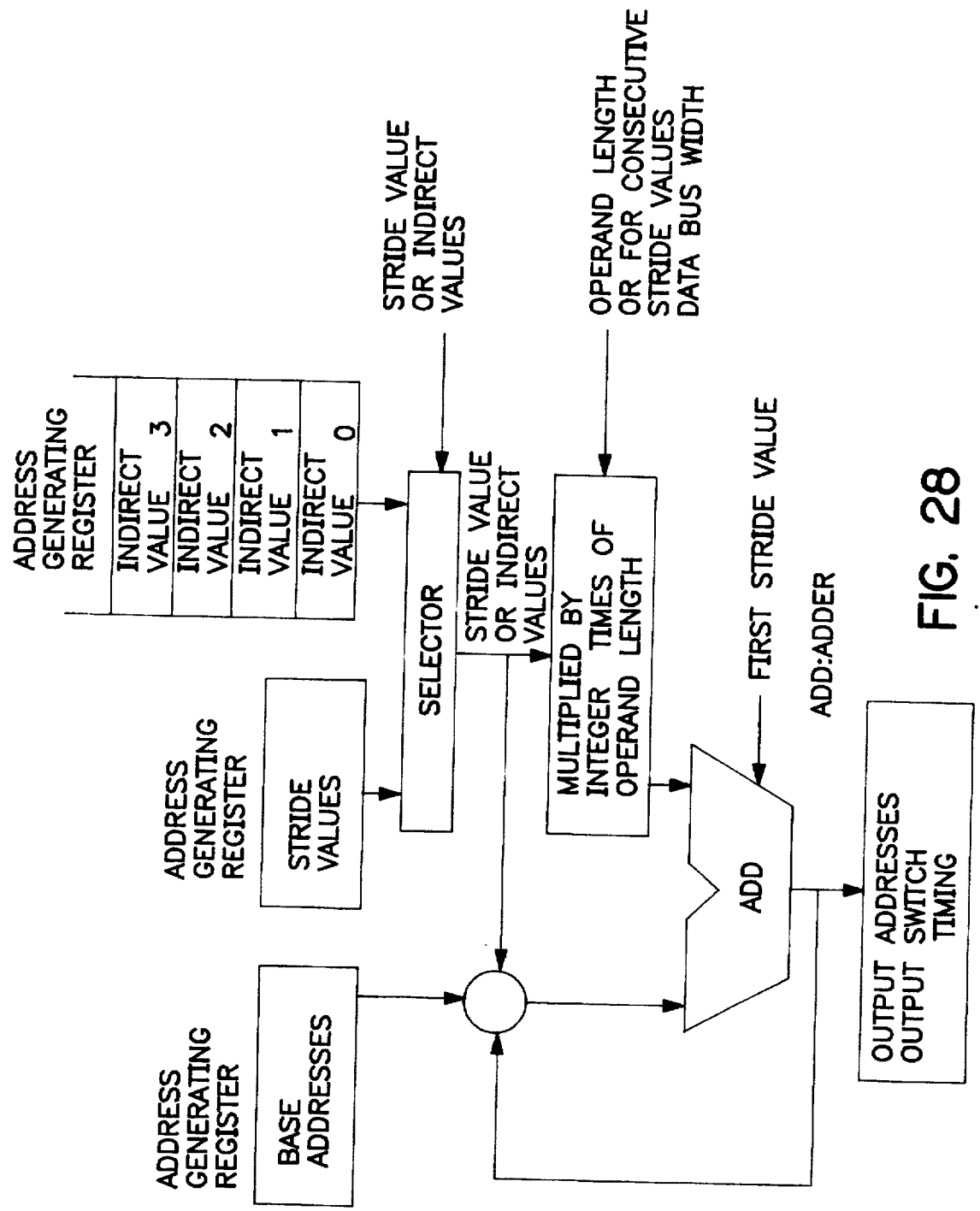
FIG. 28 is a block diagram of an address creation according to the preferred embodiment of the present invention.

FIG. 28 is a block diagram of an address creation system to which both "an address creation system by a stride value" and "an address creation system by an indirect value" are applied.

{1} The case of "an address creation system by a stride value"

A selector selects a "stride value". Ordinarily, the value obtained as a product between the stride value and the operand length is the "incremental value" to the base address. The incremental value is constant during an address creation. However, in case of a consecutive operand array, when the operand length is a half of an external data bus, an access in the data bus width is made possible, and the product obtained by multiplying the data bus width becomes the "incremental value" to the base address. Because there are cases in which only one (1) operand can be accessed for a particular starting address of a base address or a particular operand number, the incremental value changes dynamically.

Thus, the output address is created by a base address and an incremental value. Since the first output address is nothing but the base address itself, the adder (abbreviated as ADD) does not perform an addition. The second time and thereafter, with the output value from ADD being a base address, the incremental value created by the stride value is added.

{2} The case of "an address creation system by an indirect value"

A selector selects an "indirect value". The address creation number of indirect values are stored. The product values obtained by multiplying indirect values by an operand length become the "incremental values" to the base addresses. The incremental values constantly change during an address creation.

An output address is created by adding to a base address its "incremental value" each time. Here, this system does not feed back an output from ADD as in an address creation system by a stride value.

Figure 29:
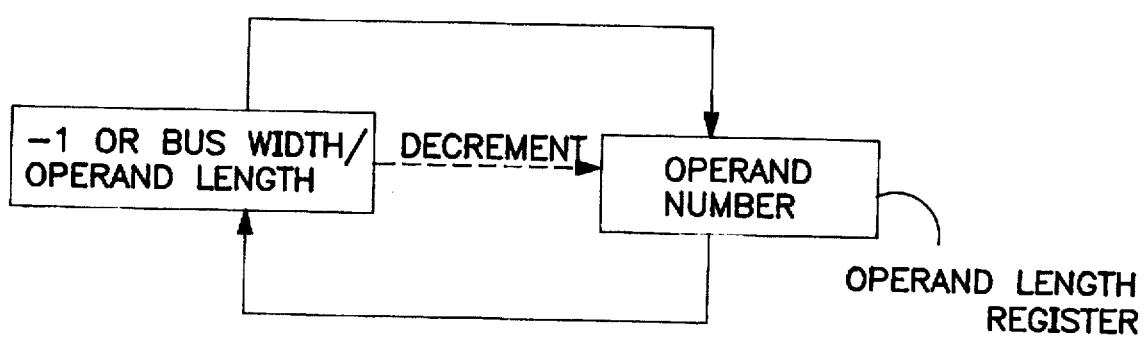
FIG. 29 is a conceptual view of an operand updating of an operand number register in accordance with the preferred embodiment of the present invention.

FIG. 29 is a conceptual view of an operand updating of an operand number register in accordance with the preferred embodiment.

Also, as shown in FIG. 29, in this embodiment, a register value for setting an operand number is decremented by one (1) each time a memory access is made. Alternatively, the access number in a single memory access is decremented in a batch in a case of a consecutive operand.

Figure 30:
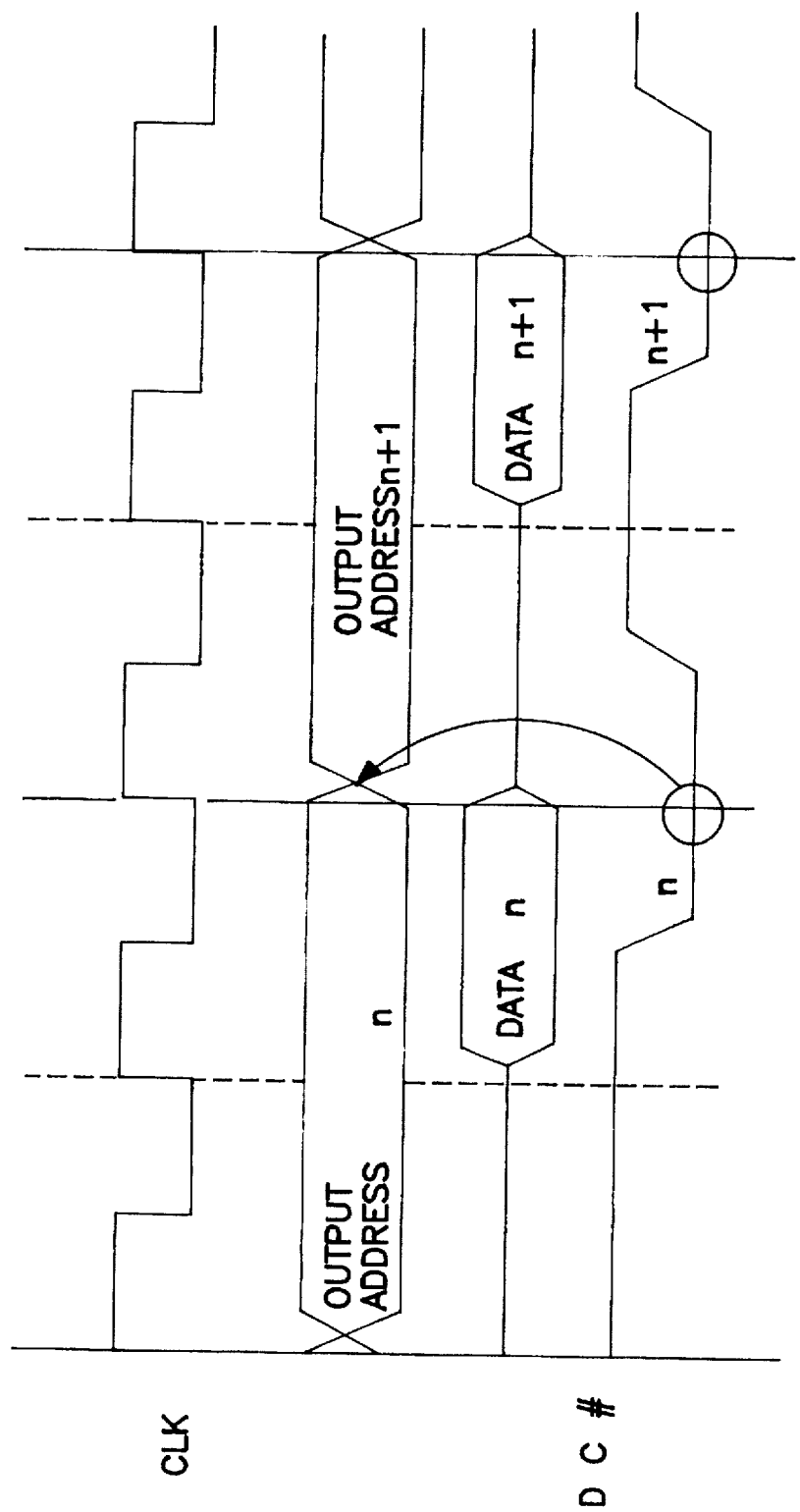
FIG. 30 is a timing chart in accordance with the preferred embodiment of the present invention.

FIG. 30 is a timing chart for the outputting of addresses created by the above-described two (2) address creation systems.

Generally, a system not prefetching an address defines an address switch timing by a receipt of a data processing consummation notice DC# for the output address. However, in the preferred embodiment, the addresses in the bank number of a main memory for a memory access device are outputted even before an address data processing.

Figure 31:
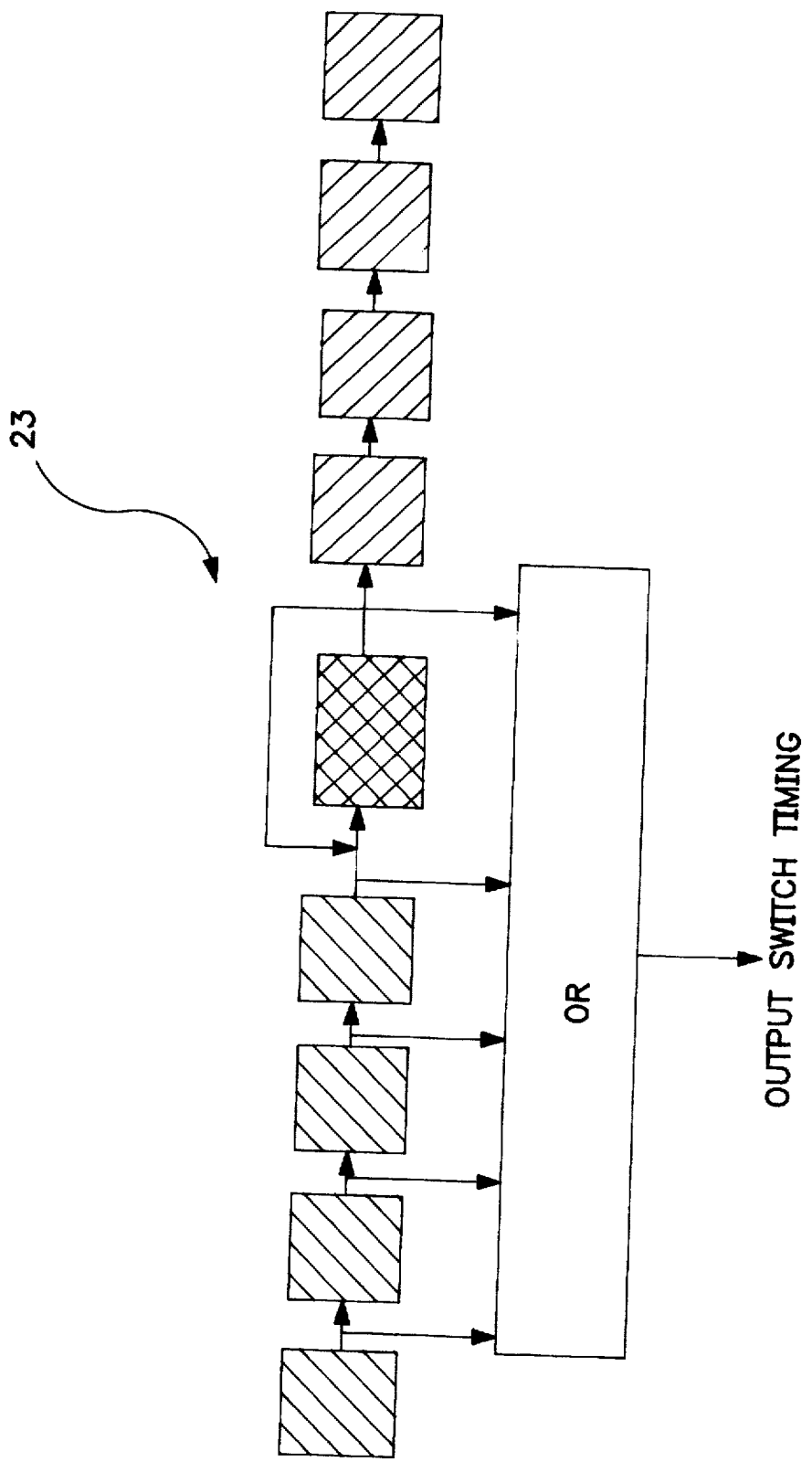
FIG. 31 is a conceptual view for generating a dummy DC# for an output switch timing in accordance with a preferred embodiment of the invention.

This only requires an address to be outputted in advance by giving a pipeline stage number predetermined by the address pipeline stage number setter 14, i.e., a number of a prefetched address, of dummy DC#s at an address switch timing. Then, the address needs to be switched in response to an actual DC#. FIG. 31 is a conceptual view for generating a dummy DC# for an output switch timing in accordance with the preferred embodiment of the invention. More specifically, FIG. 31 shows an example in which a dummy DC# needs to be generated for each address prefetching part for a selection timing sequencer.

Figure 32:
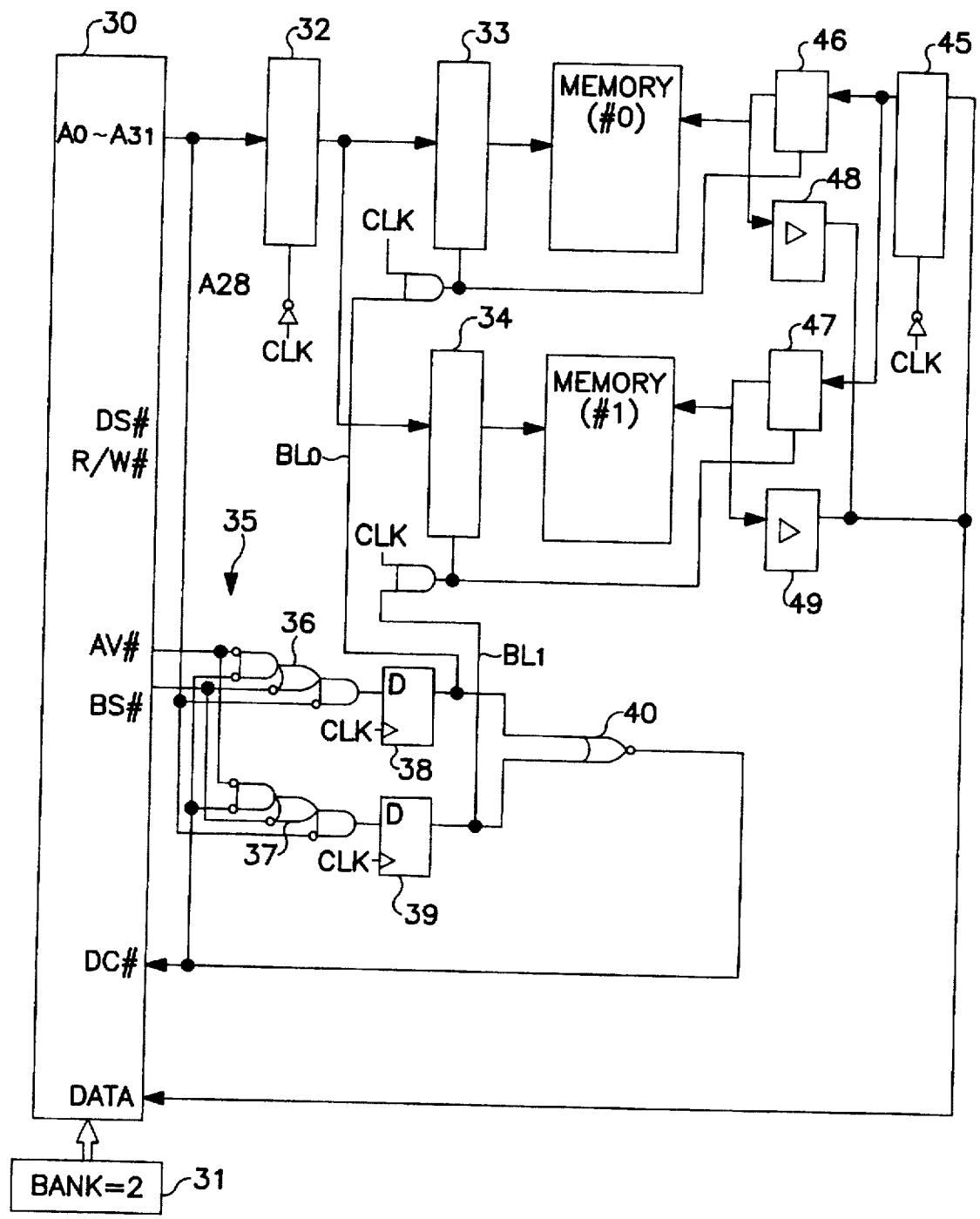
FIG. 32 is a diagram of a system configuration in accordance with the preferred embodiment of the invention.

FIG. 32 shows an exemplary system configuration in accordance with the preferred embodiment of the present invention. It shows an example of a case in which the bank number is two (2).

In FIG. 32, 30 is a microprocessor (memory access device), 31 is an input terminal for notifying the microprocessor 30 of a bank number. Either of the two (2) slave latches 33 and 34 in the bank number receives through a master latch 32 address data $A_0$ through $A_{31}$ from the microprocessor 30. The two (2) slave latches 33 and 34 receive from a latch signal generating circuit 35 a $BANK_0$ latch signal $BL_0$ and a $BANK_1$ latch signal $BL_1$, respectively. The latch signal generating circuit 35 comprises composite logical circuits 36 and 37 and flip-flops 38 and 39. Either of the outputs from the composite logical circuits 36 and 37 are of positive logic according to the logic of the fourth LSB ($A_{28}$) of address data, when both AV# and DC# are of negative logic or when BS# is of negative logic. Flip-flops 38 and 39 synchronize the positive logic output with a clock signal CLK. When the fourth LSB of address data is of negative logic, the output from composite logical circuit 36 on $BANK_0$ side becomes true. When the fourth LSB is of positive logic, the output from composite logical circuit 37 on $BANK_1$ side becomes "true".

That is, when address data specify $BANK_0$, if AV# and DC# are both of negative logic or if BS# is of negative logic, $BANK_0$ (#0) in the main memory is accessed by having slave latch 33 on $BANK_0$ side receive the address data. Also, when address data specify $BANK_1$, if AV# and DC# are both of negative logic or if BS# is of negative logic, $BANK_1$ (#1) in the main memory is accessed by having slave latch 34 on $BANK_1$ side receive address data. Here, 40 is a NOR gate for generating a DC#, 45 is a data master latch, 46 and 47 are data slave latches, and 48 and 49 are data buffers.

With this configuration, the address data immediately after initiating a pipeline operation are finalized at a master latch clock timing in an assertive state of BS#, at which time the slave latch on $BANK_0$ side (#0) or $BANK_1$ side (#1) sequentially receive the address data according to the logical level of the fourth LSB of the address. Also, the succeeding address data are finalized at a master latch clock timing in an assertive state of both AV# and DC#, at which time the slave latch on $BANK_0$ side (#0) or $BANK_1$ side (#1) sequentially receive the address data according to the logical level of the fourth LSB of the address.

Figure 33:
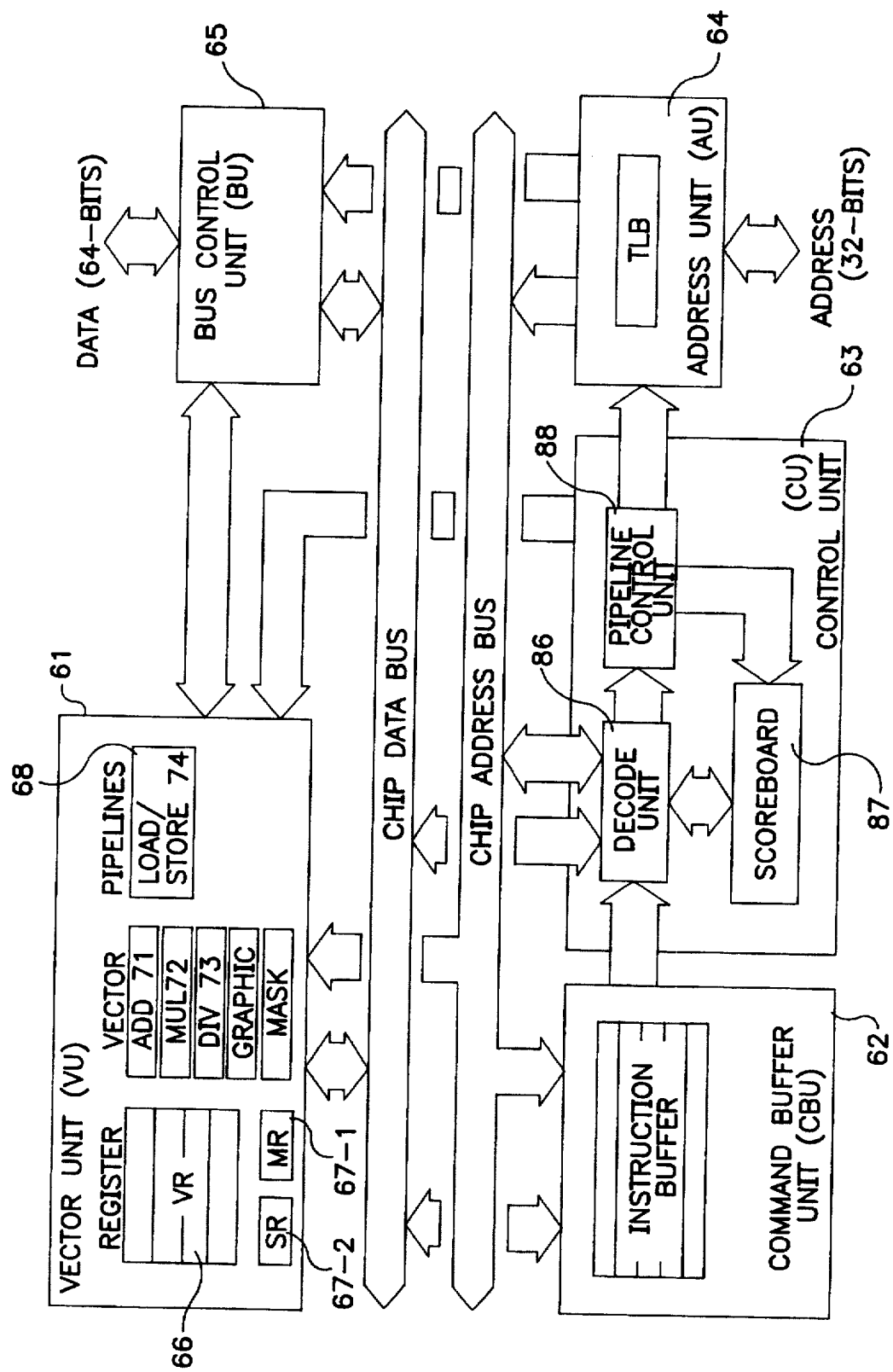
FIG. 33 is a functional block diagram of the microprocessor 30 shown in FIG. 32.

FIG. 33 is a functional block diagram of the microprocessor 30 shown in FIG. 32.

The microprocessor 30 shown in FIG. 33 is a vector processor unit (VPU) comprising a vector unit (VU) 61, a command buffer unit (CBU) 62, a control unit (CU) 63, an address unit (AU) 64 and a bus control unit (BU) 65.

The vector unit 61 for performing vector operations comprises a vector register (VR) 66 having four (4) banks B0, B1, B2 and B3, a mask register (MR) 67-1 of sixty-four (64) bytes, a scaler register (SR) 67-2, and vector pipelines 68. The vector pipelines 68 perform pipeline processes of an adder (ADD) 71, a multiplier (MUL) 72, a divider (DIV) 73, a graphic processor, a mask processor and a loader/storer 74. The vector unit 61 forms the essential part of the vector processor unit.

Operations of the address unit 64 comprising a translation lookahead buffer (ILB) are as shown in FIG. 18.

Figure 34:
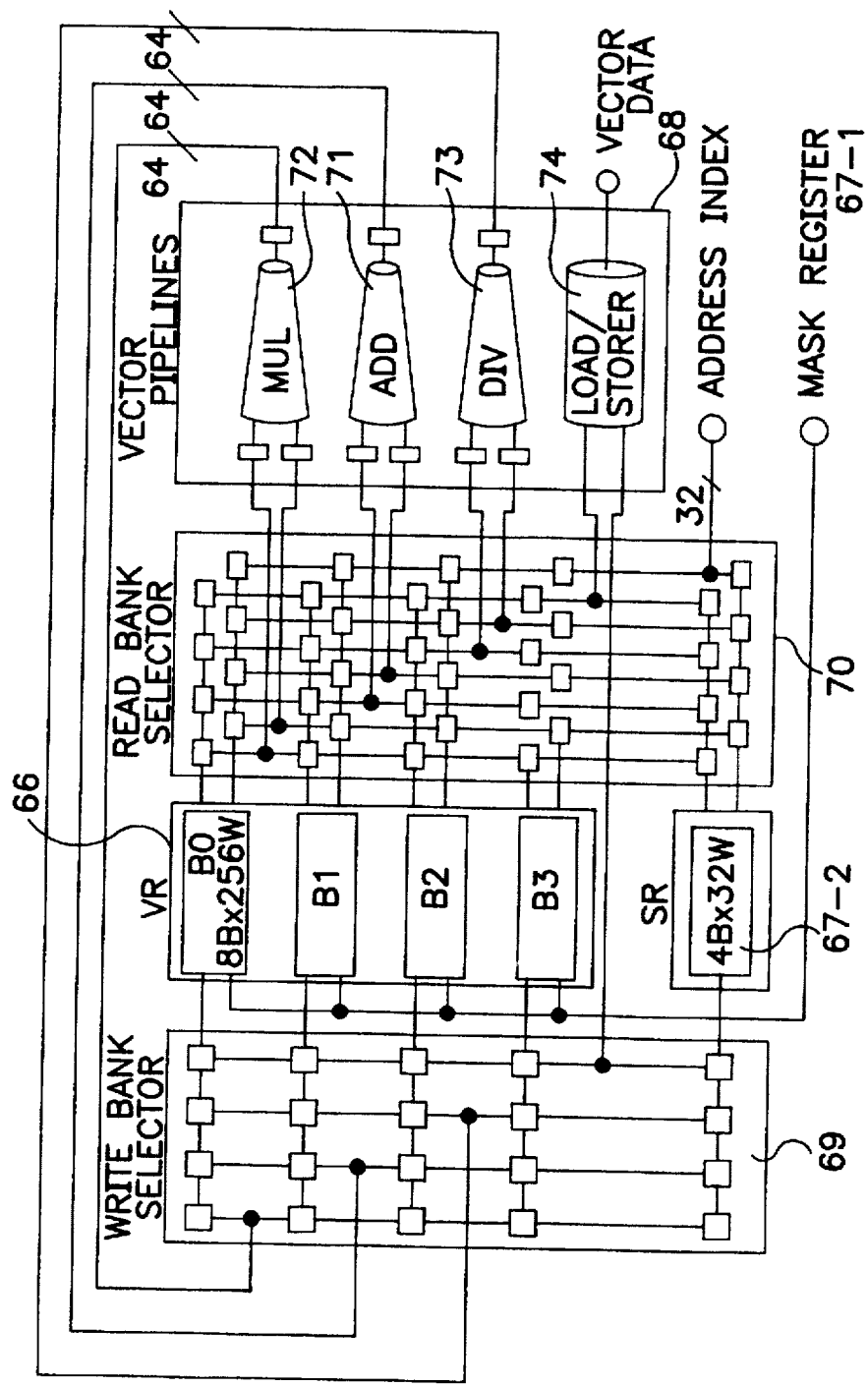
FIG. 34 is a block diagram of the vector unit 61 shown in FIG. 33.

FIG. 34 is a block diagram of the vector unit 61 shown in FIG. 33.

The address unit comprises the comparator 11 shown in FIG. 26, and the bus control unit comprises the address pipeline stage number setter. The SR 67-2 in the vector unit 61 stores an indirect value, a base address, and a stride valve. The address unit carries out the process of selector, multiplied by integer times of operand length, as shown in FIG. 28.

More specifically, FIG. 34 shows the parts pertinent to its vector operations. Each of the four (4) banks B0, B2, B2 and B3, in the vector register 66 comprises eight (8) bytes (sixty-four (64) bits) x two hundred fifty-six (256) words. A read bank selector 70 receives the outputs from the four (4) banks B0, B1, B2 and B3. It has ten (10) input terminals each for 64 bits and eight (8) output terminals each for 64 bits. It is a matrix-like circuit allowing data inputted from any input terminal to be freely outputted to any output terminal.

The vector pipelines 68 comprise a multiplier 72, an adder 71 and a divider 73, each having two (2) input ports, which receive in 64 bits the input data selected by the read bank selector 70.

A write block selector 69 receives from the multiplier 72, the adder 71 and the divider 73 in the vector pipelines 68 respective outputs pipelined in sixty-four (64) bits. It has four (4) input terminals each for sixty-four (64) bits and five (5) output terminals each for sixty-four (64) bits. It is a matrix-like circuit allowing data inputted from any input terminal to be freely outputted to any output terminal. Four (4) of the five (5) output terminals supply their outputs to the vector register 66.

The above configuration enables the following operations to be performed. The read bank selector 70 selects the target bank of the vector register 66 from among the four (4) banks B0, B1, B2 and B3. The vector pipelines 68 receive a pair of sixty-four (64) bits from the output of the selected target bank, and the result obtained by the vector pipelines 68 is selectively input to the target bank of the vector register 66, thereby performing operations between any sixty-four (64) bits of data.

For simultaneous operations, independent data paths and their strict timing management function are required to schedule the data distribution between the four (4) banks B0, B1, B2 and B3 in the vector register 66 and the multiplier 72, the adder 71 and the divider 73 in the vector pipelines 68.

Corresponding to each port of the four (4) banks B0, B1, B2 and B3 in the vector register 66, the write bank selector 69 and the read bank selector 70 have two (2) read planes and one (1) write plane, working as shuffle circuits.

Further, the loader/storer 74 of the vector pipelines 68 is connected to one (1) of the four (4) input terminals of the write bank selector 69 and 64 bits from one (1) of the eight (8) output terminals of the read bank selector 70, and supplies its output, i.e., vector data obtained as the result of operations, to the bus control unit 65. The operated data, i.e., the input data for operations, are supplied through the selector 69 to the vector register 66.

The scaler register 67-2 receives sixty-four (64) bits from one (1) of the five (5) output terminals of the write bank selector 69 and supplies its output to two (2) of the eight (8) output terminals of the read bank selector 70 in sixty-four (64) bits. One (1) of the five (5) output terminals of the read bank selector 70 outputs sixty-four (64) bits or another output terminal of the read bank selector 70 outputs thirty-two (32) bits as an address.

The mask register 67-1 is coupled to each of the four (4) banks B0, B1, B2 and B3 in the vector register 66. When operations are performed, the four (4) banks B0, B1, B2 and B3 mask received data according to the contents of the mask register 67-1.

Figure 35:
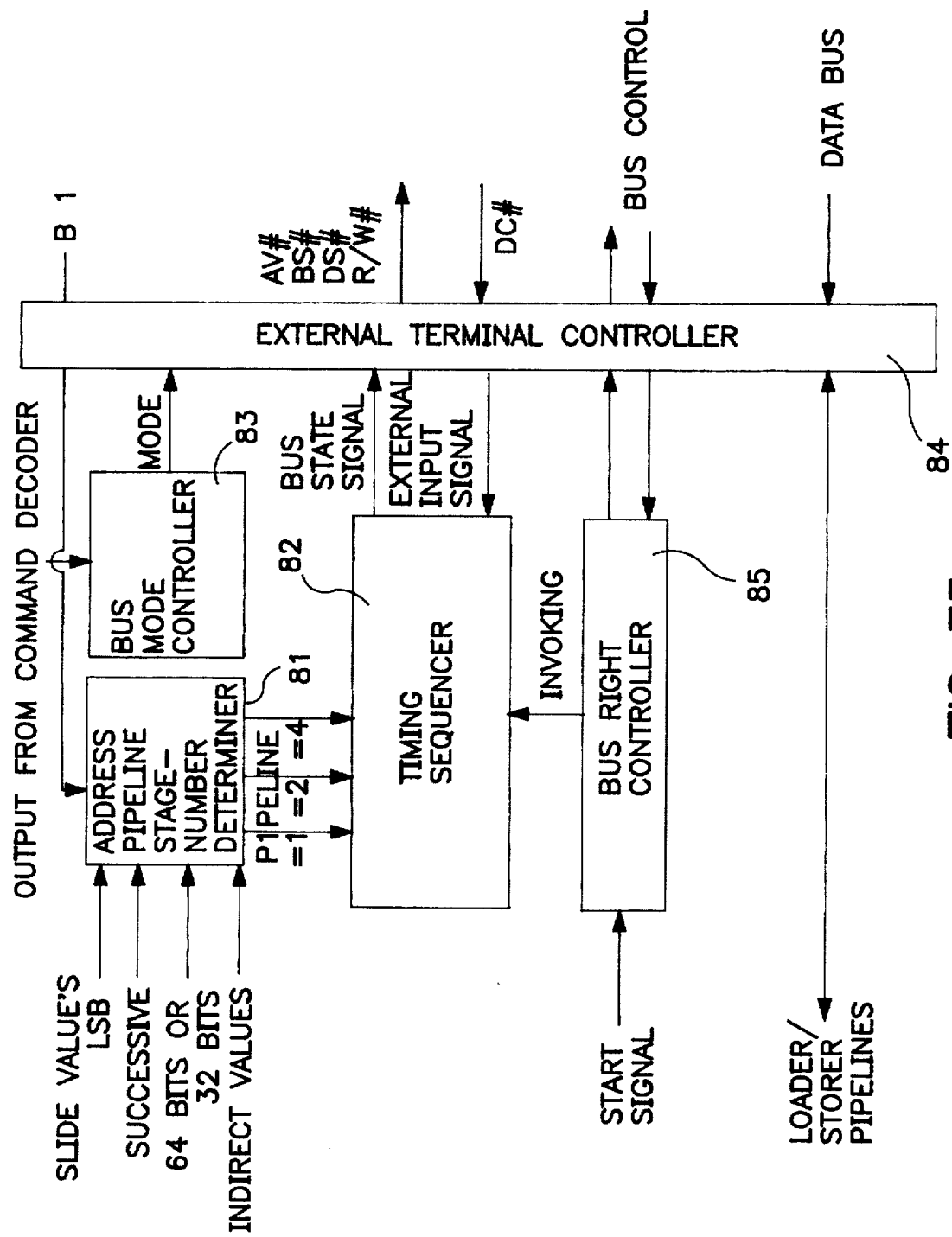
FIG. 35 is a block diagram of the bus control unit 65 shown in FIG. 33.

FIG. 35 is a block diagram of the bus control unit 65 shown in FIG. 33. The bus control unit 65 corresponds to the address pipeline stage number setter 14 shown in FIG. 16.

The inputs and outputs of the vector operations are transmitted through the bus control unit 65, which is a circuit for controlling the interfaces with an external memory device.

An address pipeline stage number determiner 81 is a random logic circuit for determining the number of prefetched addresses from the stride value and the bank number (e.g., "BANK NUMBER=2" shown in FIG. 22) of either B0 or B1. It is equivalent to the address pipeline stage number setter 14 shown in FIG. 16. It also receives signals representing the least significant bits of the stride values, the designation bit of the successive addresses, the bank number, the designation of sixty-four (64) bits or thirty-two (32) bits, and the choice of indirect values. It supplies a pipeline decode value to a timing sequencer 82.

Although the preferred embodiment assumes that the number of banks is two (2), if the number of banks is four (4), the pipeline stage number combination is as shown in FIGS. 16 and 17.

The timing sequencer 82 controls the bus state. The pipeline stage number outputted from the address pipeline stage number determiner 81 determines the bus state number. An external input signal supplied through the external terminal control circuit 84 and a timing signal cause a sequential change in the bus state signals, e.g., AV#, BS#, DS# and R/W#.

The bus mode controller 83 shown in FIG. 33 receives a decoded output from a decode unit 86 in the control unit 63. It is a circuit for determining a bus cycle mode, such as "load" and "store", from a command and an operating logic of an external terminal.

An external terminal controller 84 is a circuit for controlling the directions of external input, output and input/output terminals. It also controls the output timing of an external input signal and a bus state signal.

A bus right controller 85 controls the acquisition of an external bus right. When it acquires an external bus right, the external terminal controller 84 controls an external circuit, e.g., a memory, by using the acquired external bus. The external terminal controller 84 of the bus control unit 65 allows vector data to be exchanged between the vector pipelines 68 and the memory.

Figure 36:
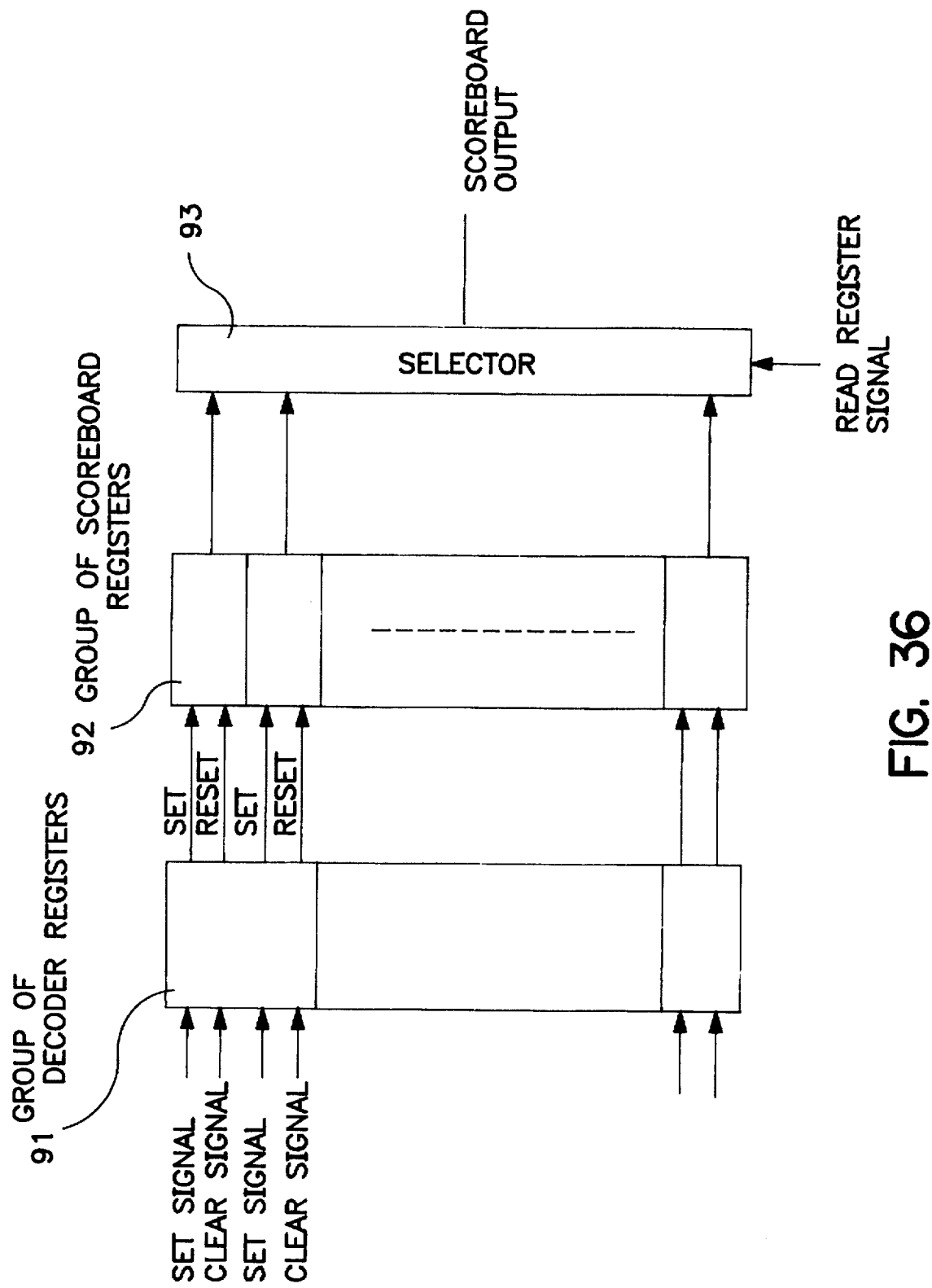
FIG. 36 is a block diagram of a scoreboard 87 in the control unit 63 shown in FIG. 33.

FIG. 36 is a block diagram of a scoreboard 87 in the control unit 63 shown in FIG. 33.

The scoreboard 87 comprises a group of decoder registers 91, a group of scoreboard registers 92, and a selector 93. Each register in the group of decoder registers 91 generates a set signal for setting a to-be-used register number and a reset signal for resetting the register number after use. The group of scoreboard registers 92 comprise a plurality of SR-FFs (set/reset flip-flops). The selector 93 outputs a memory state of one of the group of scoreboard registers 92 corresponding to the register number supplied as a read register number.

The group of scoreboard registers 92 check the inter-command conflicts among its registers when the parallel pipelines are executed. Before a command execution, the designation of the register used by the command (i.e., the set signal for the register designated by a register number) is supplied. Each register in the group of decoder registers 91 decodes whether or not the set signal is for itself. Each register in the group of decoder registers 91 decodes a register number, a set signal and a clear signal. On receiving the set signal for itself, a register in the group of decoder registers 91 outputs the set signal for the corresponding register in the group of scoreboard registers 92. On receiving the clear number for itself, a register in the group of decode registers 91 outputs the reset signal for the corresponding register in the group of scoreboard registers 92.

Thus, the set signal and the reset signal from a register of the group of decoder registers 91 cause a change in the state of the corresponding register in the group of scoreboard registers 92 (i.e., the corresponding one of the SR/FFs), thereby allowing the register state to be stored. That is, a receipt of a set signal by a register in the group of decoder registers 91 enables the corresponding register (i.e., the corresponding one of the SR-FFS) in the group of scoreboard registers 92 to be set for its use. This means that the currently executed command uses the set register. On completing the command execution, the register in the group of decoder registers 91 decodes an inputted clear signal and outputs a reset signal, which resets the corresponding register (i.e., the corresponding one of the SR-FFS) in the group of scoreboard registers 92. On receiving a reset signal, the corresponding register (i.e., 5 the corresponding one of the SR-FFS) in the group of scoreboard registers 92 is reset and no longer used.

Figure 37:
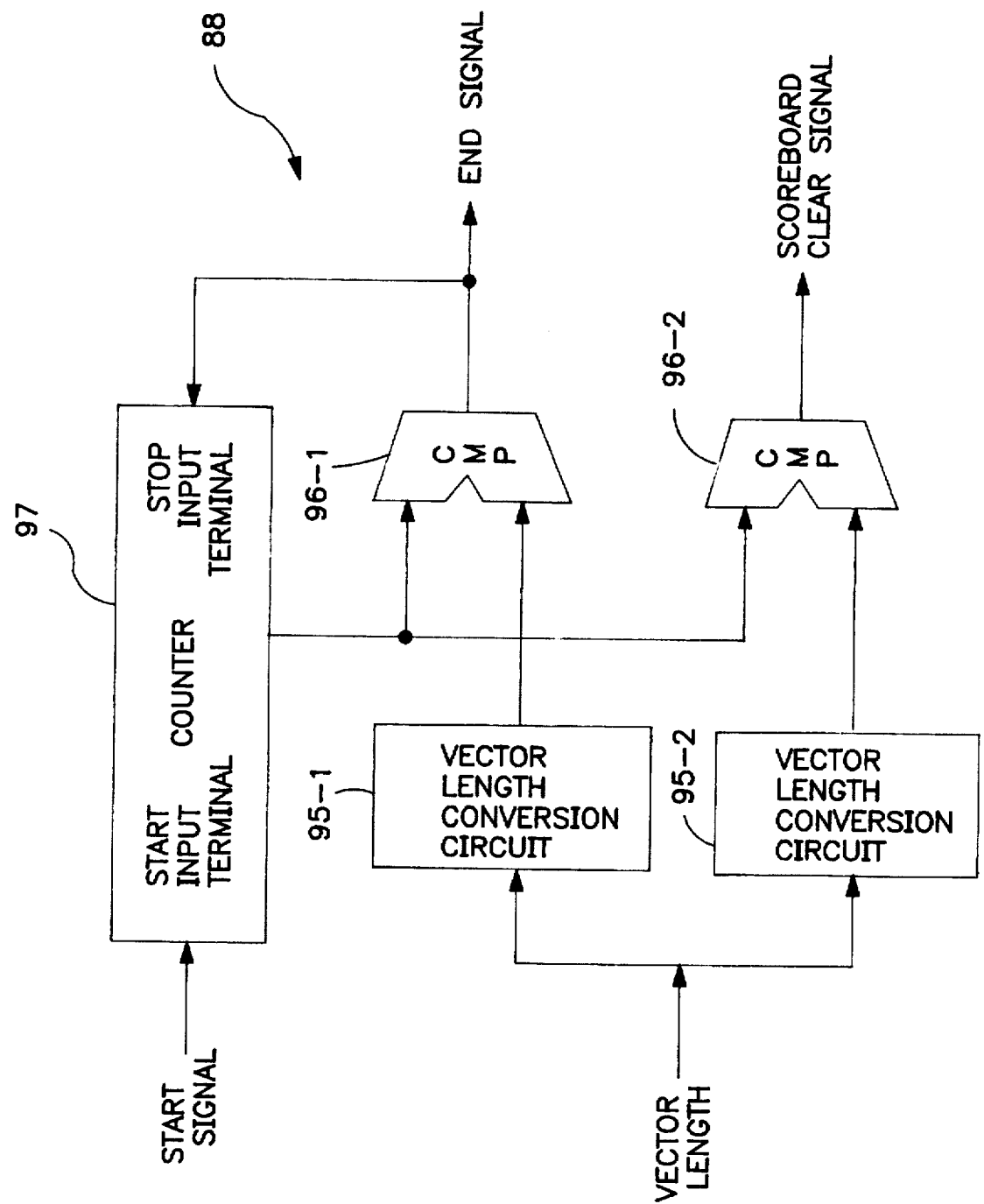
FIG. 37 is a block diagram of the pipeline control unit 88 shown in FIG. 33.

FIG. 37 is a block diagram of the pipeline control unit 88 shown in FIG. 33.

The pipeline control unit 88 receives a start signal for invoking pipelines, e.g., multiplier pipelines, adder pipelines and divider pipelines, and a vector length (number "i" of the vector length) to be processed. The pipeline control unit 88 then generates an END signal for terminating respective pipelines and, in case of a register conflict, a scoreboard clear signal.

Vector conversion circuits 95-1 and 95-2 are random logic circuits for converting the signal representing the inputted vector length to a form matching the internal control timing. Comparators 96-1 and 96-2 receive the outputs from the vector conversion circuits 95-1 and 95-2, respectively. Meanwhile, the counter 97 generates from a vector length and a value of the counter 97 a terminating timing (an END signal) for each pipeline and a scoreboard clear signal. A counter 97 starts counting clock pulses after receiving a start signal. The comparators 96-1 and 96-2 receive at their other input terminals the values of the counter 97. On detecting a match of the vector length conversion value converted by vector conversion circuit 95-2, comparator 96-2 outputs a scoreboard clear signal and continues the counting operation. On detecting a match of the vector length conversion value from vector conversion circuit 95-1, comparator 96-1 outputs an END signal. On receiving at its stop input terminal the END signal, the counter 97 stops its counting operation.

The pipeline is operated when the pipeline operation instruction P# indicates "0", and the number of stages of the pipeline is detected internally by the VPU during the operation in the basic cycle to set the system ready to switch the pipeline mode to 1, 2, or 4 (the number of pipelines) immediately after a pipeline enable signal PEN# is asserted.

Figure 38:
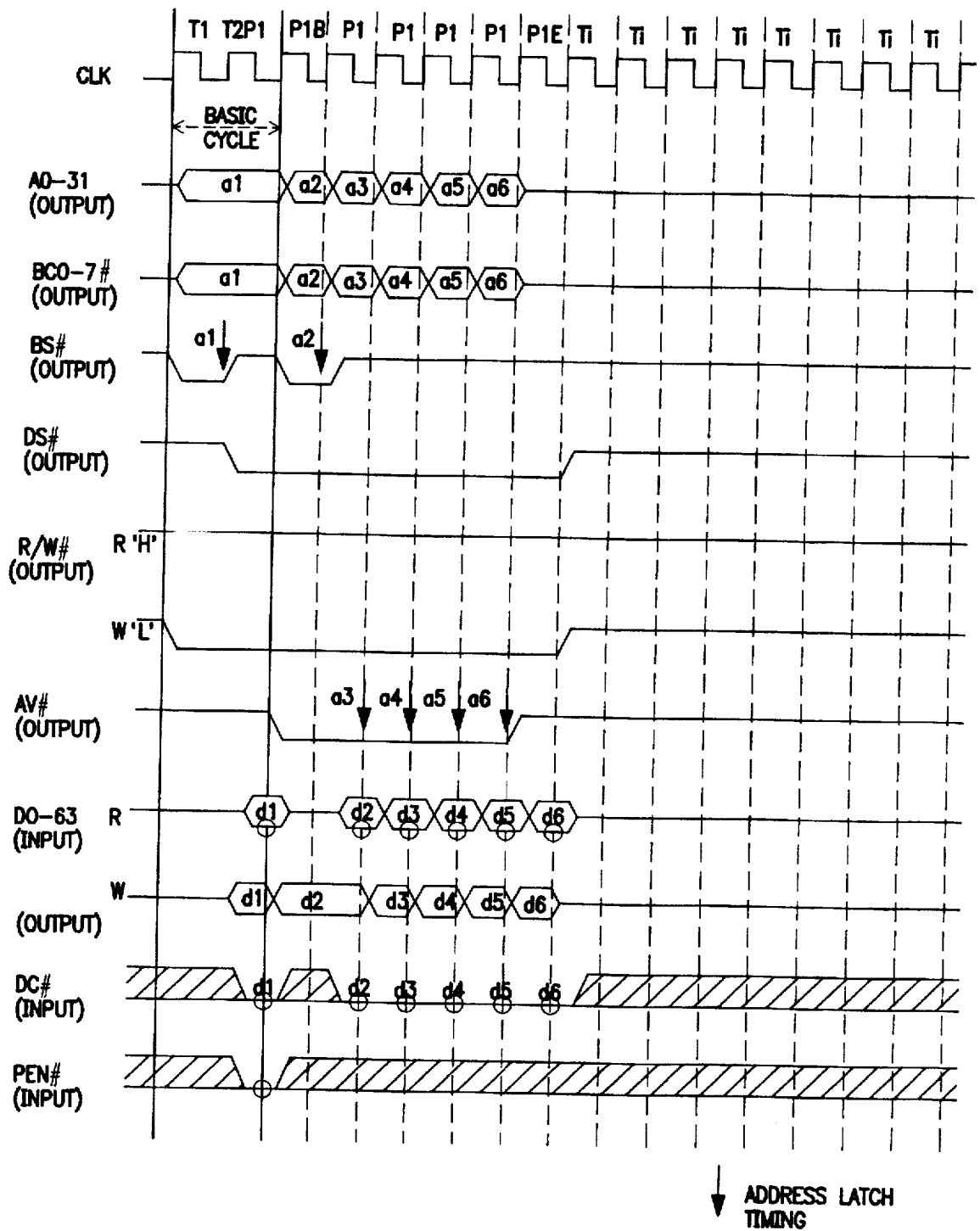
FIG. 38 shows a timing diagram with no wait when the pipeline=1 in accordance with the preferred embodiment of the present invention.
Figure 39:
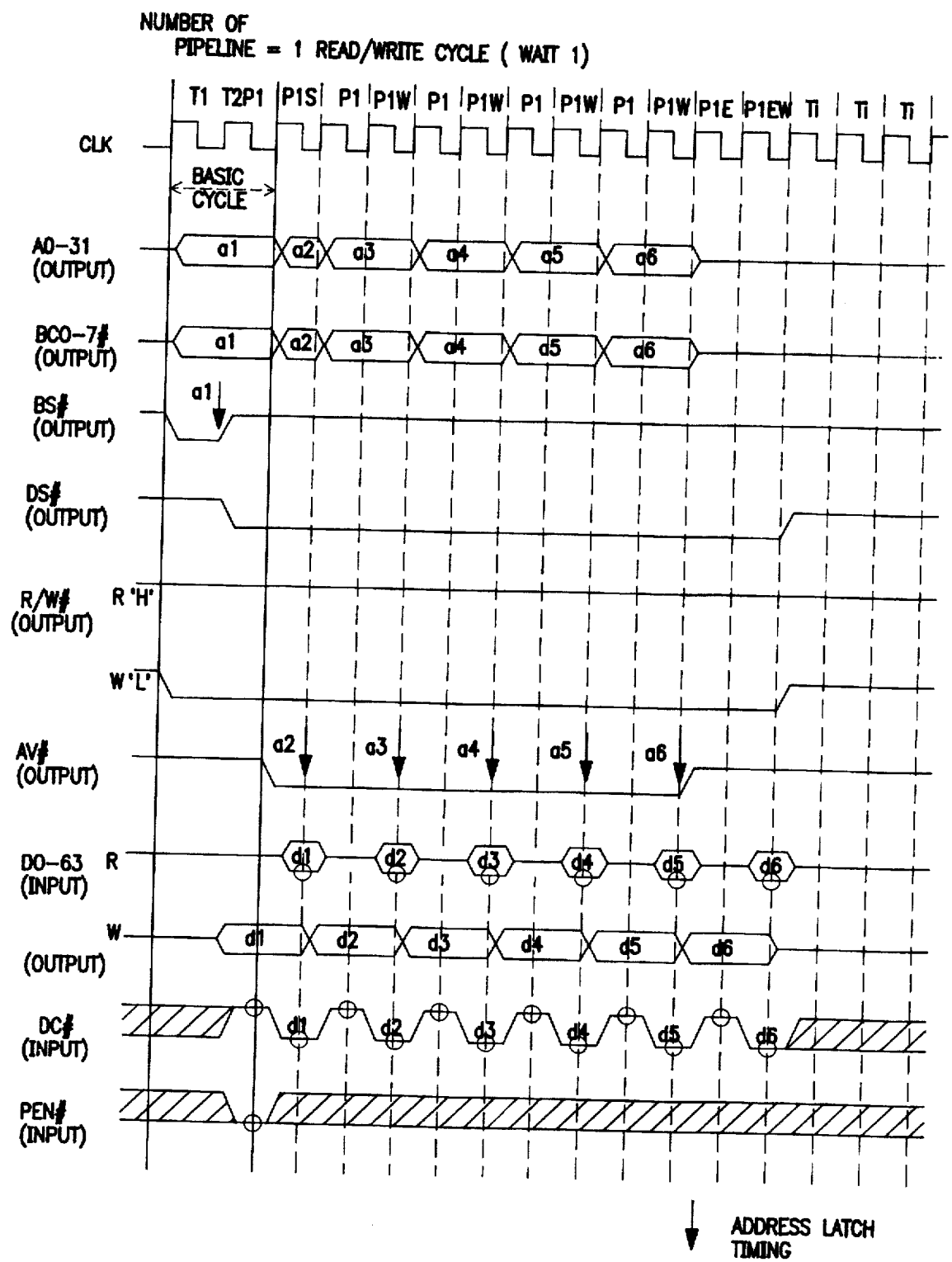
FIG. 39 shows a timing diagram with wait 1 when the pipeline=1 in accordance with the preferred embodiment of the present invention.
Figure 40:
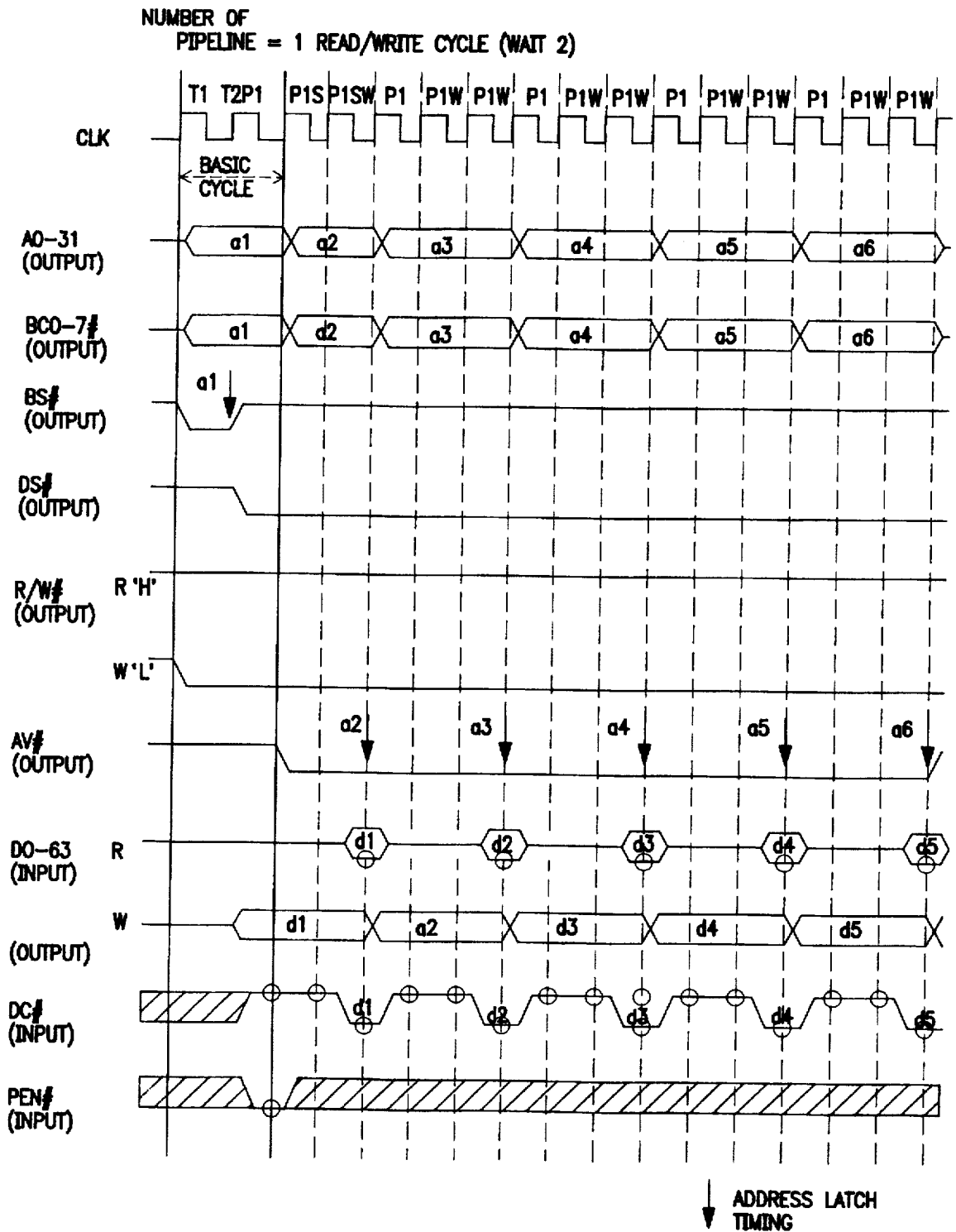
FIG. 40 shows a timing diagram with wait 2 when the pipeline=1 in accordance with the preferred embodiment of the present invention.
Figure 41:
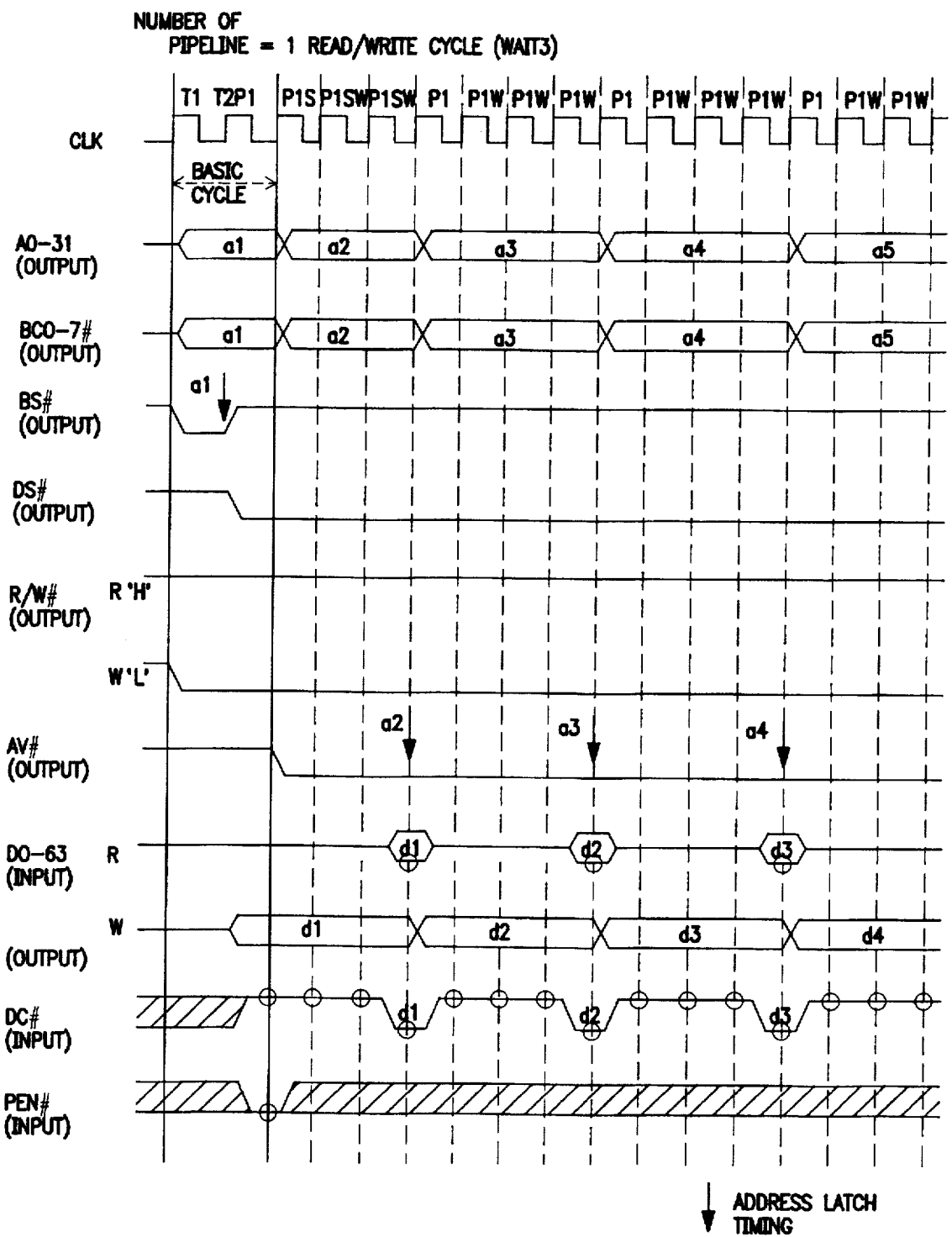
FIG. 41 shows a timing diagram with wait 3 when the pipeline=1 in accordance with the preferred embodiment of the present invention.

FIGS. 38, 39, 40, and 41 show the timing when "pipeline=1". FIG. 38 shows the timing with no wait; FIG. 39 shows the timing with wait 1; FIG. 40 shows the timing with wait two (2); and FIG. 41 shows the timing with wait three (3).

BC0 through 7# are byte control signals and indicate the number of significant bytes from the currently outputted address. In FIG. 37, the signal not shown indicates the number of significant bytes from the position pointed by the address.

The cycle T2 is defined as the cycle T2P1 when "pipeline=1".

When a PEN# is detected as asserted at the rising edge of a clock at the end of the cycle T2P1 during the operation in the basic cycle, the mode is changed to "pipeline=1".

In this case, control is transferred to the following pipeline modes when a PEN# is asserted at the cycle T2P1.

1. pipeline mode with no wait if a DC# is asserted (FIG. 38)
2. pipeline mode with wait if a DC# is negated (FIGS. 39, 40, and 41)

A pipeline mode with no wait is operated in a P1B, P1, or P1E cycle, while a pipeline mode with wait is operated in a cycle P1S, P1, or P1E. Each cycle is described below in detail.

[Cycle P1B]

When a DC# as well as a PEN# is detected as asserted at a cycle T2P1, the cycle T2P1 is switched to a cycle P1B indicating the beginning of a cycle with no wait.

In the cycle P1B, an AV# indicating a switch to the pipeline mode is asserted and a prefetched address is outputted. In the write cycle, write data are updated and a BS# is asserted. A BS# is asserted because, in the pipeline mode, a DC# corresponding to the prefetched address outputted in the cycle P1B cannot be asserted in that cycle even though the cycle is operated without wait, thereby having no signals to latch an output address. Accordingly, a BS# is asserted so that the prefetched address can be recognized by an external circuit.

At the end of the cycle, a DC# is not detected for the above-described reason and control is transferred to a cycle P1 unless pipeline termination condition has occurred.

The cycle P1B is not operated with wait.

[Cycle P1S]

When a PEN# is asserted and a DC# is negated in the cycle T2P1, the cycle T2P1 is switched to a cycle P1S indicating the beginning of a cycle with wait.

In the cycle P1S, an AV# indicating a change to the pipeline mode is asserted and a prefetched address is outputted. Since a DC# is negated at the end of the cycle T2P1, write data are not updated in the write cycle. However, in the read cycle, a DC# is asserted and read data are imported.

In this cycle, a BS# is not asserted because a prefetched address can be recognized as long as a DC# is asserted.

If a DC# is detected and asserted at the rising edge of a clock at the end of this cycle and unless a pipeline termination condition has occurred, control is transferred to the cycle P1.

If a DC# is negated, control is transferred to the cycle PLSW for retaining the state of the cycle PIS, and the wait cycle is repeated until a DC# is asserted.

[Cycle P1]

In the cycle P1, a prefetched address is updated, write data are updated in the write cycle, and read data are imported in the read cycle.

If a DC# is detected as asserted at the rising edge of a clock at the end of this cycle, and unless a pipeline termination condition has occurred, control is transferred to the next cycle P1. Control is transferred to a cycle P1E if a DC# is asserted and a pipeline termination condition has occurred.

Control is transferred to a cycle P1W for retaining the state of the cycle P1 if a DC# is negated in this cycle, and the wait cycle is repeated until a DC# is asserted.

An AV# is retained as asserted in this cycle.

[Cycle P1E]

Transfer to the cycle P1E indicates that a pipeline termination condition has occurred. Therefore, addresses are outputted no more in this cycle, and an AV# indicating a signal for asserting an address output in a pipeline is negated.

The only process in this cycle is performed on data associated with prefetched addresses. Write data are updated in the write cycle, and read data are imported in the read cycle.

If a DC# is detected as asserted at the rising edge of a clock at the end of this cycle, the pipeline cycle is terminated and all the output signals involved are negated. If a DC# is negated, control is transferred to a cycle P1EW for retaining the state of the cycle P1E, and the wait cycle is repeated until a DC# is asserted.

Figure 42:
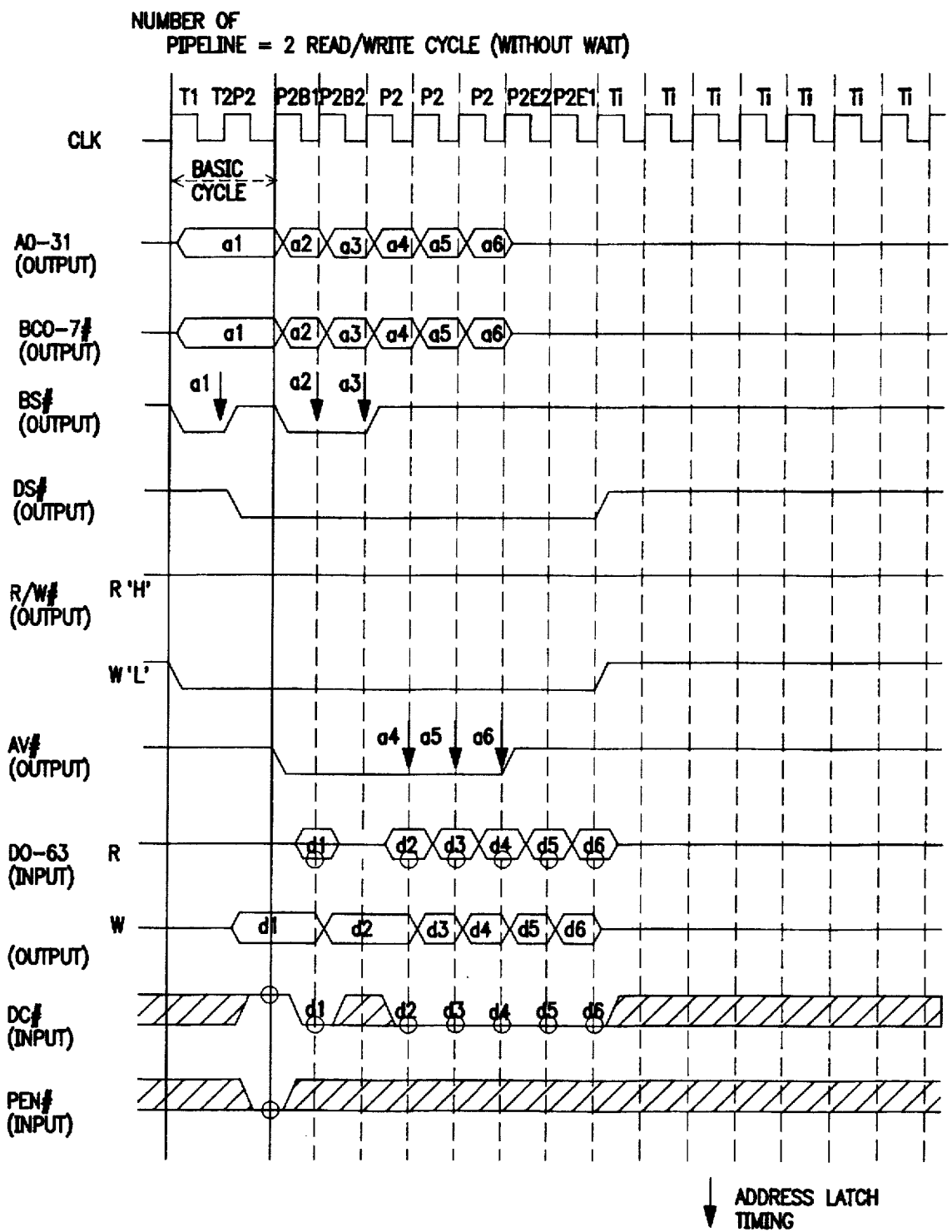
FIG. 42 shows a timing diagram with no wait when the pipeline=2 in accordance with the preferred embodiment of the present invention.
Figure 43:
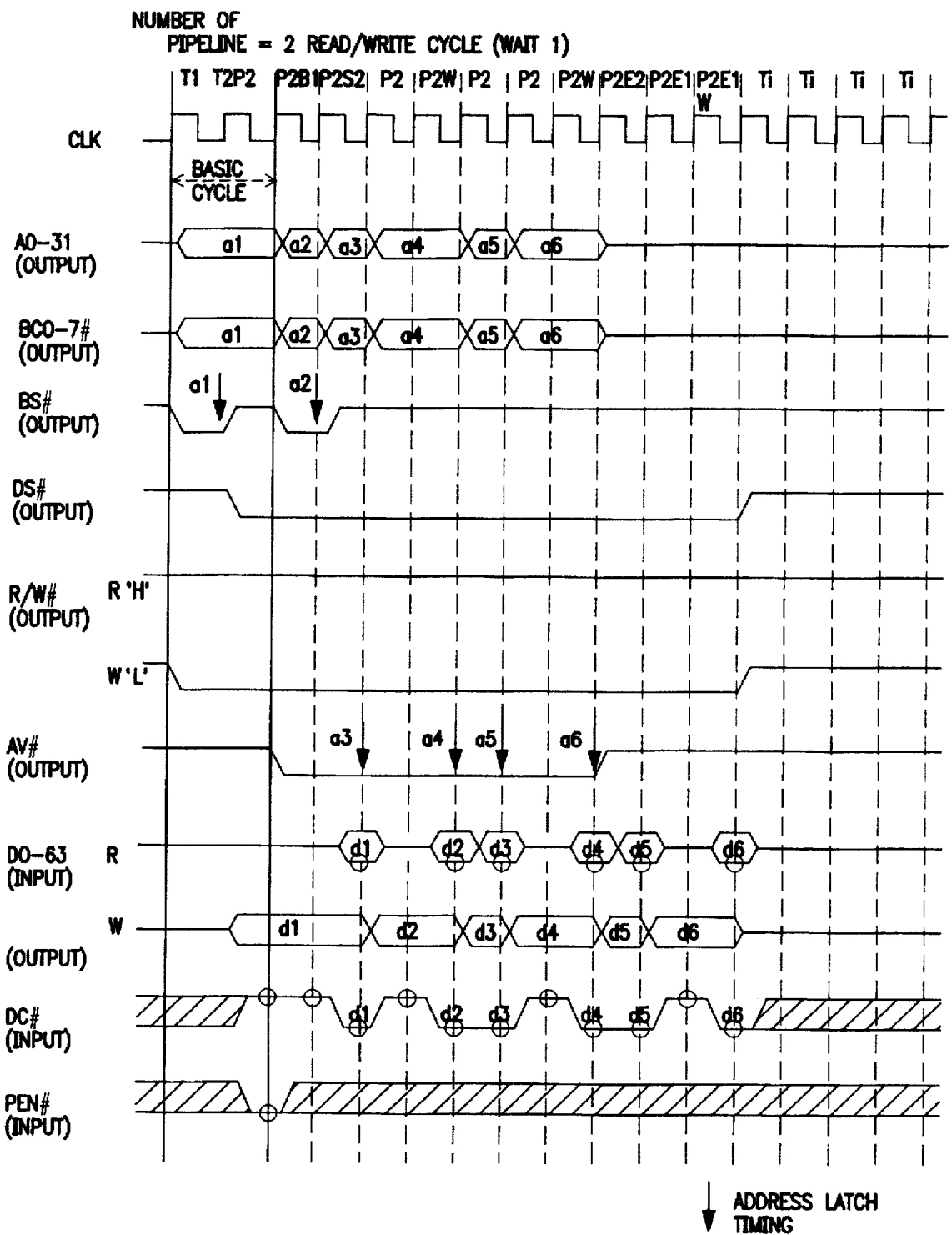
FIG. 43 shows a timing diagram with wait 1 when the pipeline=2 in accordance with the preferred embodiment of the present invention.
Figure 44:
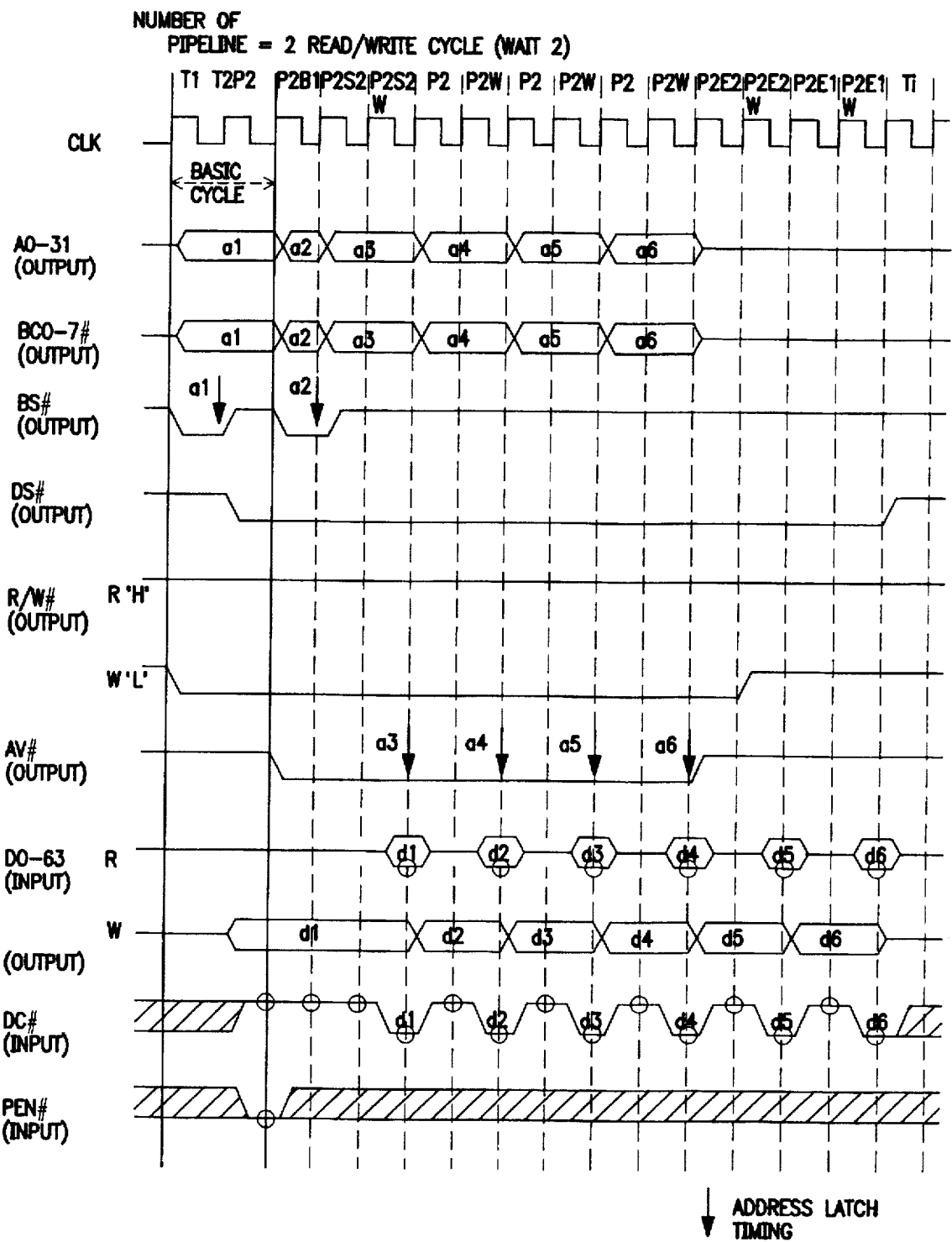
FIG. 44 shows a timing diagram with wait 2 when the pipeline=2 in accordance with the preferred embodiment of the present invention.
Figure 45:
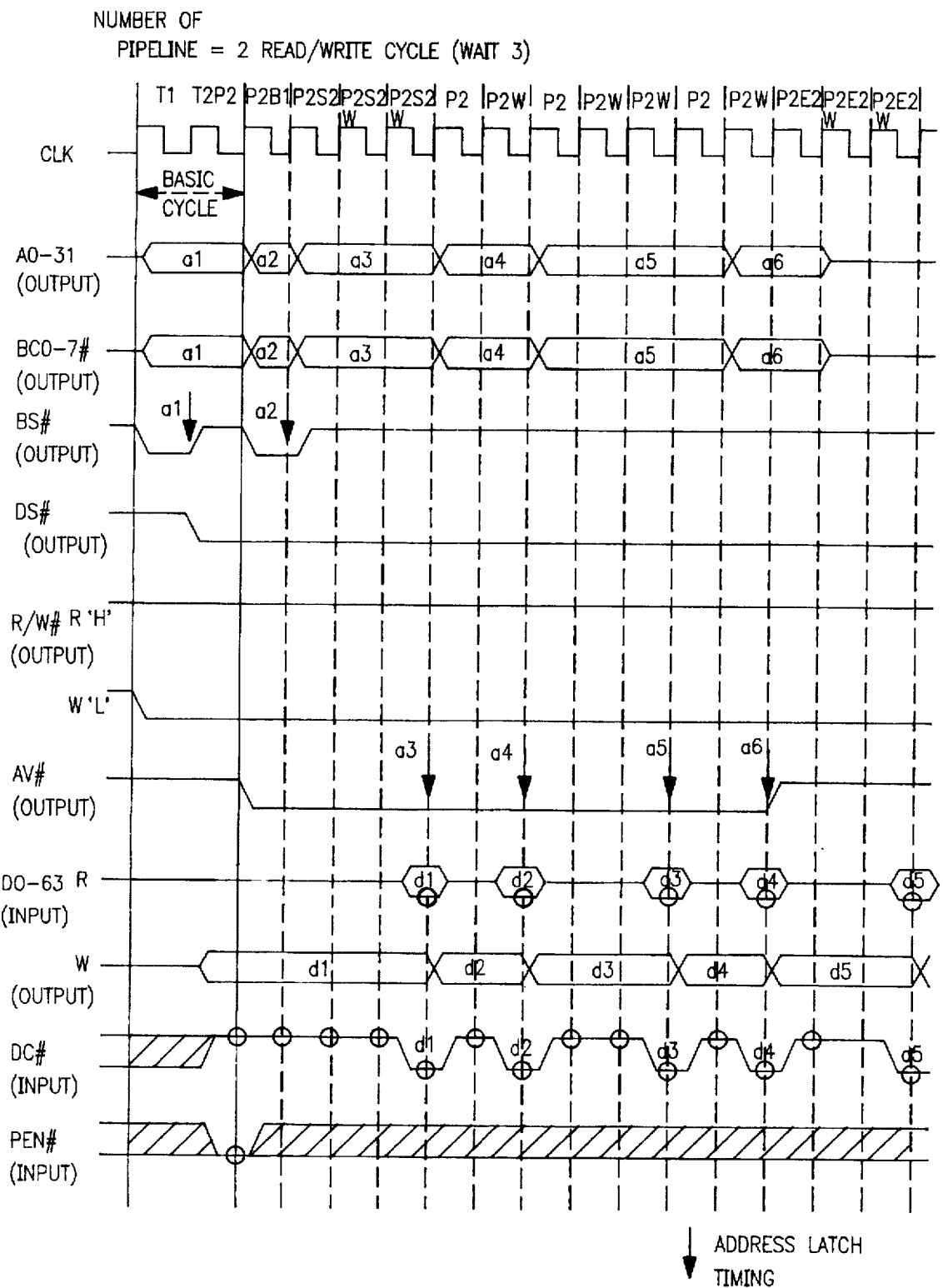
FIG. 45 shows a timing diagram with wait 3 when the pipeline=2 in accordance with the preferred embodiment of the present invention.

FIGS. 42, 43, 44, and 45 show the timing when "pipeline=2". FIG. 42 shows the timing with no wait; FIG. 43 shows the timing with wait 1; FIG. 44 shows the timing with wait 2; and FIG. 45 shows the timing with wait 3.

The cycle T2 is defined as a cycle T2P2 when "pipeline=2".

When a PEN# is detected as asserted and a DC# is negated at the rising edge of a clock at the end of the cycle T2P2 during the operation in the basic cycle, the mode is switched to "pipeline=2".

The VPU ignores the assertion input of a PEN# if, in the cycle T2P2, a DC# is asserted although a PEN# is asserted, and the mode is not switched to "pipeline=2" but to the basic mode.

When the mode is switched to "pipeline=2", a DC# is detected for the first time at the rising edge of a clock at the end of the cycle at one clock after the cycle T2P2. In this cycle, control is transferred to the following pipeline modes.

1. pipeline mode with no wait if a DC# is asserted (FIG. 42)
2. pipeline mode with wait if a DC# is negated (FIGS. 43, 44, and 45).

A pipeline mode with no wait is operated in a cycle P2B1, P2B2, P2, P2E2, or P2E1, while a pipeline mode with wait is operated in the cycle P2B1, P2S2, P2, P2E2, or P2E1.

Each cycle is described below in detail.

[Cycle P2B1]

When "PEN#" is detected as asserted and "DC#" is detected as negated in the cycle T2P2, the cycle T2P2 is changed to the cycle P2B1.

In the cycle P2B1, an AV# indicating that control is transferred to the pipeline mode is asserted and a prefetched address is outputted. Then, a BS# is asserted to recognize a prefetched address. Also in this cycle, write data are not updated in the write cycle, while read data are imported in the read cycle when a DC# is asserted.

If a DC# is detected as asserted at the rising edge of a clock at the end of this cycle, and unless a pipeline termination condition has occurred, control is transferred to a cycle P2B2. If a DC# is negated and a pipeline termination condition has not occurred, control is transferred to a cycle P2S2.

The cycle P2B1 is not operated with wait.

[Cycle P2B2]

In the cycle P2B2, prefetched addresses are outputted, write data are updated in the write cycle, but read data are not imported in the read cycle.

Since a DC# is not detected in this cycle, a BS# is continuously searched for assertion to recognize a prefetched address.

The cycle P2B2 is switched to a cycle P2 unless a pipeline termination condition has occurred.

The cycle P2B2 is not operated with wait.

[Cycle P2S2]

Prefetched addresses are outputted in the P2S2. However, since a DC# is negated in the previous cycle P2B1, write data are not updated in the write cycle and data are imported in the read cycle when a DC# is asserted.

In this cycle, a BS# is not asserted because a DC# is detected as asserted and a prefetched address is recognized.

If a DC# is detected as asserted at the rising edge of a clock at the end of this cycle, and unless a pipeline termination condition has occurred, control is transferred to the cycle P2. If a DC# is negated, control is transferred to the cycle P2S2W for retaining the state of the cycle P2S2 and the wait cycle is repeated until a DC# is asserted.

[Cycle P2]

In the cycle P2, a prefetched address is updated, write data are updated in the write cycle, and read data are imported in the read cycle.

If a DC# is detected as asserted at the rising edge of a clock at the end of this cycle, and unless a pipeline termination condition has occurred, control is transferred to the next cycle P2. If a DC# is asserted and a pipeline termination condition has occurred, control is transferred to a cycle P2E2.

If a DC# is negated in this cycle, control is transferred to a cycle P2W for retaining the state of the cycle P2, and the wait cycle is repeated until a DC# is asserted.

An AV# is retained as asserted in this cycle.

[Cycle P2E2]

Transfer to the cycle P2E2 indicates that a pipeline termination condition has occurred. Therefore, addresses are outputted no more in this cycle, and an AV# indicating a signal for asserting an address output in a pipeline is negated.

The only process in this cycle is performed on data associated with prefetched addresses. Write data are updated in the write cycle, and read data are imported in the read cycle.

If a DC# is detected as asserted at the rising edge of a clock at the end of this cycle, control is transferred to a cycle P2E1. If a DC# is negated, control is transferred to a cycle P2E2W for retaining the state of the cycle P2E2, and the wait cycle is repeated until a DC# is asserted.

[Cycle P2E1]

In the cycle P2E1, write data are updated in the write cycle and read data are imported in the read cycle.

If a DC# is detected as asserted at the rising edge of a clock at the end of this cycle, the bus cycle is terminated and all the output signals involved are negated. If a DC# is negated, control is transferred to a cycle P2E1W for retaining the state of the cycle P2E1, and the wait cycle is repeated until a DC# is asserted.

Figure 46:
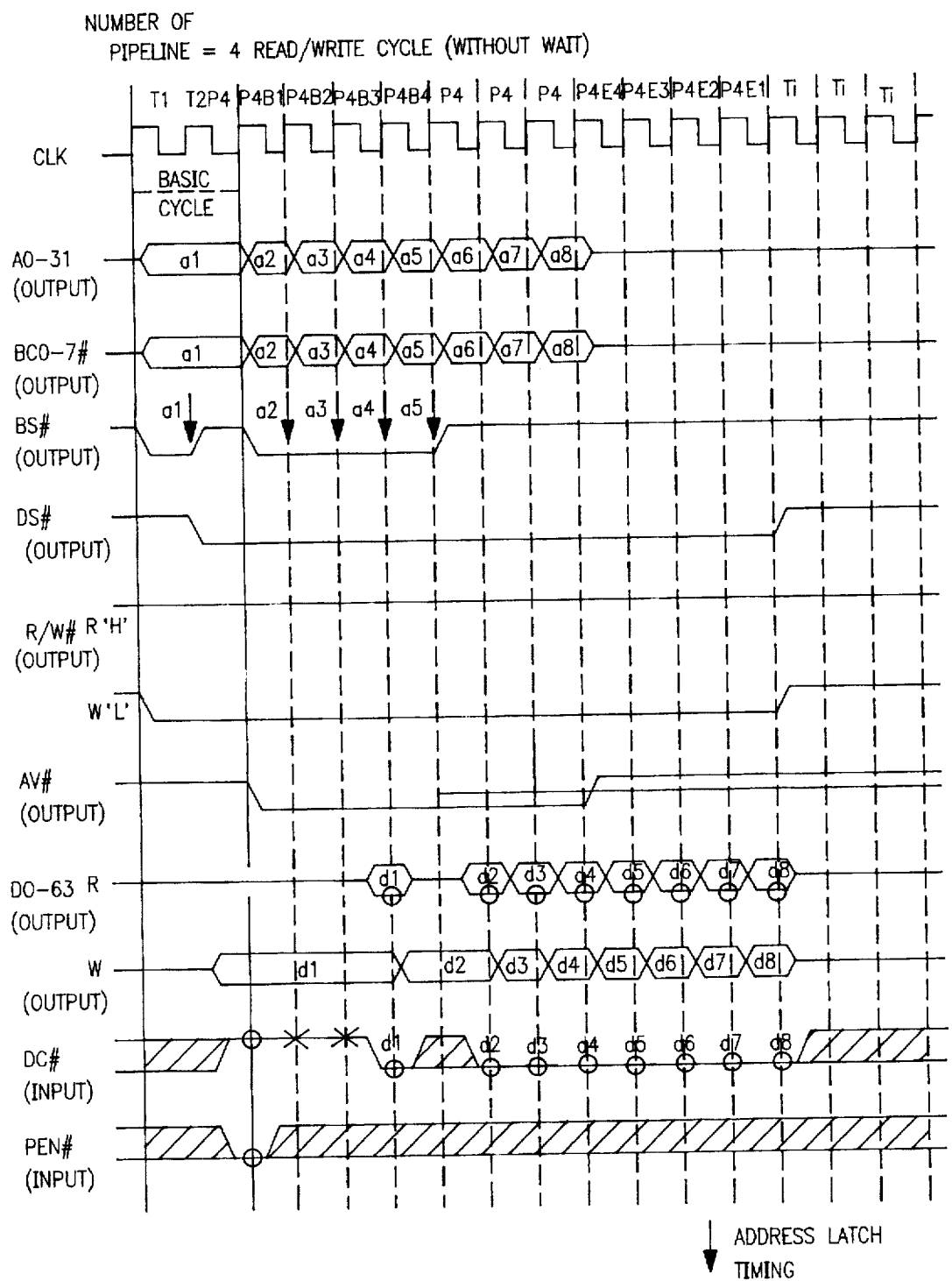
FIG. 46 shows a timing diagram with no wait when the pipeline=4 in accordance with the preferred embodiment of the present invention.
Figure 47:
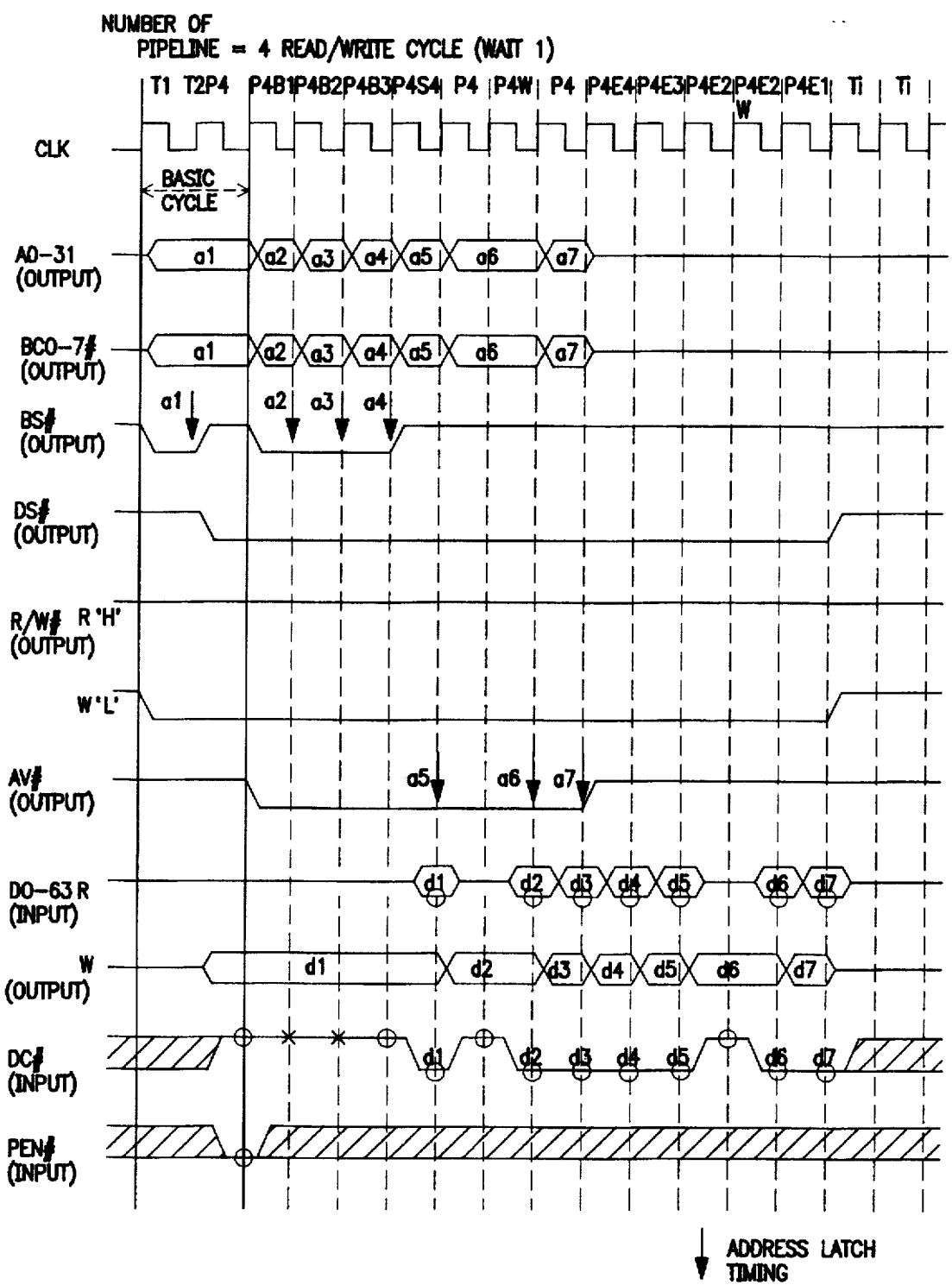
FIG. 47 shows a timing diagram with wait 1 when the pipeline=4 in accordance with the preferred embodiment of the present invention.
Figure 48:
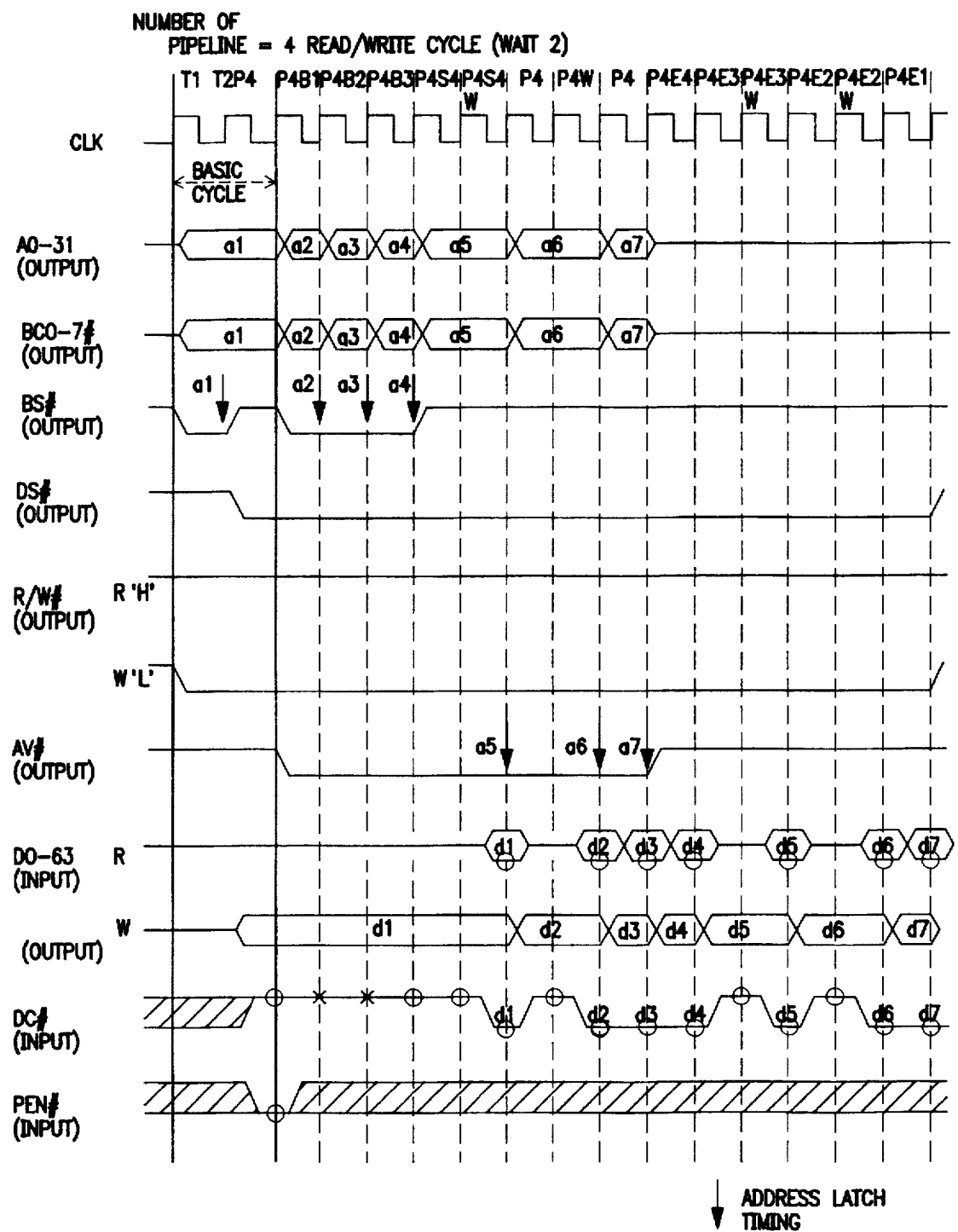
FIG. 48 shows a timing diagram with wait 2 when the pipeline=4 in accordance with the preferred embodiment of the present invention.
Figure 49:
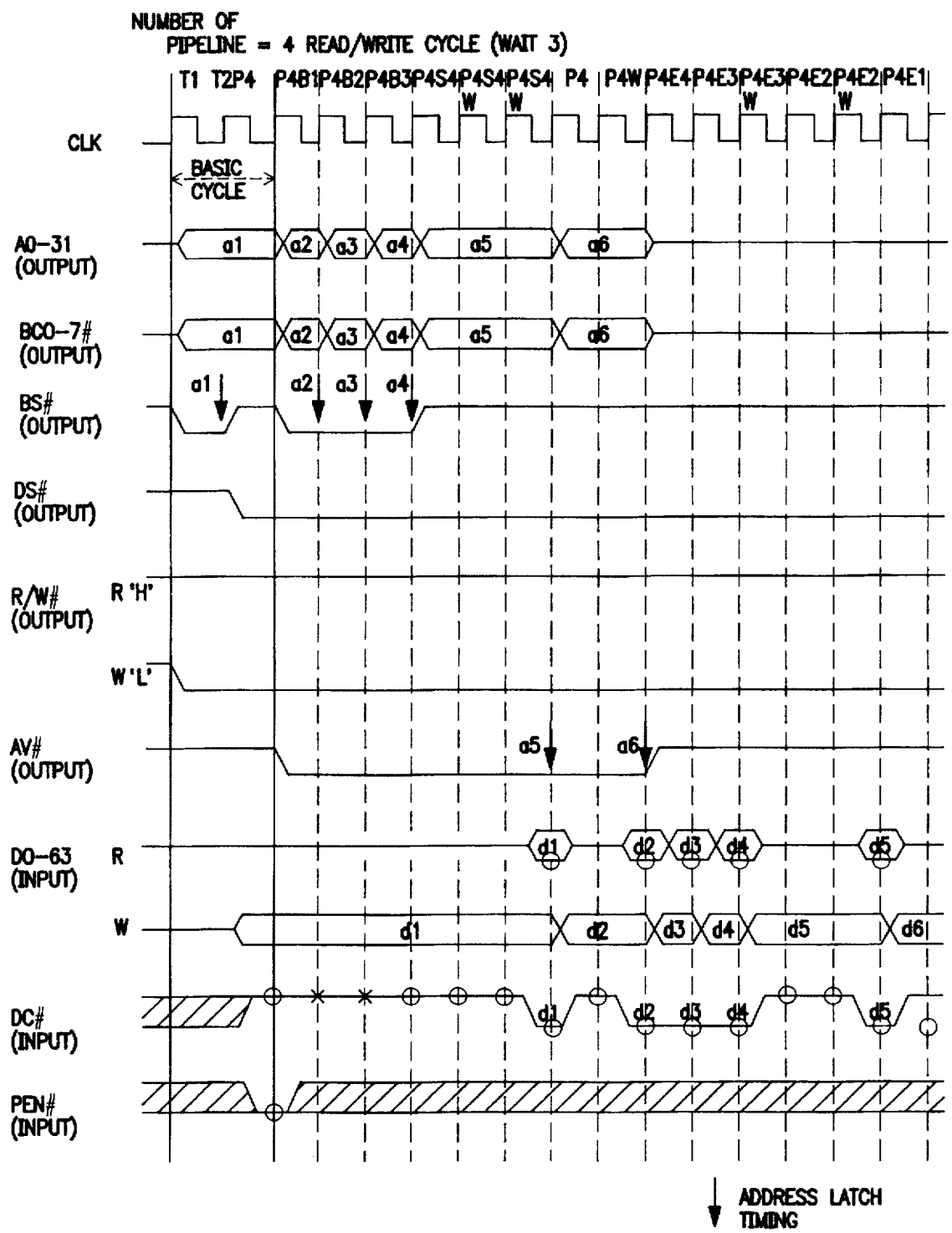
FIG. 49 shows a timing diagram with wait 3 when the pipeline=4 in accordance with the preferred embodiment of the present invention.

FIGS. 46, 47, 48, and 49 show the timing when "pipeline=4". FIG. 46 shows the timing with no wait; FIG. 47 shows the timing with wait 1; FIG. 48 shows the timing with wait 2; and FIG. 49 shows the timing with wait 3.

A cycle T2 is defined as a cycle T2P4 when "pipeline=4".

When a PEN# is detected as asserted and a DC# is negated at the rising edge of a clock at the end of the cycle T2P4 during the operation in the basic cycle, the mode is switched to "pipeline=4".

The VPU ignores the assertion input of a PEN# if, in the cycle T2P4, a DC# is asserted although a PEN# is asserted, and the mode is not switched to "pipeline=4" but to the basic mode.

When the mode is switched to "pipeline=4", a DC# is detected for the first time at the rising edge of a clock at the end of the cycle at three clock pulses after the cycle T2P4. In this cycle, control is transferred to the following pipeline modes.

1. pipeline mode with no wait if a DC# is asserted (FIG. 46)
2. pipeline mode with wait if a DC# is negated (FIGS. 47, 48, and 49).

A pipeline mode with no wait is operated in a cycle P4B1, P4B2, P4B3, P4B4, P4, P4E4, P4E3, P4E2, and P4E1 while a pipeline mode with wait is operated in a cycle P4B1, P4B2, P4B3, P4S4, P4, P4E4, P4E3, P4E2, and P4E1.

Each cycle is described below in detail.

[Cycle P4B1]

When a PEN# is detected as asserted and a DC# is detected as negated in the cycle T2P4, the cycle T2P4 is switched to a cycle P4B1.

In the cycle P4B1, an AV# indicating that control is transferred to the pipeline mode is asserted and a prefetched address is outputted. Then, a BS# is asserted to recognize a prefetched address. Also in this cycle, write data are not updated in the write cycle, while read data are not imported in the read cycle.

A DC# is not detected at the end of this cycle, and control is transferred to a cycle P4B2 unless a pipeline termination control has occurred.

The cycle P4B1 is not operated with wait.

[Cycle P4B2]

Prefetched addresses are outputted first in the cycle P4B2, and a BS# is asserted to recognize prefetched addresses. Write data are not updated in the write cycle, or read data are not imported in the read cycle.

A DC# is not detected at the end of this cycle, and control is transferred to a cycle P4B3 unless a pipeline termination condition has occurred.

The cycle P4B2 is not operated with wait.

[Cycle P4B3]

Prefetched addresses are outputted in the cycle P4B3, and a BS# is asserted to recognize prefetched addresses. Write data are not updated in the write cycle, but read data are imported in the read cycle when a DC# is asserted.

If a DC# is detected as asserted at the rising edge of a clock at the end of this cycle, and unless a pipeline termination condition has occurred, control is transferred to a cycle P4B4. If a DC# is negated and a pipeline termination condition has not occurred, control is transferred to a cycle P4S4.

The cycle P4B3 is not operated with wait.

[Cycle P4B4]

In the cycle P4B4, prefetched addresses are outputted, and a BS# is asserted to recognize prefetched addresses. Since a DC# is asserted in the cycle P4B3, write data are updated in the write cycle, but read data are not imported in the read cycle. A DC# is not detected at the rising edge of a clock at the end of this cycle, and control is transferred to a cycle P4 unless a pipeline termination condition has occurred.

The cycle P4B4 is not operated with wait.

[Cycle P4S4]

In the cycle P4S4, prefetched addresses are outputted. However, since a DC# is negated in the previous cycle P4B3, write data are not updated in the write cycle, but read data are imported in the read cycle when a DC# is detected as asserted.

In this cycle, a BS# is not asserted since prefetched addresses can be recognized if a DC# is detected as asserted.

If a DC# is detected as asserted at the rising edge of a clock at the end of this cycle, and unless a pipeline termination condition has occurred, control is transferred to the cycle P4. If a DC# is negated, control is transferred to a cycle P4S4W for retaining the state of the cycle P4S4 and the wait cycle is repeated until a DC# is asserted.

[Cycle P4]

In the cycle P4, prefetched addresses are updated, write data are updated in the write cycle, and read data are imported in the read cycle.

If a DC# is detected as asserted at the rising edge of a clock at the end of this cycle, and unless a pipeline termination condition has occurred, control is transferred to the next cycle P4. If a DC# is asserted and a pipeline termination condition has occurred, control is transferred to a cycle P4E4.

If "DC#" is negated in this cycle, control is transferred to the cycle P4W for retaining the state of the cycle P4, and the wait cycle is repeated until a DC# is asserted.

[Cycle P4E4]

Transfer to the cycle P4E4 indicates that a pipeline termination condition has occurred. Therefore, addresses are outputted no more in this cycle, and an AV# indicating a signal for asserting an address output in a pipeline is negated.

The only process in this cycle is performed on data associated with prefetched addresses. Write data are updated in the write cycle, and read data are imported in the read cycle.

If a DC# is detected as asserted at the rising edge of a clock at the end of this cycle, control is transferred to a cycle P4E3. If a DC# is negated, control is transferred to a cycle P4E4W for retaining the state of the cycle P4E4, and the wait cycle is repeated until a DC# is asserted.

[Cycle P4E3]

In the cycle P4E3, write data are updated in the write cycle and read data are imported in the read cycle when a DC# is asserted.

If a DC# is detected as asserted at the rising edge of a clock at the end of this cycle, control is transferred to a cycle P4E2. If a DC# is negated, control is transferred to a cycle P4E3W for retaining the state of the cycle P4E3, and the wait cycle is repeated until a DC# is asserted.

[Cycle P4E2]

In the cycle P4E2, write data are updated in the write cycle and read data are imported in the read cycle when DC# is asserted.

If a DC# is detected as asserted at the rising edge of a clock at the end of this cycle, control is transferred to a cycle P4E1. If a DC# is negated, control is transferred to a cycle P4E2W for retaining the state of the cycle P4E2 and the wait cycle is repeated until a DC# is asserted.

[Cycle P4E1]

In the cycle P4E1, write data are updated in the write cycle and read data are imported in the read cycle when a DC# is asserted.

If a DC# is detected as asserted at the rising edge of a clock at the end of this cycle, the bus cycle is terminated and all the output signals involved are negated. If a DC# is negated, control is transferred to a cycle P4E1W for retaining the state of the cycle P4E1, and the wait cycle is repeated until a DC# is asserted.

Figure 1:
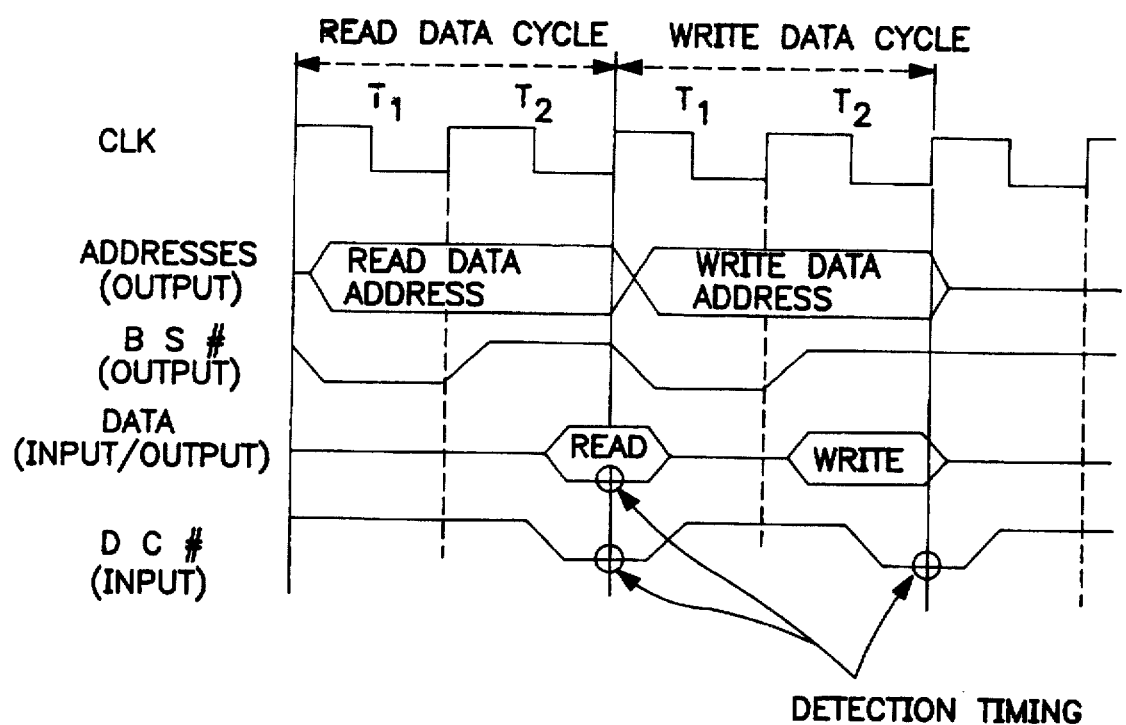
FIG. 1 is a bus timing chart in which the basic cycle of a prior art system comprises two (2) clock durations.
Figure 2:
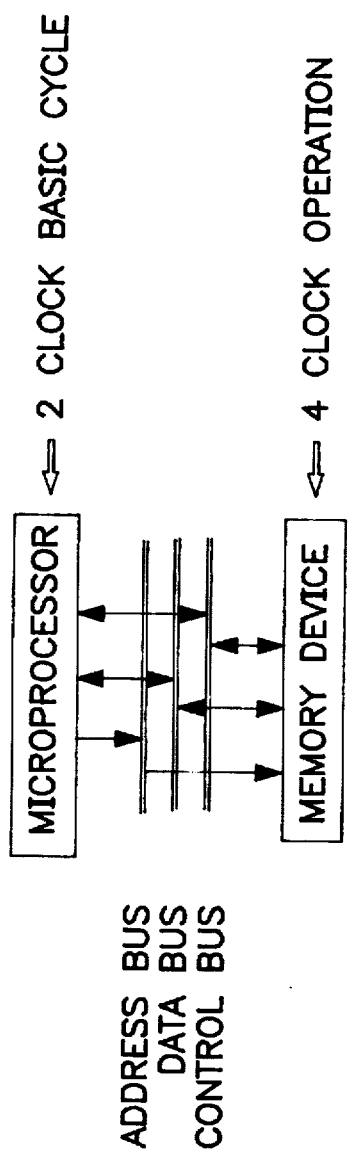
FIG. 2 is a diagram showing a connection between a conventional microprocessor with its basic cycle being two (2) clock durations and a memory device operating in four (4) clock durations.
Figure 3:
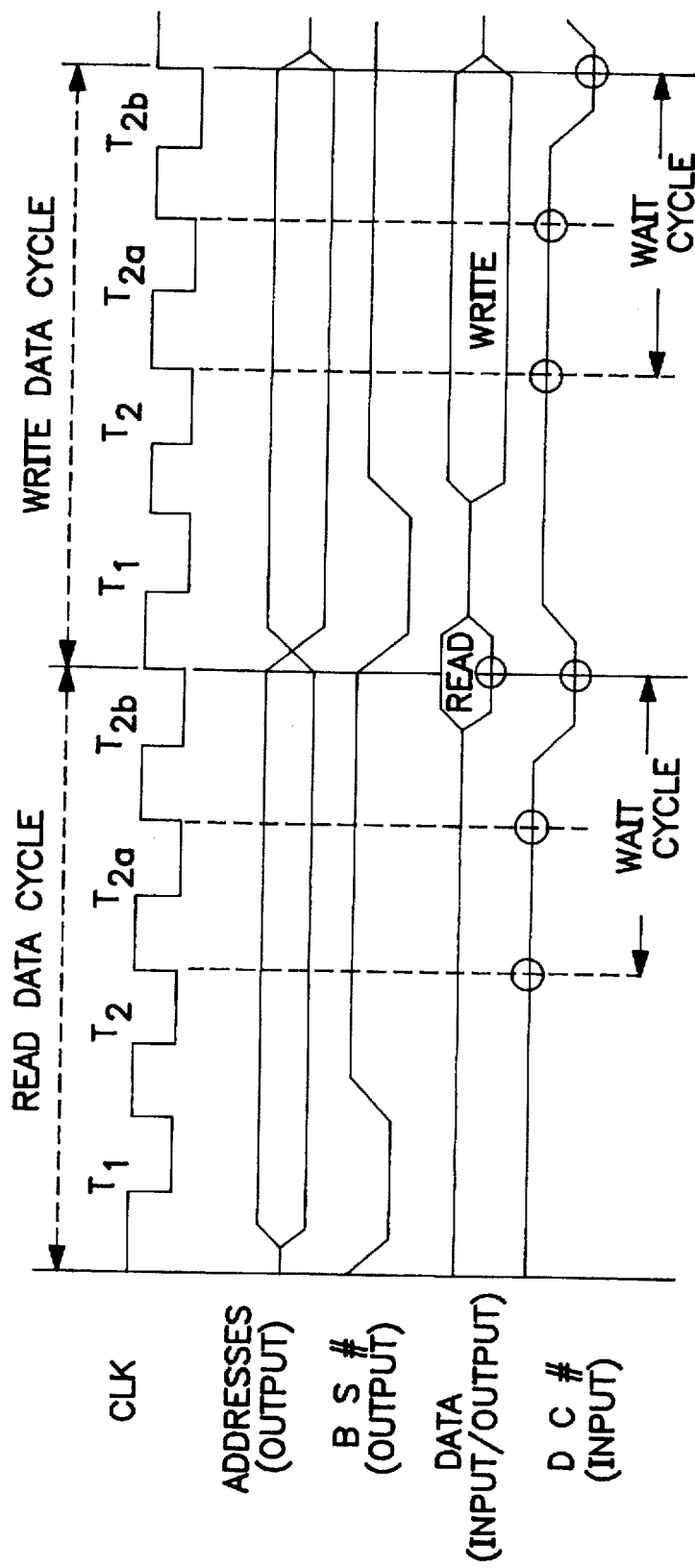
FIG. 3 is a timing chart for the bus shown in FIG. 2.
Figure 4:
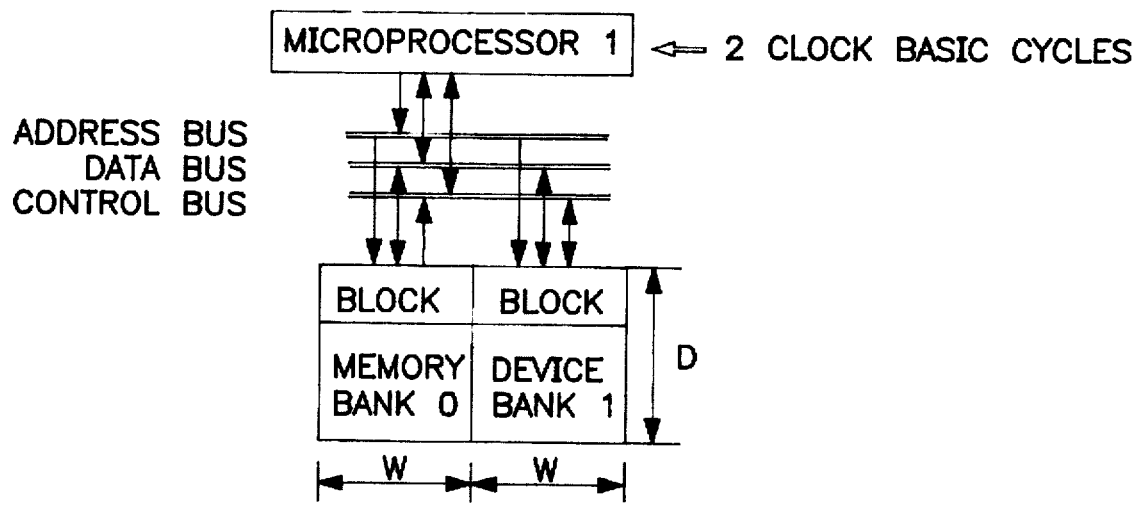
FIG. 4 is a block diagram of a conventional pipeline.
Figure 5:
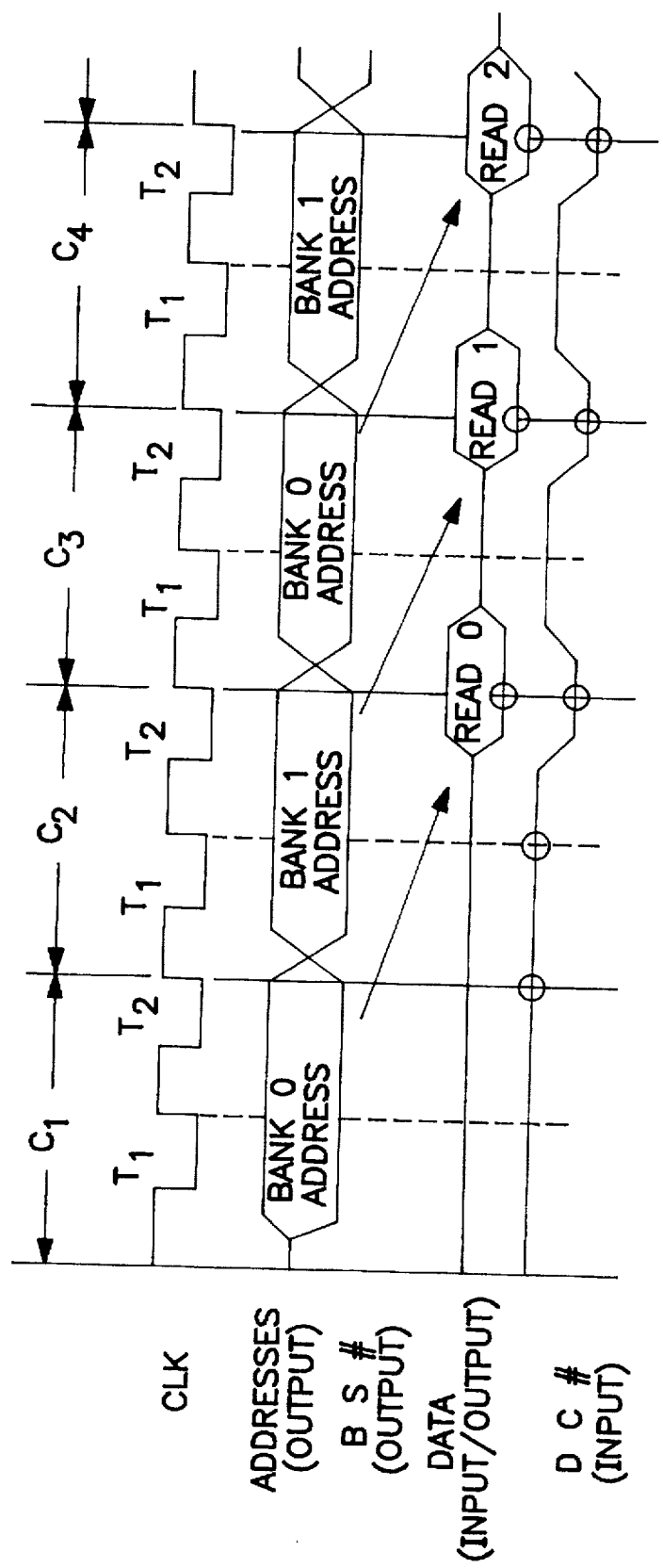
FIG. 5 is a timing chart for the bus shown in FIG. 4.
Figure 6:
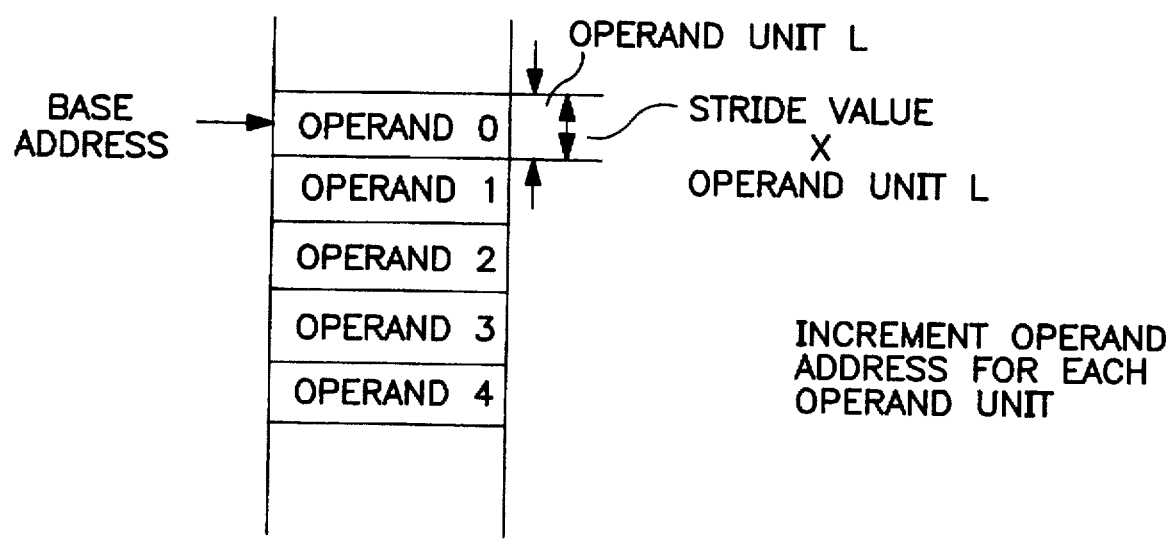
FIG. 6 is a conceptual view of a prior art consecutive operand array.
Figure 7:
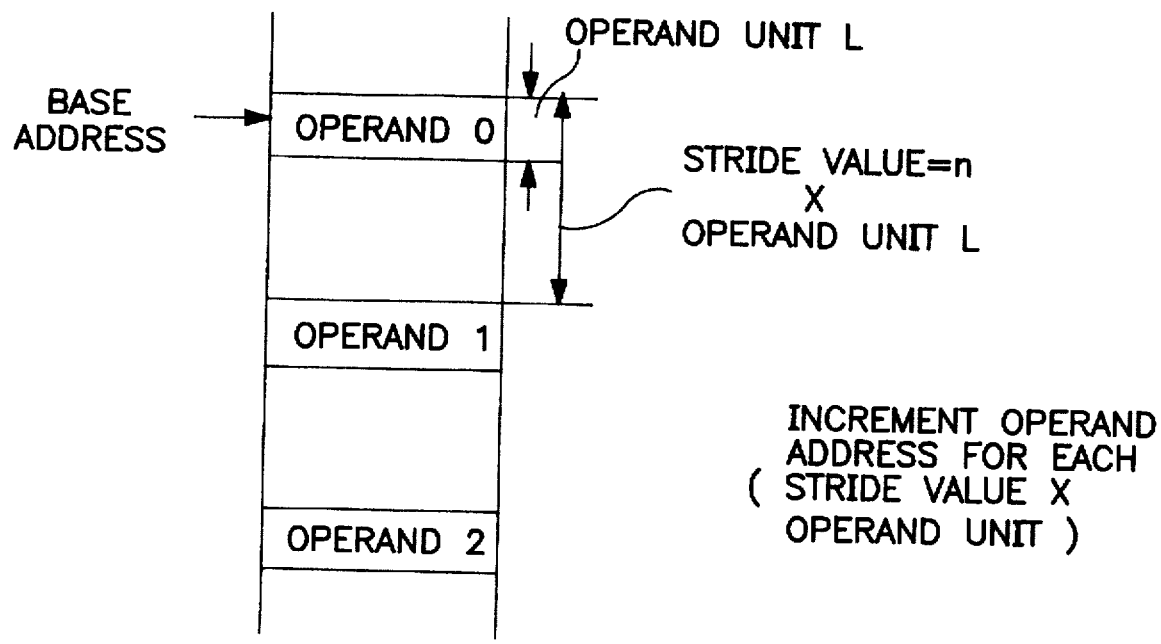
FIG. 7 is a conceptual view of a prior art operand array having equal intervals.
Figure 8:
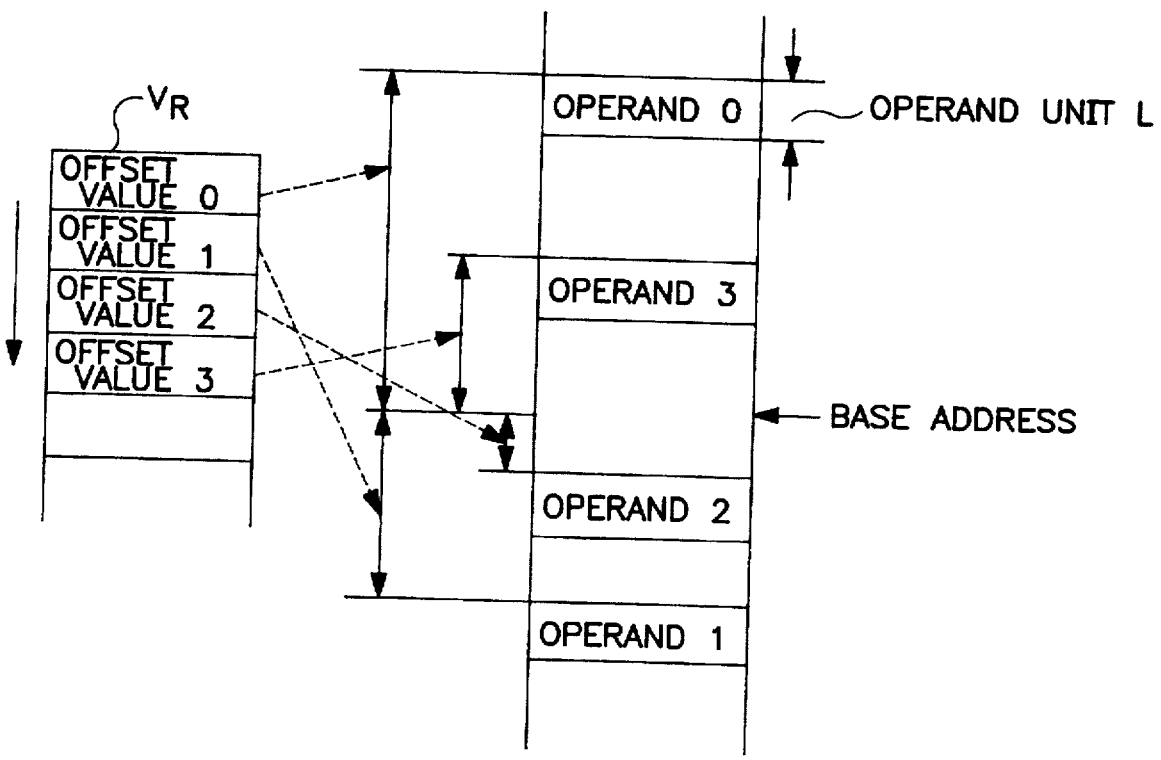
FIG. 8 is a conceptual view of a prior art indirect operand array.
Figure 9:
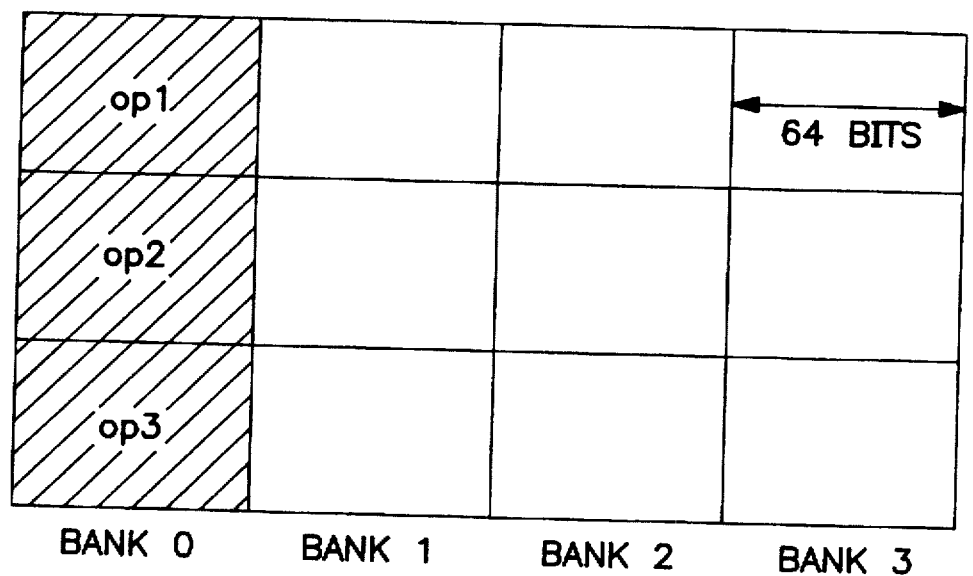
FIG. 9 is a diagram showing an access state where the prior art operand unit and bank width are both sixty-four (64) bits and the bank number and stride values are both four (4)
Figure 10B:
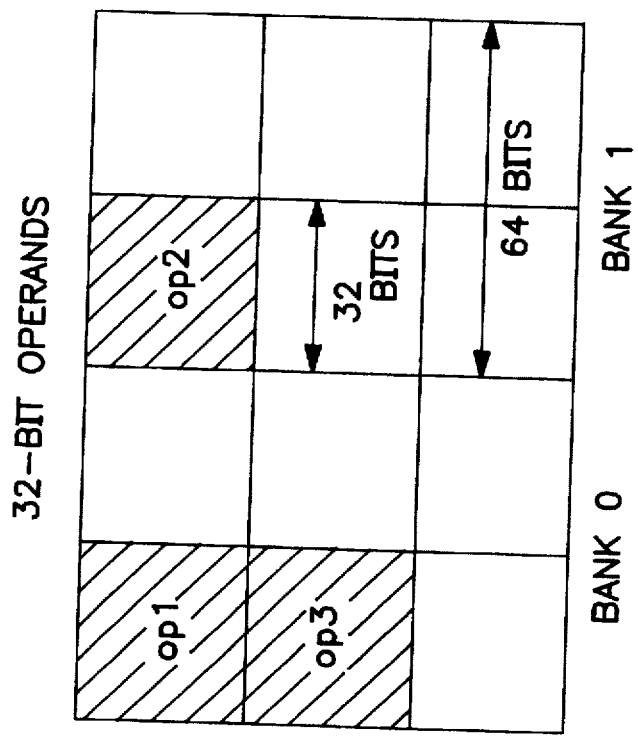
FIGS. 10A and 10B are diagrams showing access states where the prior art operand unit and bank width are both sixty-four (64) bits and the bank number and stride values are both two (2)
Figure 10A:
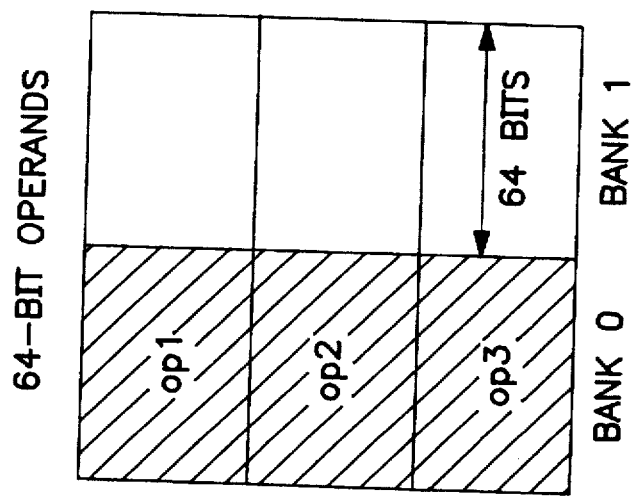

Each of the above described cycles, that is, each state, is determined by the timing sequencer 82 and outputted as a bus state signal to the external terminal controller 84 (FIG. 5).

Figure 50:
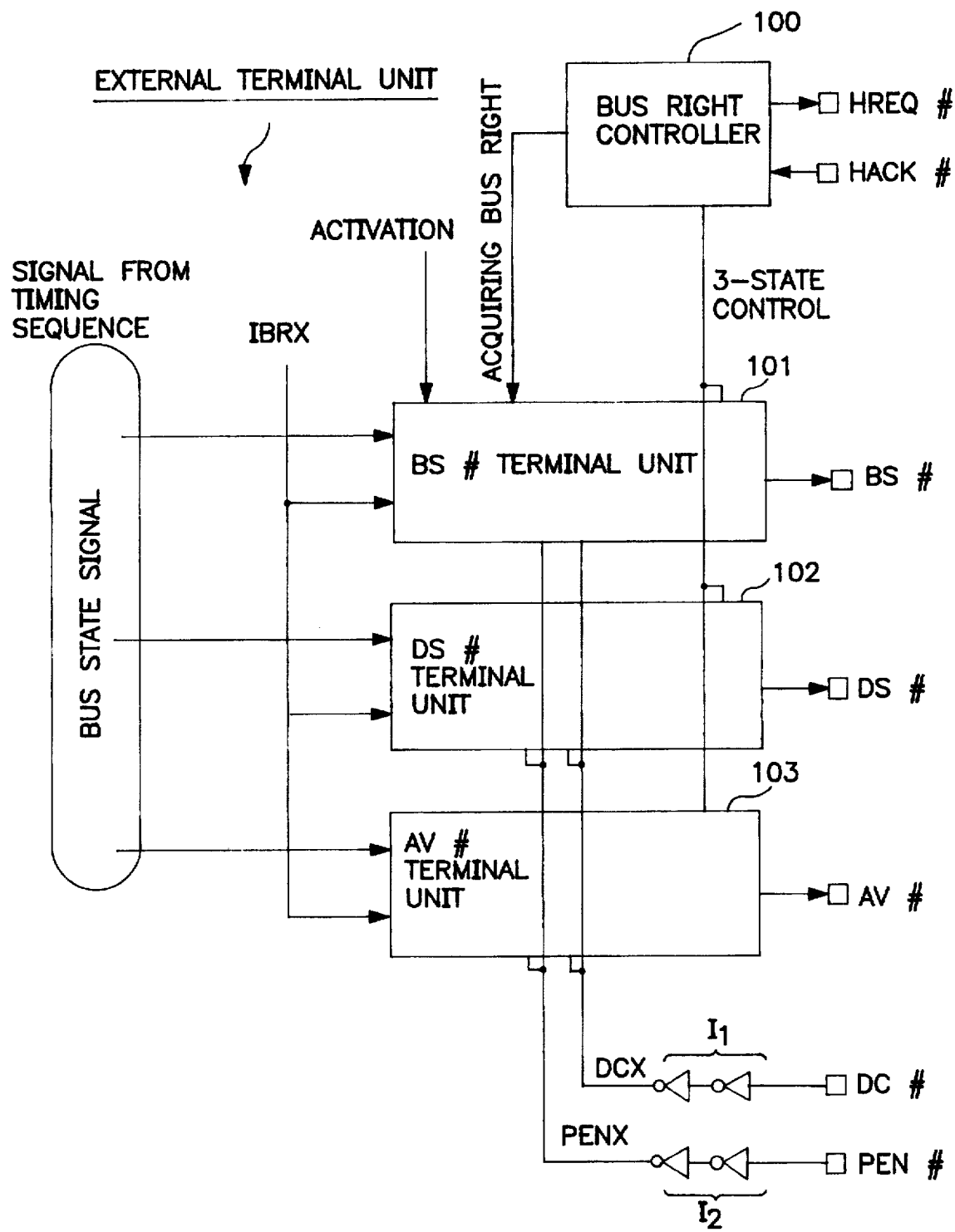
FIG. 50 shows a configuration of the external terminal controller in accordance with the preferred embodiment of the present invention.

FIG. 50 shows the configuration of the external terminal controller 84.

The bus state signal outputted by the timing sequencer 82 is a signal corresponding to each of the above described cycles and applied to a BS# terminal unit 101, a DS# terminal unit 102, and an AV# terminal unit 103.

A bus right controller 100 outputs a request signal HREQ# when a bus use right request is issued. When an acknowledge signal HACK# is inputted in response to the request signal, a bus right acquisition signal is outputted as an acknowledgement of a bus right to the BS# terminal unit 101, the DS# terminal unit 102, and the AV# terminal unit 103. Likewise, a 3-state control signal indicating the state of an output terminal when a bus is going to be used is outputted to the BS# terminal unit 101, the DS# terminal unit 102, and the AV# terminal unit 103.

In addition to the above-described signals, a DC# and a PEN# are applied as a DCX and a PENX respectively to the BS# terminal unit 101, the DS# terminal unit 102, and the AV# terminal unit 103 through two steps of inverters $I_1$ and $I_2$ that is, buffers.

According to these signals, the BS# terminal unit 101 outputs a BS#, the DS# terminal unit 102 outputs a DS#, and the AV# terminal unit 103 outputs an AV#.

Figure 51:
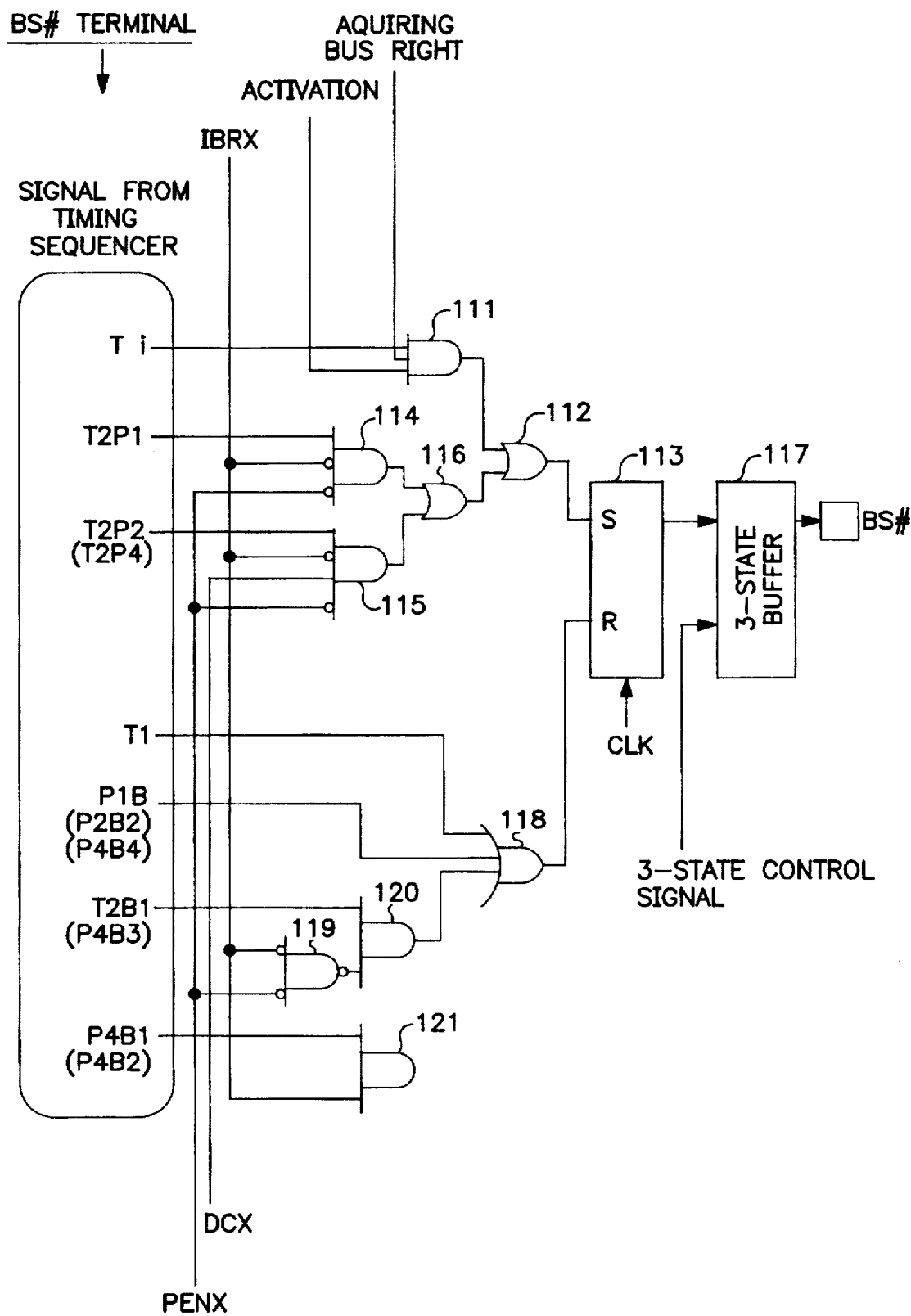
FIG. 51 shows a detailed configuration of the BS# terminal unit in accordance with the preferred embodiment of the present invention.

FIG. 51 shows the detailed configuration of the BS# terminal unit 101.

When a bus-right acquisition signal, a start signal, and a signal Ti from the timing sequencer indicate "1" level, an AND gate 111 outputs "1" level and sets a set/reset flip-flop 113 synchronous with a clock CLK through an OR gate 112. Additionally, AND gates 114 or 115 output "1" level and set the set/reset flip-flop 113 in synchronous with the clock CLK through OR gates 112 and 116 when both an internal bus access request signal IBRX and a PENX indicate "0" level and DCX in the T2P1 cycle, or when both an IBRX and a PENX indicate "0" level and DCX indicates "1" level in the T2P2 cycle.

The output of the set/reset flip-flop 113 is applied to a 3-state buffer 117. According to the 3-state control signal, the 3-state buffer 117 outputs as a BS# a set state of the set/reset flip-flop 113. The set state is indicated by "0" level of BS#.

In the cycle T1, P1B, P2B2, or P4B4, the set/reset flip-flop 113 is reset through an OR gate 118. The set/reset flip-flop 113 is reset through the OR gate 118 by the outputs of AND gates 119, 120, and 121 when at least either of an IBRX and a DCX indicates "1" level in the cycle P2B1 or P4B3, or when an IBRX indicates "1" level in the cycle P4B1 or P4B2. On such reset conditions, the BS# indicates "1" level through the 3-state buffer 117.

Figure 52:
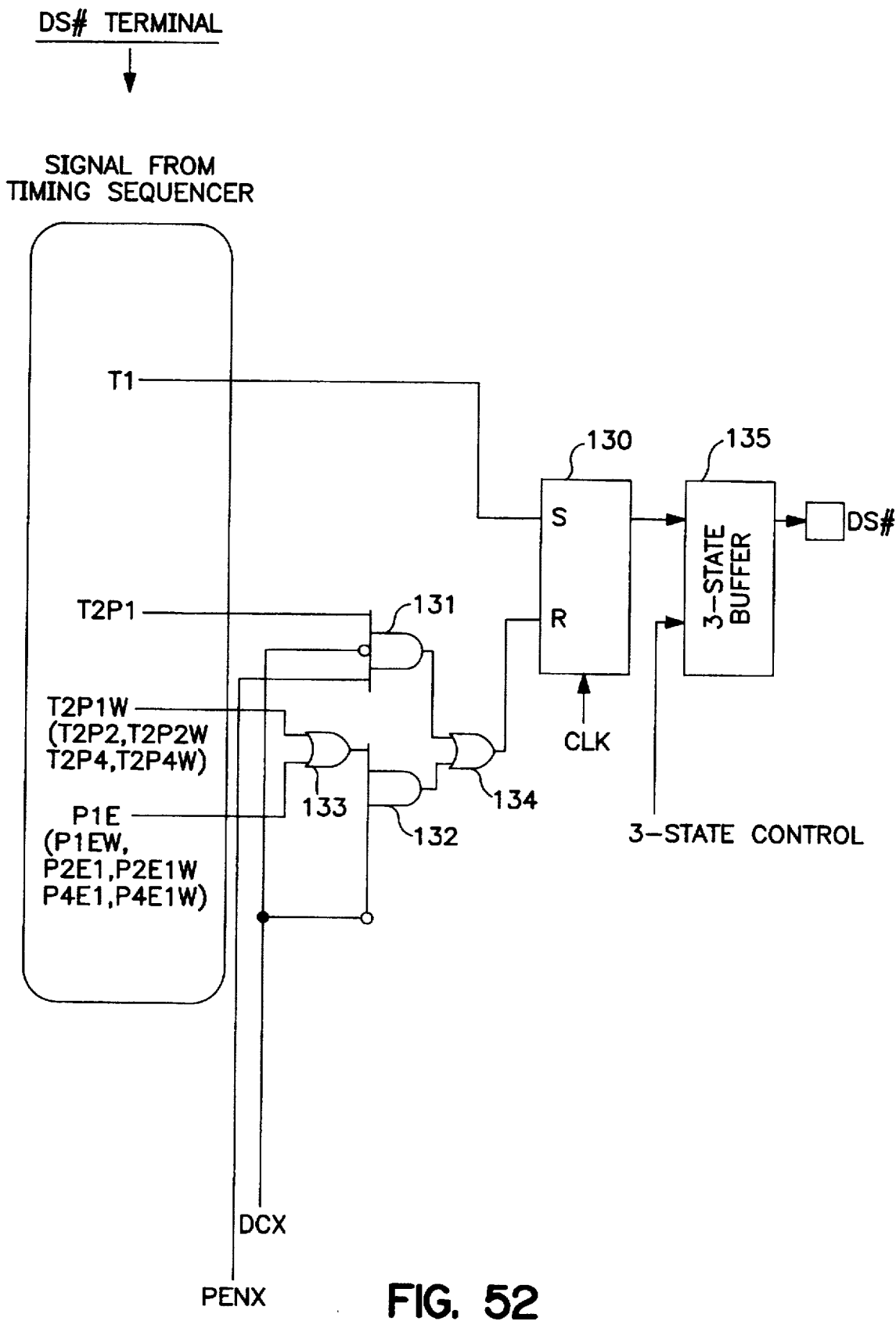
FIG. 52 shows a detailed configuration of the DS# terminal unit in accordance with the preferred embodiment of the present invention.

Summing up the operation shown in FIG. 51, a signal from the timing sequencer is decoded by the decoding circuit comprising the AND gates 111, 114, 115, 119, 120, and 121, and the OR gates 112, 116, and 118 to set or reset the set/reset flip-flop 113. The result is outputted through the 3-state buffer 117. The above-described operation is performed similarly for a DS# or an AV#. FIG. 52 shows the detailed configuration of the DS# terminal unit 102; and FIG. 53 shows the detailed configuration of the AV# terminal unit 103.

In FIG. 52, a set/reset flip-flop 130 is set in the cycle T1, and reset by decoding a DCX, a PENX, and signals which indicate being in the cycle T2P1, T2P1W, T2P2, T2P2W, T2P4, T2P4W, P1E, P1EW, P2E1, P2E1W, P4E1, and P4EW, using the decoding circuit comprising AND gates 131 and 132 and OR gates 133 and 134. The result is outputted through a 3-state buffer 135.

Figure 53:
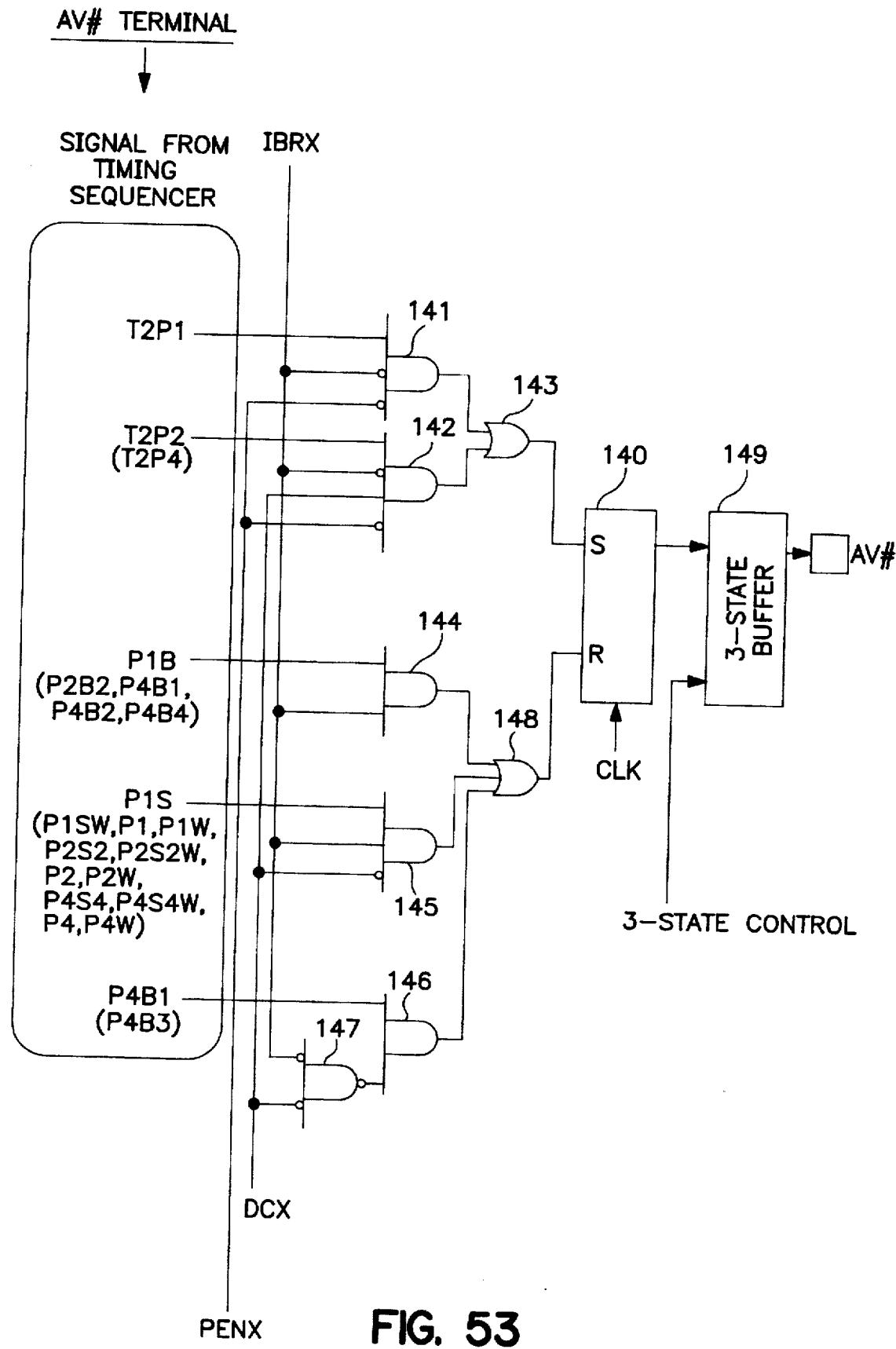
FIG. 53 shows a detailed configuration of the AV# terminal unit in accordance with the preferred embodiment of the present invention.

Likewise, as shown in FIG. 53, a set/reset flip-flop 140 is set by decoding an IBRX, a DCX, a PENX, and signals which indicate being in the cycle T2P1, T2P2 or T2P4 using the decoding circuit comprising AND gates 141 and 142 and an OR gate 143. It is reset by decoding a DCX IBRX, and signals which indicate being in the cycle PIB, P2B2, P4B1, P4B2, P4B4, P1S, P1SW, ... (shown on the left side in FIG. 53) using the decoding circuit comprising AND gates 144, 145, 146, and 147 and an OR gate 148.

The output of the set/reset flip-flop 140 is outputted, similarly as described above, through a 3-state buffer 149.

A BS#, a DS#, and an AV# are outputted through the above-listed circuit.

Each of the above listed cycles is outputted by the timing sequencer.

Figure 54:
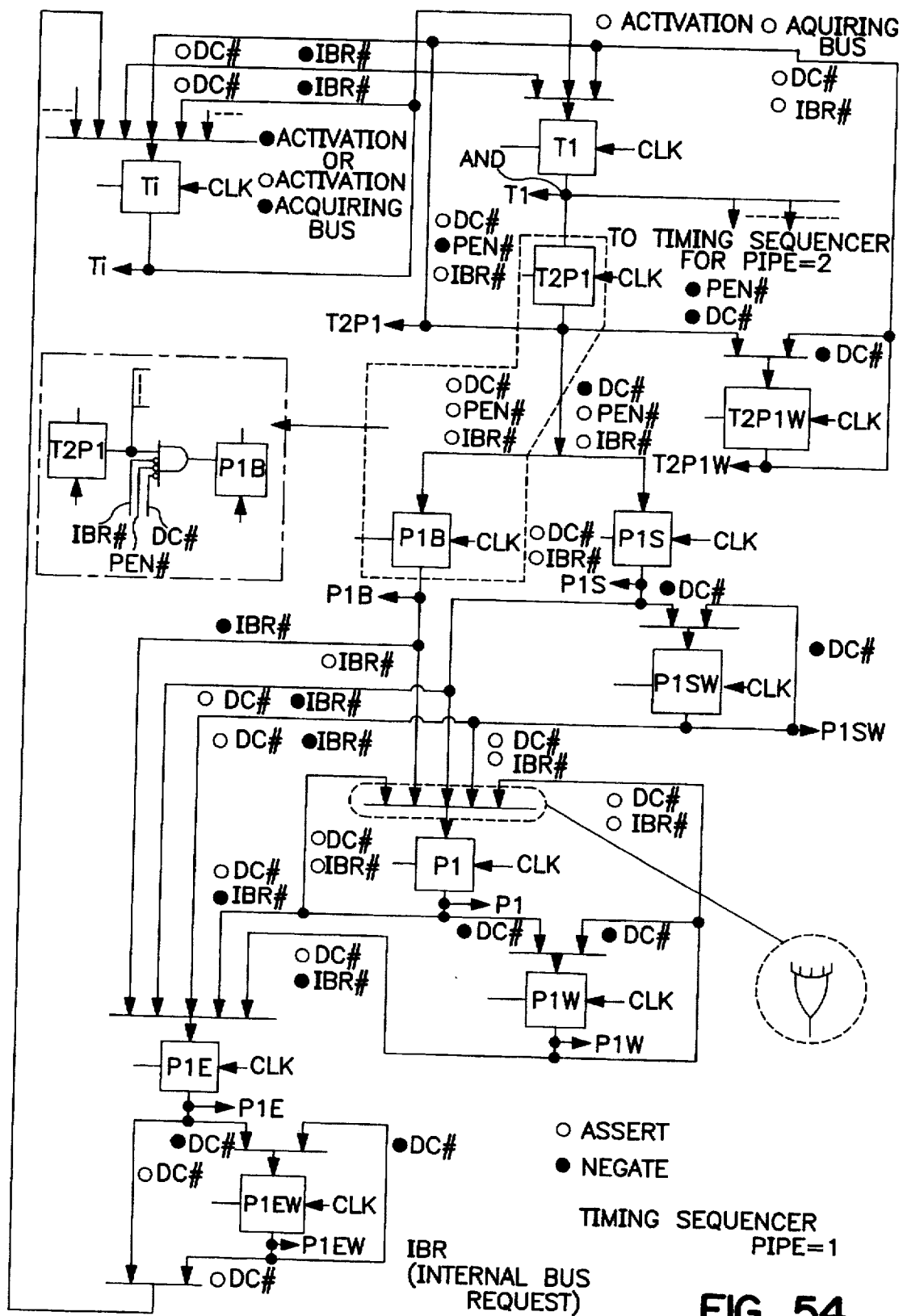
FIG. 54 shows a detailed configuration of the timing sequencer when "pipeline equals 1" according to the preferred embodiment of the present invention.

FIG. 54 shows the configuration of the timing sequencer.

Each of the cycles and circuits for generating a BS#, DS#, and AV# are described in the explanation above. These circuits are shown in FIGS. 51, 52, and 53, and determine the timing of outputting signals according to bus state signals outputted by the timing sequencer 82.

FIG. 54 shows the detailed configuration of the timing sequencer 82 when "pipeline=1". It is configured similarly when "pipeline=2" or "pipeline=4", and the respective explanation is skipped here. The timing sequencer 82 comprises 11 latches, 9 OR gates, and several AND gates shown in FIG. 54. These AND gates are not shown by usual gate marks, but the logic is indicated by a mark ("assertion" by a white circle and "negation" by a black circle added near the corresponding line) for representing the state of an output of each latch. For example, the output of a latch P1EW is re-entered through an OR gate if a DC# is negated, and is applied to an OR gate if a DC# is asserted. The portions enclosed by dotted lines shown in FIG. 54 are shown as the circuit enclosed by an alternate long and short dash line.

Since the above described eleven latches are provided corresponding to each of the cycles shown in FIGS. 38, 39, 40, and 41, each latch is assigned the same symbol as the corresponding cycle.

They are in the idle state when the processor is in the wait state, while a latch Ti is set for operation. If, on this condition, the system is started and a bus acquisition is asserted, a latch T1 is set through an OR gate. In the cycle T1, a latch to be set in the next stage is determined according to the pipeline stage number outputted by the address pipeline stage number setter 14 shown in FIG. 26. That is, an AND logic is obtained between the latch T1 and the output 1 - K obtained by decoding the pipeline stage number outputted by the address pipeline stage number setter 14, thereby setting the latch in the next stage. In FIG. 54, a circuit having the pipeline stage number "1" is referred to. If the number other than "1" is referred to, latches not shown in the figure are set.

If the pipeline stage number is "1", a latch T2P1 is set. Thereafter, if a DC# and an IBR# are asserted but a PEN# is negated, a bus is not accessed and the latch T1 is set again.

The IBR# is an internal bus request outputted by an address unit 64 shown in FIG. 33. A latch P1B is set when a DC#, PEN#, and IBR# are asserted after the latch T2P1 is set. A latch P1S is set when a DC# is negated and PEN# and IBR# are asserted. Being negated a DC#, that is, a DC# is not returned, indicates it cannot be accessed within the clock. If a DC# is negated with the latch P1S set, a latch P1SW is set and the P1SW retains set until the DC# is asserted.

The state P1B is different from the state P1S in that a DC# is asserted in the state T2P1. In the state P1B, the BS# is outputted again.

A latch P1 is set when an IBR# is asserted in the state P1B, a DC# and an IBR# are asserted in the state P1S, and a DC# and an IBR# are asserted in the state PLSW. In the cycles PIB and P1S, one address is outputted first. In the cycle P1, an address and data are processed.

The latch P1 is set again when a DC# and an IBR# are asserted, that is, a DC# is returned and an internal bus request IBR# is issued after the latch P1 is set.

A latch P1W is set when a DC# is negated, that is, a DC# is not returned, for example, when the memory works slowly or a DRAM is refreshed. The latch P1 retains set until the DC# is asserted.

A latch P1E is set if there are no more internal requests in the states P1 and P1W, that is, an IBR# is negated. In these states, an address need not be outputted, but data are processed. If a DC# is returned in the state PIE, the system enters an idle state. If a DC# is not returned, the state P1EW is set and repeated until a DC# is provided.

According to the operation above, the state is sequentially changed and a latch is set depending on each state. That is, the state varies correspondingly.

The preferred embodiment of the present invention is configured such that the above described BS#, DS#, and AV# are controlled according to the state indicated by each latch in order to effectuate the process speed of an external memory.

As we have reviewed its configurations and operations, this invention enables pipeline stage numbers to be set flexibly regardless of a physical bank number, thereby avoiding a pipeline operational inconvenience by preventing an address interference.

What is claimed is:

1. A memory access device, comprising:
   a memory means having a plurality of independently accessible banks;
   a pipeline stage number setting means for setting a number of pipeline stages in a pipeline operation according to a logic bank number calculated from a bank number of a main memory, a stride value and an operand length, to gain access to a number of the banks, and for accessing a next-to-be-used one of said plurality of independently accessible banks before completing an access to a currently-being-used one of said plurality of independently accessible banks, so that a number of pipeline stages dependent on the number of said plurality of banks are accessed; and
   address generating means for generating an address of said next-to-be-used one of said plurality of independently accessible banks and for switching a bank from said currently-being-used one of said plurality of independently accessible banks to said next-to-be-used one of said plurality of independently accessible banks in accordance with said number of pipeline stages set by said pipeline stage number setting means and the stride value.

2. The memory access device according to claim 1, wherein:

said pipeline stage number setting means sets said number of pipeline stages responsive to a command execution based on the stride value and a number of said plurality of independently accessible banks in said memory means; and said address generating means generates an operand address pertinent to said command execution in said number of pipeline stages set by said pipeline stage number setting means.

3. The memory access device according to claim 1, wherein:

said pipeline stage number setting means sets said number of pipeline stages based on at least one of successive operand information indicating whether operands are successive and address generating mode information indicating an address generation mode.

4. The memory access device according to claim , wherein:

said address generating means increments the operand address related to said pipeline operation by a product obtained by multiplying the stride value by an integer times an operand length.

5. The memory access device according to claim 1, wherein:

said memory means sequentially switches designated banks when addresses change sequentially.

6. The memory access device according to claim 5, wherein said memory means comprises:

an address latch circuit at an address input terminal of each of said plurality of independently accessible banks to access an address of said memory means, and a bidirectional buffer having a write latch in a write direction at a data terminal, wherein write data is supplied to said bi-directional buffer by temporarily storing said write data in said write latch during a write operation, and data is output directly from said bi-directional buffer during a read operation.

7. The memory access device according to claim 1, wherein:

said memory access means has n banks configured with addresses for sequencing blocks of address spaces partitioned into predetermined data widths, and stores in one of said plurality of independently accessible banks an operand having one of a length corresponding to a predetermined data width and a length corresponding to half of said predetermined data width;

said pipeline stage number setting means sets said pipeline stage number, based on said length of said operand, said predetermined data width, a value of an integer and the number of said plurality of independently accessible banks; and said address generating means executes data accesses in a pipeline according to a distance corresponding to said integer times said length of said operand.

8. The memory access device according to claim 1, wherein said bank switching means comprises:

a first latch, provided for each of said plurality of independently accessible banks, for storing a least significant bit side of an address designating one of said plurality of independently accessible banks;

a second latch, provided for each of said plurality of independently accessible banks, for storing a most significant bit side of the address designating each of said plurality of independently accessible banks and for supplying the most significant bit side of the address to the address of each of said plurality of independently accessible banks; and a buffer, connected to a data terminal of each of said plurality of independently accessible banks, having a latch in a write direction.

* * * * *